(12) United States Patent
Zou et al.

(10) Patent No.: US 12,212,048 B2
(45) Date of Patent: *Jan. 28, 2025

(54) MICROWAVE-DOPPLER DETECTING MODULE AND DEVICE THEREOF

(71) Applicant: Shenzhen Merrytek Technology Co., Ltd, Shenzhen (CN)

(72) Inventors: Gaodi Zou, Shenzhen (CN); Xin Zou, Shenzhen (CN)

(73) Assignee: Shenzhen Merrytek Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,859

(22) Filed: Nov. 24, 2023

(65) Prior Publication Data

US 2024/0088545 A1    Mar. 14, 2024

Related U.S. Application Data

(63) Continuation-in-part of application No. 18/231,359, filed on Aug. 8, 2023, which is a continuation of application No. 17/060,076, filed on Oct. 1, 2020, now Pat. No. 11,764,461.

(51) Int. Cl.
  *H01Q 1/24*   (2006.01)
  *H01Q 1/28*   (2006.01)
  *H01Q 9/26*   (2006.01)

(52) U.S. Cl.
  CPC ............. *H01Q 1/285* (2013.01); *H01Q 1/247* (2013.01); *H01Q 9/26* (2013.01)

(58) Field of Classification Search
  CPC .......... H01Q 1/285; H01Q 1/247; H01Q 1/44; H01Q 9/26; H01Q 9/285; H01Q 9/20; H01Q 19/108; H01Q 21/062; G01S 13/58; G01S 7/03
  See application file for complete search history.

(56) References Cited

U.S. PATENT DOCUMENTS

| | | | |
|---|---|---|---|
| 7,688,252 B2 * | 3/2010 | Voigtlander | H01Q 9/065 342/104 |
| 2020/0388933 A1 * | 12/2020 | Chen | H01Q 21/26 |
| 2021/0135343 A1 * | 5/2021 | Wu | H01Q 21/24 |

* cited by examiner

*Primary Examiner* — Awat M Salih
(74) *Attorney, Agent, or Firm* — David & Raymond Patent Firm; Raymond Y Chan

(57) ABSTRACT

A microwave-doppler detecting module and device thereof are provided, wherein the microwave-doppler detecting module includes an electromagnetic reflecting surface and at least a pair of antithetical dipoles spacingly disposed to the electromagnetic reflecting surface. When the first and second radiating source poles respectively extended from a first and second feed ends of the pair of antithetical dipoles are respectively fed by the same excitation signal feed source at the first feed end and the second feed end, the current and the potential distribution of the first radiating source pole and the second radiating source pole can present an antithetical distribution state and antithetically coupled to the midpoint of the connection of the first feed end and the second feed end, so as to reduce the size requirement of the microwave-doppler detecting module and to avoid detection dead zone from occurring.

21 Claims, 19 Drawing Sheets

MICROWAVE-DOPPLER DETECTING MODULE AND DEVICE THEREOF

CROSS REFERENCE OF RELATED APPLICATION

This application is a Continuation-In-Part application that claims the benefit of priority under 35 U.S.C. § 120 to a non-provisional application, application Ser. No. 18/231,359, filed Aug. 8, 2023, which is a Continuation application that claims the benefit of priority under 35 U.S.C. § 120 to a non-provisional application, application Ser. No. 17/060,076, filed Oct. 1, 2020, now U.S. Pat. No. 11,764,461, and the benefit of priority under 35 U.S.C. § 119 to a Chinese application, application number 202321808362.4, filed Jul. 10, 2023, which are incorporated herewith by references in their entireties.

BACKGROUND OF THE PRESENT INVENTION

Field of Invention

The present invention relates to the field of microwave-doppler detection and light fixture, and more particularly, to a microwave-doppler detecting module, a side offset microwave detection device and a strip light.

Description of Related Arts

Microwave detection technology based on Doppler Effect, is utilized as a critical key in detecting and relating humans and objects and have a unique advantage among the behavior detection and existence detection technologies. It is able to detect moving object without invading individual privacy. Therefore, such technology has a wide-ranging application prospect.

Conventional microwave detection modules, based on the structures of the radiation source, can mainly be divided into microwave detection modules of columnar radiation source structure and microwave detection modules of flat radiation source structure. More specifically, referring to FIGS. 1A and 1B, the structural principles of conventional microwave detection module 10P of columnar radiation source structure and microwave detection module 20P of flat radiation source structure are respectively illustrated. In which, the microwave detection module 10P of columnar radiation source structure comprises a columnar radiation source 11P and a reference ground surface 12P, wherein the reference ground surface 12P has a radiating aperture 121P arranged thereon, wherein the columnar radiation source 11P perpendicularly penetrates the reference ground surface 12P through the radiating aperture 121P and a radiating clearance 1211P is provided between the radiating aperture 121P and the reference ground surface 12P, so that when the columnar radiation source 11P is fed, the columnar radiation source 11P can be coupled with the reference ground surface 12P to form a radiation space 100P from the radiating clearance 1211P with the columnar radiation source 11P as the central axis, wherein the radiation space 100P is the coverage area of the electromagnetic wave radiated by the microwave detection module 10P of columnar radiation source structure, wherein the radiation space 100P is respectively sunken from the central axis at the two ends of the columnar radiation source 11P, rendering detection dead zones. It is understandable that, in actual utilization, such as a vertical detecting application, when the microwave detection module 10P of columnar radiation source structure is mounted on a place such as a suspended ceiling, regular ceiling, shed ceiling, and etc., and is utilized from a vertical direction to perpendicularly detecting downward, the mounting position of the microwave detection module 10P of columnar radiation source structure is usually lowered for reducing or avoiding detection dead zone of the corresponding radiation space 100P from occurring in the space between the ground and the microwave detection module 10P of columnar radiation source structure. In other words, because the microwave detection module 10P of columnar radiation source structure has a detection dead zone, the detecting distance of the microwave detection module 10P of columnar radiation source structure in real utilization is way smaller than the maximum size of the corresponding radiation space 100P in the central axial direction. That is the detecting distance of the microwave detection module 10P of columnar radiation source structure in real utilization is much smaller than the detecting distance according to the scale of the gain thereof. The gain of the conventional microwave detection module 10P of columnar radiation source structure, which is usually about 2 dB, further limits the application of the conventional microwave detection module 10P of columnar radiation source structure in the field of microwave-doppler detection.

Referring to FIG. 1B, the structure and principle of the microwave detection module 20P of flat radiation source structure are illustrated, wherein the microwave detection module 20P of flat radiation source structure includes a flat panel radiation source 21P and a reference ground surface 22P, wherein the flat panel radiation source 21P and the reference ground surface 22P are spacingly arranged and parallel to each other, while a radiating clearance 23P is defined and provided between the flat panel radiation source 21P and the reference ground surface 22P. It is understandable that because, structurally, the columnar radiation source 11P of the microwave detection module 10P of columnar radiation source structure is perpendicular to the reference ground surface 12P, comparing to the microwave detection module 20P of the flat radiation source structure that is close to a flat plate structure, the microwave detection module 10P of columnar radiation source structure is likely to occupy a larger mounting space in an actual installation. As a result, under the current aesthetic trend of pursuing compact and simple appearance, the microwave detection module of flat radiation source structure is more enjoyable and appreciable to its advantages of small volume and relative stabilization.

Nevertheless, in some application scenarios, the microwave detection module 10P of columnar radiation source structure is more advantageous than the microwave detection module 20P of flat radiation source structure. For example, referring to FIG. 2, the application of the microwave detection module 10P of columnar radiation source structure utilized in a LED light board 30P is illustrated, wherein the LED light board 30P has a plurality of LED lights 31P arranged on one side thereof, so as to create a lighting side on the side of the LED light board 30P. It is understandable that, in order to control the illumination of the LED light board 30P based on human activity, conventional microwave detection module is utilized on such LED light board 30P and, according to actual application, effective electromagnetic wave detecting signal should be radiated in the space corresponding to the lighting side of the LED light board 30P. Because current LED light boards 30P are usually made of electric conductive aluminum sheet, in order to avoid the shielding effect of the electric conductive LED light board 30P to the electromagnetic wave detecting signal and from the perspective of the stability of human activity detecting, ideally, the microwave detection module as a human activity detecting component should be disposed on the illumination side of the LED light board 30P. Nevertheless, whether the microwave detection module 10P of columnar radiation source structure or the microwave detection module 20P of flat radiation source structure is utilized, because the corresponding reference ground surface 12P and the minimum value of the area size of the reference ground surface 22P are restricted, the mounting of the microwave detection module 10P of columnar radiation source structure or the microwave detection module 20P of flat radiation source structure on the illumination side of the LED light board 30P will inevitably occupy the mounting sites of part of the LED lights 31P or shade part of the LED lights 31P, rendering dark zone of the light emitted by the LED light board 30P.

Hence, in order to achieve the illumination of the LED light board 30P based on the control of human activity, conventionally it is mainly based on the arrangement from affecting the LED lights 31P. A through hole 32P is formed in the LED light board 30P. Besides, the columnar radiation source 11P of the microwave detection module 10P of columnar radiation source structure is extended from the side of the LED light board 30P opposite to the illumination side through the through hole 32P to pass through the LED light board 30P to the illumination side of the LED light board 30P, so as to conceal the reference ground surface 12P of the microwave detection module 10P of columnar radiation source structure on the side of the LED light board 30P opposite to the illumination side. Therefore, the mounting of the microwave detection module 10P of columnar radiation source structure on the LED light board 30P can avoid occupying the sites of part of the LED lights 31P or shading part of the LED lights 31P, so as to maintain the evenness and uniformity of the light emitted from the LED light board 30P. Nonetheless, in real utilization, due to the limits of the maximum value of the size of the through hole 32P and the minimum value of the thickness of the LED light board 30P, the coupling between the reference ground surface 12P and the columnar radiation source 11P of the microwave detection module 10P of columnar radiation source structure will be blocked by the LED light board 30P. In other words, the corresponding radiation space 100P on the illumination side of the LED light board 30 will be reduced due to the shielding and reflex action of the LED light board 30P. As a result, the stability of the human activity detection of the microwave detection module 10P of columnar radiation source structure utilized on the LED light board 30P is not ideal. In addition, because of the reflex action of the LED light board 30P and the directivity of the bidirectional radiation of the microwave detection module 10P of columnar radiation source structure, the corresponding radiation space 100P at the side opposite to the illumination side of the LED light board 30P will be enhanced. In other words, the radiating energy of the microwave detection module 10P of columnar radiation source structure on the side opposite to the illumination side of the LED light board 30P will be enhanced. As a result, when there is metal object, such as the metal shell of the LED light board 30P, the metal pipeline in the suspended ceiling space, and etc., presenting in the corresponding space of the side opposite to the illumination side of the LED light board 30P, the microwave detection module 10P of columnar radiation source structure is likely to wrongly detect active object due to self-excitation, which therefore affects the experience of the smart control of the LED light board 30P based on detecting human activity.

In other words, contrasting to the microwave detection module 20P of flat radiation source structure, the microwave detection module 10P of columnar radiation source structure can achieve the activity detecting to the space outside of the shielded space through a conceal mounting manner that extends the columnar radiation source 11P from a shielded space corresponding to one side of a metal plate through a through hole to the space outside of the shielded space corresponding to the other side of the metal plate. Unfortunately, its detecting stability is not good enough and it has detection dead zone.

In addition, as an indispensable electrical equipment for life and work, the development of light fixtures such as lamps and lanterns has been based on different application scenarios to derive a variety of brands and types, among which LED light as an energy-efficient lamp has been fully integrated into our life and work scenes. There are many types of existing LED lights, such as based on indoor lighting scenes, mainly including LED ceiling lights, LED panel lights, LED table lamps, LED strip lights, LED tube lights, LED bulb lights, and etc., and the form of the same type of LED lights may also be diversified. Therefore, under the intelligent development trend of light fixtures, especially under the intelligent development trend based on active human activity detection technology, confronting the demands of design simplification to the pattern and configuration of light fixtures, the requirements for the structural design and performance of the existing LED lights are higher according to the intelligent modules.

In particular, the active human activity detection technology currently applied to the intelligent lighting mainly includes the following:

1. Based on image acquisition to identify the human body and human behavior state with corresponding algorithms, however it is hard to be accepted in the market due to the risk of invasion and leakage of privacy. Further, there are defects with complex algorithms and high requirements for hardware performance and high costs.
2. Based on the detection of cross-zone actions of the human body in the detection areas by the infrared pyroelectric sensor (PIR) through the partitions of the Fresnel lens to the corresponding detection area, due to the limitation of the Fresnel lens to the corresponding detection area, the Fresnel lens is unable to detect the human activities corresponding to the human breathing or heartbeat actions and is easy to have mis-determination of the presence or absence of the human body. For example, in the state of the human body in a static state present in the detection area, the mis-determination of the human body is not presence in the corresponding detection area would result in abnormal working of the corresponding electrical equipments that are controlled according to the detection result of whether the human body is presence or absence.
3. Based on the microwave detection technologies based on the principle of Doppler effect, specifically by transmitting a microwave beam, receiving a reflected echo of the microwave beam reflected by the corresponding object, and generating a Doppler intermediate frequency signal corresponding to the frequency difference between the microwave beam and the reflected echo thereof by mixing frequency detection, the Doppler intermediate frequency signal is then a feedback of the motion of the corresponding object. In which, the microwave detection technology based on the principle of Doppler effect, as an important hub for the connection between people and things and things and things, has unique advantages in behavior detection and presence detection technology, that can detect the behavioral characteristics of moving objects, such as human action characteristics, movement characteristics, and micro-motion characteristics, and even human heartbeat and breathing characteristics without infringing human privacy, so that it has a wide range of application prospects.

However, in practical applications, for the current use of the common strip lights, due to the narrow width of the strip light such as a long strip three-proof light, the light plate installation slot in the width direction of the space is limited that it often can only accommodate a single strip of light board. When the microwave detection technology based on the principle of Doppler effect of the corresponding microwave detection device is used as its intelligent module to achieve its intelligent active human activity detection lighting, the structural design and performance parameters of the current microwave detection device can not match its simple design. Specifically, the current microwave detection device mostly uses a planar patch antenna or a cylindrical antenna as an antenna unit for transmitting and/or receiving microwaves, with the strip light board arranged with the light-emitting side as its luminous surface, and then the lighting direction of the strip light corresponds to the orientation of the light-emitting surface, in order to match the strip light, the antenna unit has directional radiation performance requirements in the lighting direction of the strip light, That is, the antenna unit has performance requirements for directional radiation, and the installation of the antenna unit in the strip light shall meet that its directional radiation direction is consistent with the lighting direction of the strip light. Corresponding to this matching requirement, when the antenna unit is installed on the back of the light-emitting surface of the LED strip light board, the strip light board occludes the directional radiation direction of the antenna unit and is bound to cause serious impact on the transmission and reception of the antenna unit. Also, when the antenna unit is installed on the light-emitting surface of the strip light board, because the directional radiation performance of the antenna unit has a greater dependence on the area of its reference ground, a larger area of reference ground is bound to cause a larger area of occlusion to the light-emitting surface of the strip light board and form a dark area in the lighting state of the strip light.

Therefore, for the current commonly used strip lights, when the corresponding microwave detection device based on the Doppler effect principle is used as its intelligent module to achieve its intelligent active human activity detection lighting, the structural design and performance parameters of the conventional microwave detection device cannot match its simple design. In practical applications, the current microwave detection device is mostly installed outside the strip light in an external way.

SUMMARY OF THE PRESENT INVENTION

An object of the present invention is to provide a microwave-doppler detecting module and device thereof, wherein the microwave-doppler detecting module is constructed in an antithetically coupling manner so as to have a relatively higher radiation gain and to be capable of avoiding forming detection dead zone.

Another object of the present invention is to provide a microwave-doppler detecting module and device thereof, wherein the microwave-doppler detecting module based on an antithetical coupling structure comprises at least a pair of antithetical dipoles, wherein the pair of the antithetical dipoles comprises a first radiating source pole and a second radiating source pole, wherein the first radiating source pole has a first feed end and is extended from the first feed end as an end, wherein the second radiating source pole has a second feed end and is extended from the second feed end as an end, wherein the first feed end and the second feed end are close to each other, so that when the first radiating source pole and the second radiating source pole are fed by the same source at the first feed end and the second feed end respectively, the first radiating source pole from the first feed end along the first radiating source pole is correspondingly coupled to the corresponding positions of the second radiating source pole from the second feed end along the second radiating source pole, so as to form the antithetical coupling arrangement between the first radiating source pole and the second radiating source pole.

Another object of the present invention is to provide a microwave-doppler detecting module and device thereof, wherein when the first radiating source pole and the second radiating source pole are fed by the same source at the first feed end and the second feed end respectively, the second radiating source pole and the first radiating source pole create a radiation space based on an antithetical coupling manner, wherein the radiation space is the coverage area of the electromagnetic wave radiated by the microwave-doppler detecting module, wherein the radiation space protrudes in the radial direction of the connection of the first feed end and the second feed end so as to avoid forming a detection dead zone in the direction, which facilitates to enhance the detecting stability and applicability of the microwave-doppler detecting module.

Another object of the present invention is to provide a microwave-doppler detecting module and device thereof, wherein the microwave-doppler detecting module further has an electromagnetic reflecting surface, wherein the first radiating source pole and the second radiating source pole are arranged spacingly to the electromagnetic reflecting surface in the space corresponding to the electromagnetic reflecting surface, so as to utilize the reflection characteristic of the electromagnetic reflecting surface relative to the electromagnetic wave to form the directional radiation characteristic of the microwave-doppler detecting module. Therefore, the microwave-doppler detecting module that is construct in an antithetically coupling manner can create the radiation space in a directional manner, so as to be suitable for sensing and detecting object activity in the directional space and to facilitate to avoid the microwave-doppler detecting module from self-activating, which enhances the anti-interference ability of the microwave-doppler detecting module.

Another object of the present invention is to provide a microwave-doppler detecting module and device thereof, wherein the first radiating source pole utilizes the first feed end as an end thereof and the second radiating source pole utilizes the second feed end as an end thereof, so that when the first radiating source pole and the second radiating source pole are fed by the same source at the first feed end and the second feed end respectively, the electric potentials and the electric currents of the first radiating source pole and the second radiating source pole are in an antithetical distribution state and simplified, which facilitates to simplify the data processing of the microwave-doppler detecting module and to enhance the stability of the microwave-doppler detecting module.

Another object of the present invention is to provide a microwave-doppler detecting module and device thereof, wherein based on the antithetical coupling arrangement, the shape and size of the second radiating source pole is corresponding to the shape and size of the first radiating source pole, so that the first radiating source pole and the second radiating source pole are free from the limit of the reference plane by a limited area, which means that the shapes and sizes of the first radiating source pole and the second radiating source pole allow various structural implementations rather than plant structure with restricted area, which facilitates to miniaturize the microwave-doppler detecting module and to enhance the applicability of the microwave-doppler detecting module.

Another object of the present invention is to provide a microwave-doppler detecting module and device thereof, wherein the shape and size of the first radiating source pole and the second radiating source pole are flexible and variable without being limited by the plant structure of restricted area, wherein the microwave-doppler detecting module is also adaptable for the application scenario of the microwave detection module of the above mentioned columnar radiation source structure through extending the first radiating source pole and the second radiating source pole to a corresponding metal plate, wherein comparing to the microwave detection module of columnar radiation source structure, the present microwave-doppler detecting module has better stability in the corresponding application scenario.

Another object of the present invention is to provide a microwave-doppler detecting module and device thereof, wherein by adjusting the shape of the second radiating source pole and the first radiating source pole, such as through bending and etc., the size of the microwave-doppler detecting module can be further reduced while the wire length requirements of the second radiating source pole from the second feed end along the second radiating source pole and the first radiating source pole from the first feed end along the first radiating source pole, which, namely, not only ensures the antithetical coupling of the second radiating source pole and the first radiating source pole, but also enhances the applicability of the microwave-doppler detecting module.

Another object of the present invention is to provide a microwave-doppler detecting module and device thereof, wherein by adjusting the shape of the second radiating source pole and the first radiating source pole, such as opposite extending the second radiating source pole and the first radiating source pole from the connection direction of the first feed point and the second feed point and concurrent extending them toward the direction close to the electromagnetic reflecting surface and etc., so as to form and construct conditions that the end of the first radiating source pole opposite to the first feed end is relatively closer to the electromagnetic reflecting surface comparing to the first feed end, and the end of the second radiating source pole opposite to the second feed end is relatively closer to the electromagnetic reflecting surface comparing to the second feed end, wherein the radiation space can correspondingly be adjusted into a condition that the projection thereof in the directional radiation direction is close to a round shape, which facilitates to enhance the applicability of the microwave-doppler detecting module in sensing and detecting of object activities in the directional space in various scenarios.

Another object of the present invention is to provide a microwave-doppler detecting module and device thereof, wherein the first radiating source pole and the second radiating source pole are further grounded, so as to reduce the impedance of the microwave-doppler detecting module, which means that the quality factor (Q value) of the microwave-doppler detecting module is increased, so as to facilitate the anti-interference ability of the microwave-doppler detecting module.

Another object of the present invention is to provide a microwave-doppler detecting module and device thereof, wherein the microwave-doppler detecting module further comprises a circuit board and a circuit unit loaded on the circuit board, wherein the circuit unit comprises an oscillation circuit module and a frequency mixing wave detection unit, wherein the first radiating source pole and the second radiating source pole are electrically coupled with different poles of the oscillation circuit module respectively at the first feed end and the second feed end. In which, the frequency mixing wave detection unit is electrically coupled with the oscillation circuit module and the antithetical dipoles, so that when the oscillation circuit module is powered, the first radiating source pole and the second radiating source pole are fed by the same source of the oscillation circuit module in a antithetical manner, so as to emit a sounding wave beam in a coupling manner and receive an echo of the sounding wave beam. The frequency mixing wave detection unit outputs an intermediate-frequency signal corresponding to the frequency difference between the sounding wave beam and the echo. Then, based on the Doppler Effect, the intermediate-frequency signal is corresponding to the movement of the object reflecting the sounding wave beam and producing the echo correspondingly. Hence, the microwave-doppler detecting module is suitable for sensing and detecting object movement.

Another object of the present invention is to provide a microwave-doppler detecting module and device thereof, wherein the electromagnetic reflecting surface is loaded on a side of the circuit board opposite to the side loading the circuit unit, which means that the electromagnetic reflecting surface faces toward the antithetical dipoles and obstructs between the circuit unit and the antithetical dipoles, so as to utilize the electromagnetic radiation reflection characteristic of the electromagnetic reflecting surface to obstruct the electromagnetic radiation produced by the coupling of the first radiating source pole and the second radiating source pole from interfering the circuit unit, which facilitates to enhance the anti-interference ability of the microwave-doppler detecting module.

Another object of the present invention is to provide a microwave-doppler detecting module and device thereof, wherein the microwave-doppler detecting module further comprises a first feeder wire and a second feeder wire, wherein the first radiating source pole is electrically coupled with the oscillation circuit module at the first feed end through the first feeder wire, wherein the second radiating source pole is electrically connected with the earth potential of the oscillation circuit module at the second feed end through the second feeder wire, so as to form and create a circuit connection relation that the first radiating source pole and the second radiating source pole are respectively electrically coupled with different poles of the oscillation circuit module at the first feed end and the second feed end respectively and to form and create a structural relation that utilizes the supports of the first feeder wire and the second feeder wire to the first radiating source pole and the second radiating source pole to arrange the antithetical dipoles spacingly to the electromagnetic reflecting surface in the space corresponding to the electromagnetic reflecting surface.

Another object of the present invention is to provide a microwave-doppler detecting module and device thereof, wherein the second feeder wire encircles the first feeder wire so as to form and create an electromagnetic shielding cavity, such that when the second feeder wire is grounded, the influence of the coupling between the second feeder wire and the first feeder wire to the coupling between the first radiating source pole and the second radiating source pole can be reduced and the interference of external electromagnetic radiation to the first feeder wire can be shielded, which facilitates to enhance the anti-interference ability of the microwave-doppler detecting module.

Another object of the present invention is to provide a microwave-doppler detecting module and device thereof, wherein the microwave-doppler detecting device comprises the microwave-doppler detecting module and have and an electromagnetic shielding layer, wherein the electromagnetic shielding layer has a through hole, wherein the circuit board is disposed in a shielded space corresponding to a side of the electromagnetic shielding layer, wherein the first radiating source pole and the second radiating source pole are disposed in another space corresponding to another side of the electromagnetic shielding layer, wherein the first feeder wire and the second feeder wire pass through the electromagnetic shielding layer through the through hole to form and construct the circuit connection structure among the first radiating source pole and the second radiating source pole and the circuit unit, so as to utilize the arrangement of the first radiating source pole and the second radiating source pole in a space outside of the shielded space to perform the activity sensing and detecting for the space outside of the shielded space. In which, thanks to the way of the antithetical coupling of the first radiating source pole and the second radiating source pole, the projected area of the first radiating source pole and the second radiating source pole in the direction perpendicular to the electromagnetic shielding layer can be reduced, which facilitates the stealth of the mounting of the microwave-doppler detecting device in the microwave-doppler detecting device and avoids a LED light board from creating a dark zone when the electromagnetic shielding layer is provided on the LED light board.

Another object of the present invention is to provide a microwave-doppler detecting module and device thereof, wherein the microwave-doppler detecting module is able to avoid detection dead zone based on the antithetical coupling arrangement thereof, that arrangement also reduces the size requirement of the microwave-doppler detecting module, which also facilitate to enhance the stealth and detecting stability of the microwave-doppler detecting module mounted in the microwave-doppler detecting device.

Another object of the present invention is to provide a side orientation bias-type microwave detection device and a strip light, wherein the structural design and performance parameters of the side orientation bias-type microwave detection device can match the strip light to achieve the simplified design of the strip light.

Another object of the present invention is to provide a side orientation bias-type microwave detection device and a strip light, wherein the strip light has a strip light board, wherein the strip light board is arranged with a light source side as an luminous surface thereof, such that the lighting direction of the strip light corresponds to the orientation of the light-emitting surface, wherein the structural design of the side orientation bias-type microwave detection device satisfies the state of being installed inside the strip light, and the directional radiation performance of the side orientation bias-type microwave detection device in the lighting direction of the strip light will not be destroyed based on the blocking of the strip light, the strip light in the lighting state will not form a dark area according to the installation of the side orientation bias-type microwave detection device installation to form a dark area, so as to achieve the matching relationship between the structural design and performance parameters of the side orientation bias-type microwave detection device and the strip light, and thus to achieve the simplified design of the strip light while the side orientation bias-type microwave detection device being installed inside of the strip light.

Another object of the present invention is to provide a side orientation bias-type microwave detection device and a strip light, wherein the side orientation bias-type microwave detection device comprises an antenna unit, wherein the antenna unit comprises a reference ground surface and a pair of antithetical dipoles provided in a side orientation of the reference ground surface to form a directioned radiation direction of the antenna unit in a feeding state in the reference ground orientation of the antenna unit, so that while the antenna unit is in the feed state, forming a directed radiation direction of the antenna unit towards the orientation of reference ground surface, as well as based on the coupling between the pair of the antithetical dipoles to reduce the dependence of the directed radiation characteristics of the antenna unit on the area of the reference ground surface, and based on the structural relationship of the pair of the antithetical dipoles being disposed in a lateral orientation of the reference ground surface, the antenna unit can be hidden in the reference ground surface on the back of the light-emitting surface of the strip light board, and the pair of the antithetical dipoles is installed in the strip light while extending from a side of the strip light board, so as to achieve the structural design and performance parameters of the side orientation bias-type microwave detection device and the strip light matching relationship to achieve the simplified design of the strip light.

Another object of the present invention is to provide a side orientation bias-type microwave detection device and a strip light, wherein while the pair of the antithetical dipoles is disposed at a side orientation of the reference ground surface, the depletion of the antenna unit can be maintained in a low condition, so that the self-excitation interference according to the strong reflection and multipath reflection is avoided, under a favor condition that favors by reducing sensitivity, while the antenna unit is mounted inside the strip light and is close to the strip light board and the shell of the strip light.

Another object of the present invention is to provide a side orientation bias-type microwave detection device and a strip light, wherein the pair of the antithetical dipoles includes a first radiating source pole and a second radiating source pole. The first radiating source pole has a first feed end and the second radiating source pole has a second feed end, wherein the first radiating source pole is arranged as a conductor extending at an end of the first feed end and the second radiating source pole is arranged as a conductor extending at the end of the second feed end, wherein the first feed end and the second feed end preferably satisfy a connection between a midpoint of a connection segment of a projection point of the reference ground surface and a physical center point of the reference ground perpendicular to an initial extension direction of the first radiating source pole and the second radiating source pole. Accordingly, while the pair of the antithetical dipoles are arranged in a side orientation of the reference ground surface, a balanced distribution of the reference ground surface in the initial extension direction of the first radiating source pole and the second radiating source pole is ensured, and, correspondingly, a balanced distribution of the radiation pattern of the antenna unit is ensured and the radiation of the antenna unit in an opposite space of the directed radiation direction is suppressed, as to suppress a self-excited interference based on strong reflection and multipath reflection.

Another object of the present invention is to provide a side orientation bias-type microwave detection device and a strip light, wherein the first feed end and the second feed end extend through the physical center point of the reference ground surface in the connection segment of the projection point of the reference ground surface, wherein the first radiating source pole and the second radiating source pole have a dislocation reverse initial extension direction perpendicular to a direction of the connection segment, respectively, wherein the first radiating source pole and the second radiating source pole which are terminated by the first feed end and the second feed end have a dislocation reverse initial extension direction perpendicular to the direction of the connection segment. Accordingly, in a state in which the pair of the antithetical dipoles is disposed in the lateral orientation of the reference ground surface, the balanced distribution of the reference ground surface in the initial extension direction of the first radiating source pole and the second radiating source pole or is ensured, and, correspondingly, the balanced distribution of the radiation pattern of the antenna unit is ensured and the radiation of the antenna unit in the opposite space of the directional radiation direction is suppressed, so as to suppress the self-excited interference based on strong reflection and multipath reflection.

Another object of the present invention is to provide a side orientation bias-type microwave detection device and a strip light, wherein the first feed end and the second feed end pass through the physical center point of the reference ground surface in the middle perpendicular line of the connection segment of the projection point of the reference ground surface, wherein the first radiating source pole and the second radiating source pole have an initial extension direction opposite in a direction of the connection segment with the first feed terminal and the second feeding terminal as an terminal, respectively, so that in a state that the pair of the antithetical dipoles is disposed in the lateral orientation of the reference ground surface, the balanced distribution of the reference ground in the initial extension direction of the first radiating source pole and the second radiating source pole is ensured, and, correspondingly, the balanced distribution of the radiation pattern of the antenna unit is ensured the radiation of the antenna element in the direction of directional radiation in the opposite space is suppressed, so as to suppress the self-excited interference based on strong reflection and multipath reflection.

Another object of the present invention is to provide a side orientation bias-type microwave detection device and a strip light, wherein the strip light further comprises an elongated strip like lightshade and a strip like shell, wherein the strip light board is disposed with an luminous surface thereof facing the lampshade, wherein a forward space is defined between the strip light board and the lampshade and a backward space is defined between the strip light board and the shell, wherein based on the structural relationship of the pair of the antithetical dipoles being disposed in the lateral orientation of the reference ground surface, the antenna unit is arranged in such a manner that the reference ground surface is located in the backward space and the pair of antithetical dipoles is extended out at a side of the strip light board and located in the forward space, corresponding to the condition that the antenna unit is installed inside the strip light, so as to achieve a matching relationship between the structural design and performance parameters of the side orientation bias-type microwave detection device and the strip light to accomplish the simplified design of the strip lamp.

Another object of the present invention is to provide a side orientation bias-type microwave detection device and a strip light, wherein the strip light further comprises a light board carrier, wherein the light board carrier is installed between the forward space and the backward space in the lightshade or the shell, wherein the strip light board is carried in the light board carrier while its luminous surface facing the lampshade, wherein the antenna unit is arranged in such a manner that the reference ground surface is located in the backward space and the pair of antithetical dipoles, passing through the light board carrier and extending out at a side of the strip light board, is located in the forward space, so as to meet the aforementioned matching relationship to accomplish the installation of the antenna unit inside the strip light.

Another object of the present invention is to provide a side orientation bias-type microwave detection device and a strip light, wherein the side orientation bias-type microwave detection device further comprises a housing defining a receiving cavity therein, wherein a protrusion portion protruded on the housing and a concave slot defined in the receiving cavity corresponding to the protrusion portion, wherein the antenna unit is accommodated in the receiving cavity while the pair of the antithetical dipoles is located in the concave slot, wherein the housing is mounted on the lamp board carrier while the protrusion portion, passing through the light board carrier on a side of the strip light board, is located in the forward space, so as to meet the aforementioned matching relationship to accomplish the installation of the side orientation bias-type microwave detection device inside the strip light.

Another object of the present invention is to provide a side orientation bias-type microwave detection device and a strip light, wherein the protrusion portion of the housing is transparently disposed so that the protrusion portion passes through the light board carrier at a side of the strip light board and is located in the forward space, so as to ensure that the strip light in the lighting state does not form a dark area based on the installation of the side orientation bias-type microwave detection device, and, corresponding, to ensure the matching relationship between the structural design and performance parameters of the side orientation bias-type microwave detection device and the strip light.

According to an aspect of the present invention, the present invention provides a microwave-doppler detecting module, which includes:

at least one pair of antithetical dipoles, wherein each pair of the antithetical dipoles comprises a first radiating source pole and a second radiating source pole, wherein the first radiating source pole has a first feed end and is arranged as a conductor extended from the first feed end as an end thereof, wherein the second radiating source pole has a second feed end and is arranged as a conductor extended from the second feed end as an end thereof, wherein the first radiating source pole and the second radiating source pole are adapted for being fed by the same excitation signal feed source at the first feed end and the second feed end respectively, wherein the first feed end and the second feed end approach each other within a range smaller than or equal to $\lambda/32$, wherein $\lambda$ is the wavelength parameter corresponding to the feed signal frequency of the excitation signal feed source, wherein the first radiating source pole is configured to satisfy to have a length greater than or equal to $\lambda/16$ from the first feed end, wherein the second radiating source pole is configured to satisfy to have a length greater than or equal to $\lambda/16$ from the second feed end, so as to allow the current and potential distribution of the first radiating source pole and the second radiating source pole to be presented in an antithetical distribution state to the midpoint of the connection of the first feed end and the second feed end when the first radiating source pole and the second radiating source pole are fed by the same excitation signal feed source at the first feed end and the second feed end respectively, so as to correspondingly couple the first radiating source pole from the first feed end along the first radiating source pole with the corresponding positions of the second radiating source pole from the second feed end along the second radiating source pole; and an electromagnetic reflecting surface, wherein the antithetical dipoles are arranged spacingly to the electromagnetic reflecting surface in the space corresponding to the electromagnetic reflecting surface, wherein the distance between the electromagnetic reflecting surface and the midpoint of the connection of the first feed end and the second feed end is greater than or equal to $\lambda/32$ and smaller than or equal to $\lambda/2$.

According to another aspect of the present invention another, the present invention also provides a microwave-doppler detecting device, which includes:

a circuit unit, which comprises an oscillation circuit module and a frequency mixing wave detection unit, wherein the oscillation circuit module is configured to be adapted for being powered to output a feed signal from the feeder pole thereof and being grounded at the grounding pole thereof for being an excitation signal feed source;

a circuit board, wherein the circuit unit is loaded on the circuit board;

an electromagnetic shielding layer, which has a through hole, wherein the circuit unit is arranged in a space corresponding to a side of the electromagnetic shielding layer; and at least one pair of antithetical dipoles, wherein the antithetical dipoles are disposed in a space corresponding to another side of the electromagnetic shielding layer, wherein the pair of antithetical dipoles comprise a first radiating source pole and a second radiating source pole, wherein the first radiating source pole has a first feed end and is arranged as a conductor extended from the first feed end as an end thereof, wherein the second radiating source pole has a second feed end and is arranged as a conductor extended from the second feed end as an end thereof, wherein the frequency mixing wave detection unit is electrically coupled with the oscillation circuit module and the antithetical dipoles, wherein the first radiating source pole is electrically coupled with the feeder pole of the oscillation circuit module through a first feeder wire penetrating the electromagnetic shielding layer through the through hole at the first feed end, wherein the second radiating source pole is electrically connected with the grounding pole of the oscillation circuit module through a second feeder wire penetrating the electromagnetic shielding layer through the through hole at the second feed end, wherein the first feed end and the second feed end approach each other within a range smaller than or equal to $\lambda/32$, wherein $\lambda$ is the wavelength parameter corresponding to the frequency of the feed signal, wherein the first radiating source pole is configured to satisfy to have a length greater than or equal to $\lambda/16$ from the first feed end, wherein the second radiating source pole is configured to satisfy to have a length greater than or equal to $\lambda/16$ from the second feed end, so as to allow the potential distribution of the first radiating source pole and the second radiating source pole to present an antithetical distribution state to the midpoint of the connection of the first feed end and the second feed end, so as to correspondingly couple the first radiating source pole from the first feed end along the first radiating source pole with the corresponding positions of the second radiating source pole from the second feed end along the second radiating source pole.

According to another aspect of the present invention, the present invention provides a side orientation bias-type microwave detection device, comprising:

an antenna unit, which comprises a reference ground surface and a pair of antithetical poles provided in a lateral orientation of the reference ground to define a directed radiation direction of the antenna unit towards an orientation of the reference ground surface while the antenna unit is fed by a corresponding feed signal, wherein the pair of the antithetical dipoles comprises a first radiating source pole or and a second radiating source pole, wherein the first radiating source pole has a first feed end and the second radiator has a second feed end, wherein the first radiating source pole is arranged as a conductor extending at an end of the first feed end and the second radiation pole is arranged as a conductor extending at an end of the second feed end, wherein the first radiating source pole has a length greater than or equal to $\lambda/16$ from the first feed end and the second radiating source pole has a length greater than or equal to $\lambda/16$ from the second feed end, wherein the second feed end and the first feed end approach each other and satisfy that a distance between the second feed end and the first feed end is less than or equal to $\lambda/4$, and satisfying that a distance between the first and second feed ends and the reference ground surface is greater than or equal to $\lambda/32$, wherein $\lambda$ is a wavelength parameter corresponding to a frequency of the feed signal, wherein corresponding to a structural relationship of the pair of the antithetical dipoles being disposed in a lateral orientation of the reference ground surface, the pair of the antithetical dipoles is arranged in such a manner that a connection segment of the first feed end and the second feed end at a projection point of the reference ground surface deviates from a physical center point of the reference ground surface; and a housing which has a receiving cavity defined therein, a protrusion portion protruded thereon and a concave slot defined from the receiving cavity corresponding to the protrusion portion, wherein the antenna unit is accommodated in the receiving cavity while the pair of the antithetical dipoles is located in the concave slot.

In one embodiment, the first radiating source pole and the second radiating source pole extend in an initial extension direction far from each other with the first feed end and the second feed end as an end, respectively, wherein the first feed end and the second feed end are connected to a physical center point of the reference ground surface at a midpoint of the connection segment of the projection point of the reference ground surface perpendicular to the initial extension direction of the first radiating source pole and the second radiating source pole.

In one embodiment, the first feed end and the second feed end extend through the physical center point of the reference ground surface in the connection segment of the projection point of the reference ground surface, wherein the first radiating source pole and the second radiating source pole have a dislocation reverse initial extension direction perpendicular to the direction of the connection segment, respectively In one embodiment, the first feed end and the second feed end pass through the physical center point of the reference ground surface in the mid-perpendicular line of the connection segment of the projection point of the reference ground surface, wherein the first radiating source pole which has the first feed end as an end and the second radiating source pole which has the second feed end as an end have an initial extension direction that is opposite to the direction of the connection segment, respectively.

In one embodiment, the antenna unit further comprises a first feeder wire and a second feeder wire, wherein the first radiating source pole at the first feed end is electrically coupled to one pole of the corresponding feed source via the first feeder wire, wherein the second radiating source pole is electrically connected to the other pole of the feed source through the second feeder wire by the second feed end, so as to form an electrical feed connection relationship between a pair of antithetical poles and the feed source.

In one embodiment, the antenna unit further comprises a circuit board, wherein the reference ground surface is carried on the circuit board in form of a copper cladding layer, the first feeder wire and the second feeder wire are fixed to the circuit board in the form of pins.

In one embodiment, the second radiating source pole is electrically connected with the reference ground surface while the second feeder wire is fixed at the circuit board, so as to form an electrical connection relationship between the corresponding ground poles of the feed source.

In one embodiment, the first feeder wire and the second feeder wire have parallel segments extending in parallel from the first feed end and the second feed end in a direction adjacent to the reference ground surface, respectively, so as to be able to transmit the feed parallelly, such that a distance between the parallel segments corresponding to a distance between the first feeder wire and the second feeder wire satisfy a range less than or equal to $\lambda/4$.

In one embodiment, the first feeder wire and the second feeder wire, corresponding respectively to a side of the parallel segment adjacent to the reference ground surface in a direction of being far away from each other and in a direction adjacent to the reference ground surface, extend a first feeder wire and a second feeder wire respectively.

In one embodiment, a distance between the first feed end and the reference ground surface is greater than a distance between an end of the first radiating source pole, that is opposing to the first feed end, and the reference ground surface, and that a distance between the second feed end and the reference ground surface is greater than a distance between an end of the second radiating source pole, that is opposing to the second feed end, and the reference ground surface.

In one embodiment, the first radiating source pole and the second radiating source pole are extended sequentially from the first feed end and the second feed end respectively in a direction away from each other and in a direction close to the reference ground surface.

In one embodiment, the antenna unit further comprises a circuit board and an antenna plate fixed to the circuit board, wherein the reference ground surface is carried on the circuit substrate in the form of a copper cladding layer, and the pair of the antithetical poles and the first feeder wire and the second feeder wire are carried on the antenna plate in the form of on-board conductors.

According to another aspect of the present invention, the present invention also provides a strip light, comprising:

a strip light board, which light-emitting side is arranged as a light-emitting surface, such that an illumination direction of the strip light is corresponding to an orientation of the light-emitting surface a strip-like lightshade;

a strip-like shell, wherein the strip light board is arranged in such a manner that light-emitting surface thereof is facing the lightshade so as to form a forward space defined between the strip light board and the lightshade and a backward space defined between the strip light board and the shell; and an antenna unit, which comprises a reference ground surface and a pair of antithetical poles provided in a lateral orientation of the reference ground surface, so as to form a directed radiation direction of the antenna unit while the antenna unit is fed by a corresponding feed signal, wherein the pair of the antithetical poles includes a first radiating source pole and a second radiating source pole, wherein the first radiating source pole has a first feed end and the second radiating source pole has a second feed end, wherein the first radiating source pole is arranged as a conductor extending at an end of the first feed end and the second radiating source pole is arranged as a conductor extending at an end of the second feed end, wherein the antenna unit is arranged to locate in the forward space while the reference ground surface locating in the backward space and the pair of the antithetical poles is extending out at a side of the strip light board.

In one embodiment, the strip light further comprises a light board carrier, wherein the light board carrier is installed in the lightshade or the shell in such a manner that the light board carrier is defined between the forward space and the backward space, wherein the strip light board is carried at the light board carrier while its light-emitting surface facing the lightshade, wherein the antenna unit is arranged in such a manner that the reference ground surface is located in the backward space while the pair of the antithetical poles passing through the light board carrier is extended out at a side of the strip light board and located in the forward space.

In one embodiment, a side of the strip light board that the pair of the antithetical poles extending out has an indented edge groove, so as not to reserve a space for the pari or the antithetical poles without increasing a width of the lamp board carrier.

In one embodiment, the strip light further comprises the shell having a receiving cavity defined therein, wherein the shell has an protrusion portion protruded therefrom and the receiving cavity has a concave slot defined therein corresponding to the protrusion portion, wherein the antenna unit is accommodated in the receiving cavity while the pair of the antithetical poles are positioned in the protrusion groove, wherein the shell is installed on the lamp board carrier such that the protrusion portion passing through the light board carrier at the side of the strip board plate and locating in the forward space.

In one embodiment, the protrusion portion of the shell is made transparent.

In one embodiment, the light board carrier has an installation hole and a perforation for the protrusion portion to pass through, wherein the shell is fixed to the installation hole by a threaded connection at one end of the shell while the other end of the shell is engaged with an edge of the perforation.

In one embodiment, the lightshade is designed as a functional slot that has at least a function of matching to homogenization, astigmatism and spot light along a longitudinal length thereof Still further objects and advantages will become apparent from a consideration of the ensuing description and drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Figure 1A:
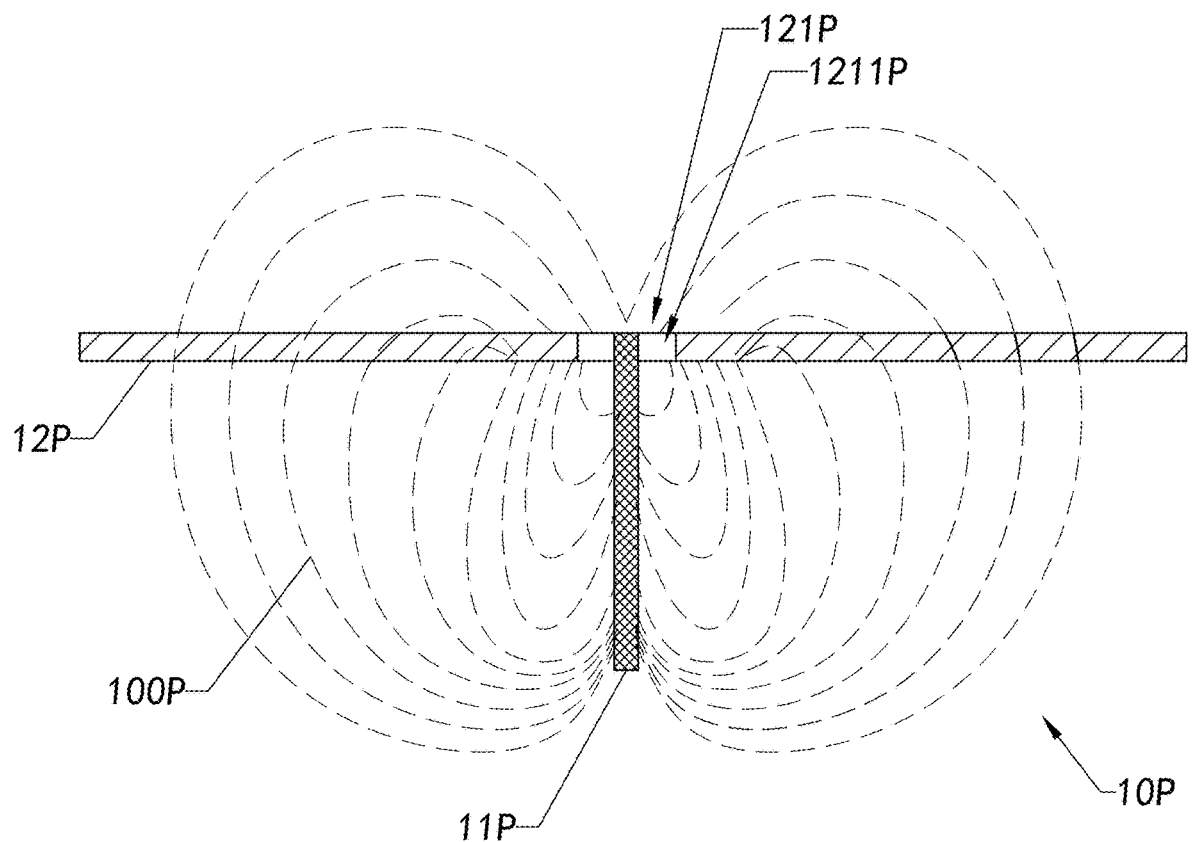
FIG. 1A is a perspective view illustrating the structure and principle of the microwave detection module of the conventional columnar radiation source structure.
Figure 1B:
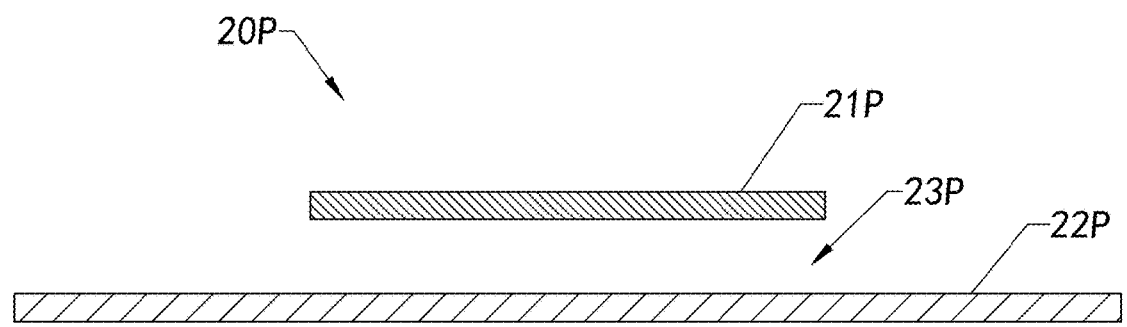
FIG. 1B is a perspective view illustrating the structure and principle of the microwave detection module of the conventional flat radiation source structure.
Figure 2:
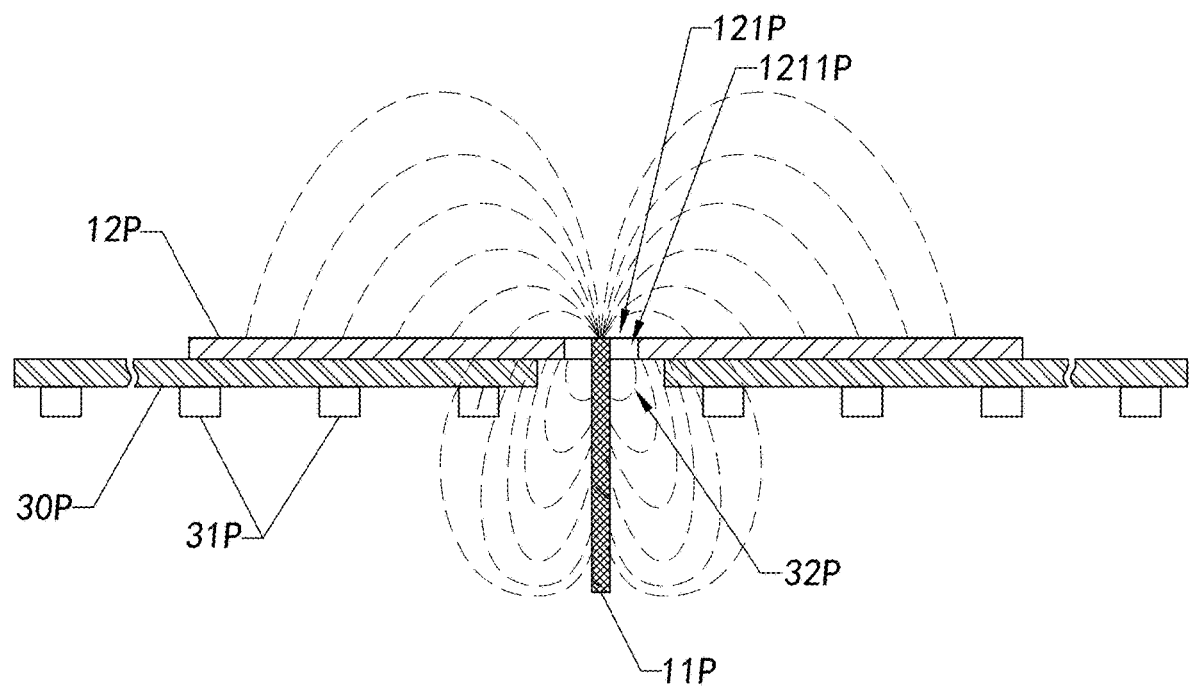
FIG. 2 is a perspective view illustrating the installation structure of the microwave detection module of the conventional columnar radiation source structure mounted on a LED light board.
Figure 3:
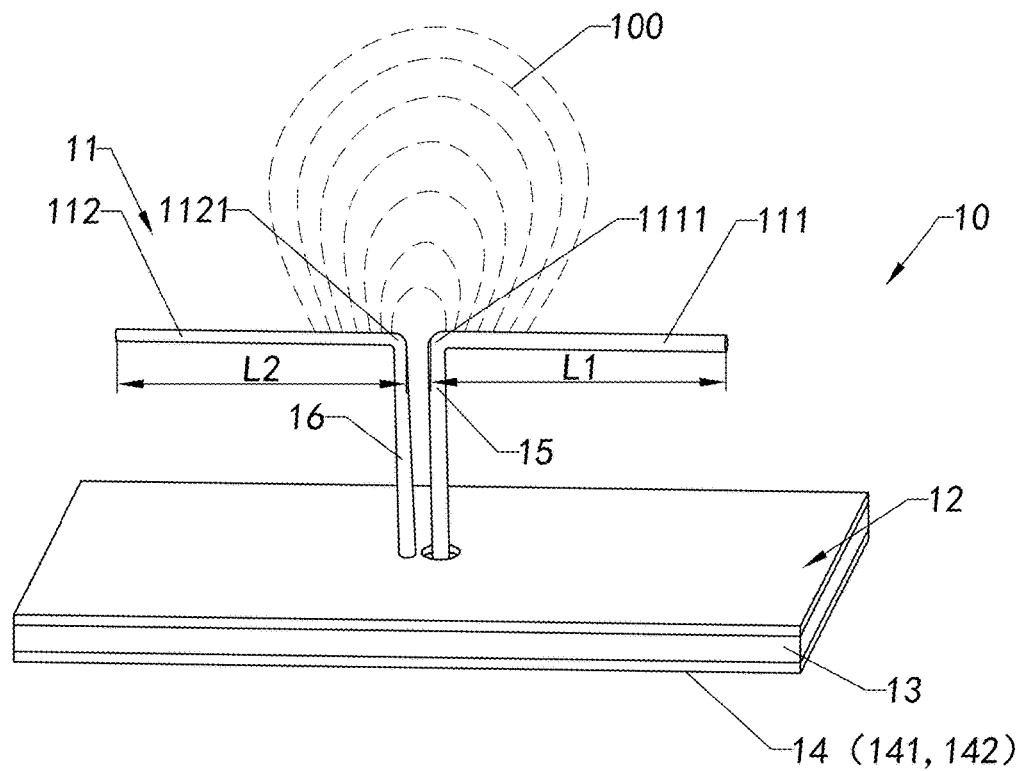
FIG. 3 is a perspective view illustrating a three-dimensional structure of a microwave-doppler detecting module according to a preferred embodiment of the present invention.

Referring to FIG. 3 of the drawings, a 3D structure of a microwave-doppler detecting module 10 according to a preferred embodiment of the present invention is illustrated, wherein the microwave-doppler detecting module 10 comprises at least one pair of antithetical dipoles 11, wherein the pair of the antithetical dipoles 11 comprises a first radiating source pole 111 and a second radiating source pole 112, wherein the second radiating source pole 112 has a second feed end 1121 while the first radiating source pole 111 has a first feed end 1111, wherein the second feed end 1121 and the first feed end 1111 are close to each other, wherein the second radiating source pole 112 is a conductor extended from the second feed end 1121 as an end, while the first radiating source pole 111 is a conductor extended from the first feed end 1111 as an end. In which, the first radiating source pole 111 and the second radiating source pole 112 are configured to be adapted for being fed by the same source at the first feed end 1111 and the second feed end 1121 respectively, wherein the second feed end 1121 and the first feed end 1111 are close to each other and satisfy that a distance between the second feed end 1121 and the first feed end 1111 is smaller than or equal to $\lambda/32$, wherein $\lambda$ is the wavelength parameter corresponding to the feed signal frequency. Accordingly, when the first radiating source pole 111 and the second radiating source pole 112 are fed by the same source at the first feed end 1111 and the second feed end 1121 respectively, the first radiating source pole 111, from the first feed end 1111 along the first radiating source pole 111, is correspondingly coupled to the corresponding positions of the second feed end 1121 of the second radiating source pole 112 along the second radiating source pole 112, so as to form the antithetical coupling arrangement between the first radiating source pole 111 and the second radiating source pole 112.

It is worth mentioning that, based on the antithetical coupling between the first radiating source pole 111 and the second radiating source pole 112, a size requirement for the second radiating source pole 112 and the first radiating source pole 111 to couple with each other can be reduced. Specifically, the second radiating source pole 112 and the first radiating source pole 111 are configured to satisfy that the lengths respectively from the second feed end 1121 and the first feed end 1111 are greater than or equal to $\lambda/16$. In other words, the first radiating source pole 111 is configured to satisfy that the first feed end 1111 and the end opposite to the first feed end 1111 has a length therebetween greater than or equal to $\lambda/16$, wherein the second radiating source pole 112 is configured to satisfy that the second feed end 1121 and the end opposite to the second feed end 1121 has a length therebetween greater than or equal to $\lambda/16$. In other words, the first radiating source pole 111 and the second radiating source pole 112 allow a minimum length of $\lambda/16$ from the first feed end 1111 and the second feed end 1121.

Preferably, the distance between the second feed end 1121 and the first feed end 1111 is close to $\lambda/128$, so as to reduce the depletion in the coupling between the first radiating source pole 111 and the second radiating source pole 112 and correspondingly enhance the gain of the microwave-doppler detecting module 10.

In particular, according to the disclosure of the preferred embodiment of the present invention, the microwave-doppler detecting module 10 is embodied as example to feedably connect the first radiating source pole 111 and the second radiating source pole 112 at the first feed end 1111 and the second feed end 1121 respectively with different poles of the same excitation signal feed source so as to be fed by the same source.

Specifically, according to this embodiment of the present invention, the first radiating source pole 111 is feedably connected with the feeder pole of the excitation signal feed source at the first feed end 1111 and the second radiating source pole 112 is electrically connected with the grounding pole of the excitation signal feed source at the second feed end 1121 so as to be fed by the same source of the excitation signal feed source with the first radiating source pole 111, wherein the first radiating source pole 111 from the first feed end 1111 along the first radiating source pole 111 is correspondingly coupled with the corresponding positions of the second radiating source pole 112 from the second feed end 1121 along the second radiating source pole 112 so as to form and create a radiation space 100, wherein the radiation space 100 is the coverage area of the electromagnetic wave radiated by the microwave-doppler detecting module 10. In which, because the first radiating source pole 111 from the first feed end 1111 along the first radiating source pole 111 is correspondingly coupled with the corresponding positions of the second radiating source pole 112 from the second feed end 1121 along the second radiating source pole 112, so that the radiation space 100 formed through the antithetical coupling manner can protrude in a radial direction of the connection of the first feed end 1111 and the second feed end 1121 so as to avoid forming a detection dead zone in such direction, which facilitates to enhance the detecting stability and applicability of the microwave-doppler detecting module 10.

Further, the microwave-doppler detecting module 10 has an electromagnetic reflecting surface 12, wherein the first radiating source pole 111 and the second radiating source pole 112 are arranged spacingly to the electromagnetic reflecting surface 12 in the space corresponding to the electromagnetic reflecting surface 12, so as to utilize the reflection characteristic of the electromagnetic reflecting surface 12 relative to the electromagnetic wave to form the directional radiation characteristic of the microwave-doppler detecting module 10. Therefore, the microwave-doppler detecting module 10 is suitable for sensing and detecting object activity in the directional space and facilitates to avoid the microwave-doppler detecting module 10 from self-activating, which enhances the anti-interference ability of the microwave-doppler detecting module 10.

In particular, the electromagnetic reflecting surface 12 is configured to satisfy that the distance thereto from the midpoint of the connection of the first feed end 1111 and the second feed end 1121 is greater than or equal to $\lambda/32$ and smaller than or equal to $\lambda/2$ and, preferably, close to $\lambda/4$. Therefore, the reflex action of the electromagnetic reflecting surface 12 for the radiation in the direction from the first radiating source pole 111 and the second radiating source pole 112 to the electromagnetic reflecting surface 12 can be enhanced, so as to facilitate to extent the detecting distance of the microwave-doppler detecting module 10.

Further, based on the structural relations that the first feed end 1111 and the second feed end 1121 close to each other, the first radiating source pole 111 is extended from the first feed end 1111 as an end, and the second radiating source pole 112 is extended from the second feed end 1121 as an end, the first radiating source pole 111 and the second radiating source pole are able to be coupled with each other in an antithetical coupling manner. Correspondingly, the wire length of the second radiating source pole 112 is corresponding to the wire length of the first radiating source pole 111, so that the second radiating source pole 112 is able to be free from the limit of the reference plane of a restricted minimum area, which means that the wire length of the second radiating source pole 112 corresponding to that of the first radiating source pole 111 may have various structural implementations rather than a plane structure with restricted minimum area. That is the structure of the microwave-doppler detecting module 10 is diverse, which facilitates to enhance the applicability of the microwave-doppler detecting module 10.

Specifically, according to this embodiment of the present invention, the wire length of the second radiating source pole 112 corresponding to the first radiating source pole 111 is configured to be a columnar conductive wire, which may be, but not limited to, round columnar conductive wire, square columnar conductive wire, and etc., wherein the wire length parameter L2 of the second radiating source pole 112 defined between the second feed end 1121 and the end opposite to the second feed end 1121 satisfies that $\lambda/16 \leq L2 \leq \lambda$. Correspondingly, wire length parameter L1 defined on the first radiating source pole 111 between the first feed end 1111 and the end opposite to the first feed end 1111 satisfies that $\lambda/16 \leq L1 \leq \lambda$. In this way, the second radiating source pole 112 can be grounded at the second feed end 1121 as an end thereof, so that when the first radiating source pole 111 is fed at the first feed end 1111 as an end thereof, the first radiating source pole 111 and the second radiating source pole 112 can be coupled in an antithetical coupling manner.

Preferably, the second radiating source pole 112 and the first radiating source pole 111 are configured to satisfy that the wire lengths thereof from the second feed end 1121 and the first feed end 1111 respectively are close to $\lambda/4$ within an error range of $\lambda/128$, which means $31\lambda/128 \leq L1 \leq 33\lambda/128$ and $31\lambda/128 \leq L2 \leq 33\lambda/128$. As a result, the first radiating source pole 111 and the second radiating source pole 112 have wire lengths close to $\lambda/2$, which facilitates to enhance the radiation efficiency between the first radiating source pole 111 and the second radiating source pole 112 and correspondingly facilitates to enhance the gain of the microwave-doppler detecting module 10.

Further, according to this embodiment of the present invention, the first radiating source pole 111 and the second radiating source pole 112 are disposed symmetrically to the midpoint of the connection of the first feed end 1111 and the second feed end 1121. Namely, the first radiating source pole 111 and the second radiating source pole 112 have the same shape and size and the positional relation between the first radiating source pole 111 and the second radiating source pole 112 satisfies that the first radiating source pole 111 is able to surround around the midpoint of the connection of the first feed end 1111 and the second feed end 1121 to turn 180 degrees for at least one direction and to be overlapped with the position of the second radiating source pole 112. Accordingly, this facilitates to ensure the coupling between the second radiating source pole 112 and the first radiating source pole 111 in an antithetical manner as well as facilitates to maintain the symmetry of the radiation space 100, which correspondingly maintain the stability of the detection range of the microwave-doppler detecting module 10.

Specifically, according to this embodiment of the present invention, the first radiating source pole 111 and the second radiating source pole 112 being configured to be columnar conductive wires are coaxially arranged. In other words, the first radiating source pole 111 is continually extended from the second feed end 1121 toward the first feed end 1111 and from the first feed end 1111 as an end along the connection of the first feed end 1111 to the second feed end 1121. The second radiating source pole 112 is continually extended from the first feed end 1111 toward the second feed end 1121 and from the second feed end 1121 as an end toward the connection of the first feed end 1111 to the second feed end 1121. Accordingly, the structural relation that the first radiating source pole 111 and the second radiating source pole 112 are disposed symmetrically to the midpoint of the connection of the first feed end 1111 and the second feed end 1121.

Further, the microwave-doppler detecting module 10 also comprises a circuit board 13 and a circuit unit 14 loaded on the circuit board 13, wherein the circuit unit 14 comprises a oscillation circuit module 141 and a frequency mixing wave detection unit 142, wherein the first radiating source pole 111 and the second radiating source pole 112 are electrically coupled with different poles of the oscillation circuit module 141 respectively at the first feed end 1111 and the second feed end 1121. Specifically, the first radiating source pole 111 is feedably connected with the feeder pole of the oscillation circuit module 141 at the first feed end 1111, while the second radiating source pole 112 is electrically connected with the grounding pole of the oscillation circuit module 141 at the second feed end 1121. In which, the frequency mixing wave detection unit 142 is electrically coupled with the oscillation circuit module 141 and the antithetical dipoles 11, wherein the oscillation circuit module 141 is allowed to be powered to output a feed signal from the feeder pole thereof and to ground the grounding pole thereof. In other words, the oscillation circuit module 141 is allowed to be powered so as to be an excitation signal feed source, such that when the oscillation circuit module 141 is powered, the first radiating source pole 111 and the second radiating source pole 112 are fed by the same source of the oscillation circuit module 141 at the first feed end 1111 and the second feed end 1121 respectively, so as to emit a sounding wave beam and receive an echo of the sounding wave beam. In which, an echo signal is generated correspondingly to the receiving of the echo. The frequency mixing wave detection unit 142 outputs an intermediate-frequency signal corresponding to the frequency difference between the feed signal and the echo signal. Then, based on the Doppler Effect, the intermediate-frequency signal is corresponding to the movement of the object reflecting the sounding wave beam and producing the echo correspondingly. Hence, the microwave-doppler detecting module is suitable for sensing and detecting object movement.

It is worth mentioning that the first radiating source pole 111 and the second radiating source pole 112 respectively utilize the first feed end 1111 and the second feed end 1121 as the ends thereof so that when the first radiating source pole 111 and the second radiating source pole 112 are fed by the same source at the first feed end 1111 and the second feed end 1121 respectively, the electric potentials and the electric currents of the first radiating source pole 111 the second radiating source pole 112 are in an antithetical distribution state, which is corresponding to the antithetical coupling between the second radiating source pole 112 and the first radiating source pole 111. Namely, the coupling between the second radiating source pole 112 and the first radiating source pole 111 is simplified. Therefore, the corresponding data processing of the microwave-doppler detecting module 10 can be simplified as well, such as that the correlations between the intermediate-frequency signal output by the frequency mixing wave detection unit 142 and the corresponding object movement is increased, so as to simplify the corresponding data processing of the microwave-doppler detecting module 10. This facilitates to lower the costs of the microwave-doppler detecting module 10 and increase the stability and accuracy of the microwave-doppler detecting module 10.

In particular, according to this embodiment of the present invention, the electromagnetic reflecting surface 12 is obstructed between the circuit unit 14 and the first radiating source pole 111 and the second radiating source pole 112, so that the electromagnetic radiation produced by the coupling of the first radiating source pole 111 and the second radiating source pole 112 radiated from the first radiating source pole 111 and the second radiating source pole 112 toward the circuit unit 14 can be reflected by the electromagnetic reflecting surface 12 in order to avoid interference to the circuit unit 14, which facilitates to enhance the anti-interference ability of the microwave-doppler detecting module 10.

Specifically, according to this embodiment of the present invention, the electromagnetic reflecting surface 12 is loaded on the side of the circuit board 13 opposite to the side loading the circuit unit 14. In other words, the electromagnetic reflecting surface 12 is formed on a corresponding conductive layer (e.g. copper layer and etc.) on the side of the circuit board 13 opposite to the side loading the circuit unit 14. In which, the first radiating source pole 111 and the second radiating source pole 112 are arranged spacingly to the electromagnetic reflecting surface 12 in the space corresponding to the electromagnetic reflecting surface 12, so as to utilize the electromagnetic wave reflection characteristic of the electromagnetic reflecting surface 12 and the structural relation that the first radiating source pole 111 and the second radiating source pole 112 are arranged spacingly to the electromagnetic reflecting surface 12 in the space corresponding to the electromagnetic reflecting surface 12 to create a directional radiation characteristic of the microwave-doppler detecting module 10 from the electromagnetic reflecting surface 12 toward the directions of the first radiating source pole 111 and the second radiating source pole 112. In other words, it correspondingly creates the sensing direction of the microwave-doppler detecting module 10 from the electromagnetic reflecting surface 12 toward the directions of the first radiating source pole 111 and the second radiating source pole 112, so that the microwave-doppler detecting module 10 is adapted for detecting and sensing the object activity in the directional space corresponding to the sensing direction. Besides, it also facilitates to avoid the microwave-doppler detecting module 10 from self-activating and avoid the electromagnetic radiation produced from the coupling between the first radiating source pole 111 and the second radiating source pole 112 from interfering the circuit unit 14 loaded on the circuit board 13, so as to enhance the anti-interference ability of the microwave-doppler detecting module.

In other words, based on the antithetical coupling mode between the first radiating source pole 111 and the second radiating source pole 112, the microwave-doppler detecting module 10 has a radiation direction corresponding to the radial direction of the connection of the first feed end 1111 and the second feed end 1121, so that when the electromagnetic reflecting surface 12 is provided at the radiation direction, the radiation from the first radiating source pole 111 and the second radiating source pole 112 toward the electromagnetic reflecting surface 12 can be reflected to construct the sensing direction of the microwave-doppler detecting module 10 from the electromagnetic reflecting surface 12 toward the first radiating source pole 111 and the second radiating source pole 112 as well as to enhance the electromagnetic radiation of the sensing direction, which facilitates to enhance the directional detection range of the microwave-doppler detecting module 10.

In particular, the electromagnetic reflecting surface 12 is preferably configured to satisfy that the size thereof parallel to the direction of the connection of the first feed end 1111 and the second feed end 1121 is greater than or equal to $\lambda/4$ and the size thereof perpendicular to that direction of connection is greater than or equal to $\lambda/4$ as well, so as to enhance the reflex action of the electromagnetic reflecting surface 12 for the radiation of the direction from the first radiating source pole 111 and the second radiating source pole 112 toward the electromagnetic reflecting surface 12.

Further, the microwave-doppler detecting module 10 also comprises a first feeder wire 15 and a second feeder wire 16, wherein the first radiating source pole 111 is electrically coupled with the feeder pole of the oscillation circuit module 141 at the first feed end 1111 through the first feeder wire 15, wherein the second radiating source pole 112 is electrically connected with the grounding pole of the oscillation circuit module 141 at the second feed end 1121 through the second feeder wire 16, so as to form and create a circuit connection structure among the first radiating source pole 111 and the second radiating source pole 112 and the circuit unit 14 through the first feeder wire 15 and the second feeder wire 16 and to form and create a structural relation that utilizes the supports of the first feeder wire 15 and the second feeder wire 16 for the first radiating source pole 111 and the second radiating source pole 112 to arrange the first radiating source pole 111 and the second radiating source pole 112 spacingly to the electromagnetic reflecting surface 12 in the space corresponding to the same side of the electromagnetic reflecting surface 12.

Specifically, according to this embodiment of the present invention, the first radiating source pole 111 is integrally extended from the first feed end 1111 on the first feeder wire 15, wherein the second radiating source pole 112 is integrally extended from the second feed end 1121 on the second feeder wire 16. This simplifies the structure of the microwave-doppler detecting module 10 and facilitates to maintain the uniformity of the impedance of the microwave-doppler detecting module 10, so as to benefit the impedance matching of the microwave-doppler detecting module 10.

Further, the first feeder wire 15 and the second feeder wire 16 are parallel to each other. The distance between the first feeder wire 15 and the second feeder wire 16 corresponding to the distance between the first feed end 1111 and the second feed end 1121 satisfies to be smaller than or equal to $\lambda/32$ and, preferably, close to the range of $\lambda/128$, so that when the first radiating source pole 111 and the second radiating source pole 112 are fed through the first feeder wire 15 and the second feeder wire 16 respectively, the coupling effect between the first feeder wire 15 and the second feeder wire 16 can be reduced, so as to facilitate to reduce the depletion of the first feeder wire 15 and the second feeder wire 16. In other words, the echo depletion S11 of the first feeder wire 15 and the second feeder wire 16 is reduced, which facilitates to enhance the gain of the microwave-doppler detecting module 10.

Figure 4:
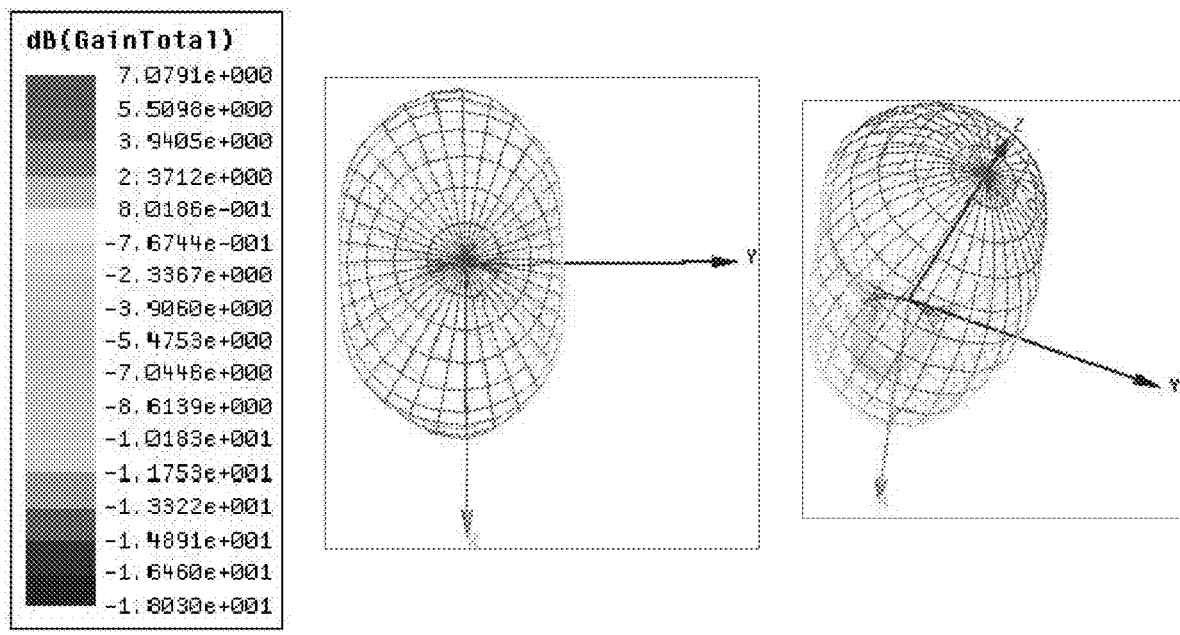
FIG. 4 is a radial direction diagram of the microwave-doppler detecting module according to the above preferred embodiment of the present invention.

Referring to FIG. 4, the radiation direction of the microwave-doppler detecting module 10 corresponding to the radiation space 100 according to the above embodiment of the present invention is illustrated. Based on the figure, the microwave-doppler detecting module 10 has a radiation gain greater than 7 dB in the directional radiation direction, which is the direction perpendicular to the plane of the X-axis and the Y-axis on the figure. Besides, the radiation space 100 protrudes from the direction. Correspondingly, the projection of the radiation space 100 presents a closely complete oval shape, which is different from microwave detection modules of conventional columnar radiation source structure which projection in the directional radiation direction thereof presents a ring shape with a detection dead zone in the middle thereof. The radiation space 100 of the microwave-doppler detecting module 10 protrudes in the directional radiation direction to avoid forming a detection dead zone.

In particular, based on the adjustment of the positional relation between the first radiating source pole 111 and the second radiating source pole 112, the radiation space 100 may be adjusted to correspondingly change the angle and direction of the detection of the microwave-doppler detecting module 10 from the electromagnetic reflecting surface 12 toward the direction of the first radiating source pole 111 and the second radiating source pole 112, so as to enhance the applicability of the microwave-doppler detecting module 10.

According to one embodiment, the positional relation between the first radiating source pole 111 and the second radiating source pole 112 is capable of being adjusted through adjusting the first radiating source pole 111 and the second radiating source pole 112 to turn around the first feed end 1111 and the second feed end 1121 respectively. According to one embodiment of the present invention, the first radiating source pole 111 and the second radiating source pole 112 are respectively turned around the first feed end 1111 and the second feed end 1121 in the direction close to the electromagnetic reflecting surface 12 for adjustment. That is the first radiating source pole 111 is configured to be a columnar conductive wire extended from the first feed end 1111 as an end toward the connection direction of the second feed end 1121 to the first feed end 1111 and toward the direction of the electromagnetic reflecting surface 12 at the same time, wherein the second radiating source pole 112 is configured to be a columnar conductive wire extended from the second feed end 1121 as an end toward the connection direction of the first feed end 1111 to the second feed end 1121 and toward the direction of the electromagnetic reflecting surface 12.

It is worth mentioning that by adjusting the shape of the second radiating source pole 112 and the first radiating source pole 111, such as through bending the second radiating source 112 and the first radiating source pole 111 to adjust their shapes, the size of the microwave-doppler detecting module 10 can be further reduced while the wire length parameter L2 of the second radiating source pole 112 satisfies that $\lambda/16 \leq L2 \leq \lambda$ and the wire length parameter L1 of the first radiating source pole 111 satisfies that $\lambda/16 \leq L1 \leq \lambda$. In other words, while the antithetical coupling between the second radiating source pole 112 and the first radiating source pole 111 is ensured, it facilitates to reduce the size of the microwave-doppler detecting module 10. In particular, based on the adjustment of the shape of the first radiating source pole 111 and the second radiating source pole 112 or the adjustment of the positional relation between the first radiating source pole 111 and the second radiating source pole 112, the radiation space 100 can be adjusted to correspondingly change the coverage area of the electromagnetic wave radiated by the microwave-doppler detecting module 10, so as to enhance the applicability of the microwave-doppler detecting module 10.

Figure 5:
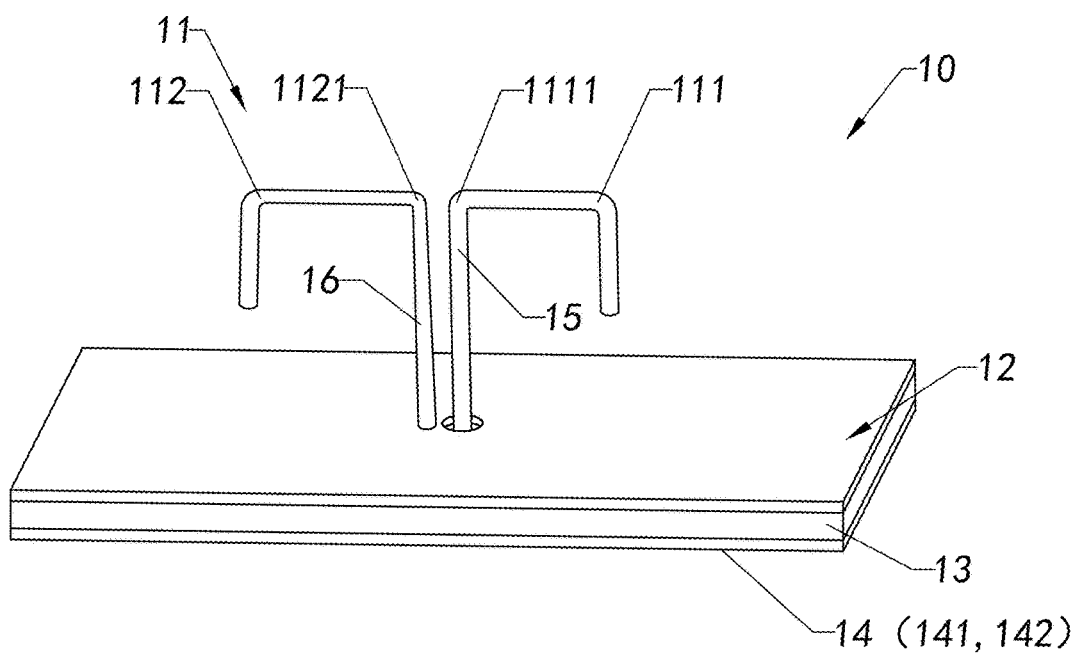
FIG. 5 is a perspective view of the microwave-doppler detecting module according to an alternative mode of the above preferred embodiment of the present invention.

For example, referring to FIG. 5 of the drawings, the adjustment of the shapes of the first radiating source pole 111 and the second radiating source pole 112 for the microwave-doppler detecting module 10 according to an alternative mode of the above preferred embodiment of the present invention is illustrated. According to this alternative mode of the present invention, the first radiating source pole 111 is extended from the first feed end 1111 to the direction of the second feed end 1121 to the first feed end 1111 and the direction close to the electromagnetic reflecting surface 12, while the second radiating source pole 112 is extended from the second feed end 1121 to the direction of the first feed end 1111 to the second feed end 1121 and the direction close to the electromagnetic reflecting surface 12. In other words, the adjustment of the shapes of the first radiating source pole 111 and the second radiating source pole 112 forms the conditions that the end of the first radiating source pole 111 opposite to the first feed end 1111 is, comparing to the first feed end 1111, closer to the electromagnetic reflecting surface 12 and that the end of the second radiating source pole 112 opposite to the second feed end 1121 is, comparing to the second feed end 1121, closer to the electromagnetic reflecting surface 12.

Especially, the first radiating source pole 111 is extended from the first feed end 1111 to the direction of the second feed end 1121 to the first feed end 1111 and the direction approaching the electromagnetic reflecting surface 12. The second radiating source pole 112 is extended from the second feed end 1121 to the direction of the first feed end 1111 to the second feed end 1121 and the direction approaching the electromagnetic reflecting surface 12. The sizes corresponding to the first radiating source pole 111 and the second radiating source pole 112 in a direction perpendicular to the electromagnetic reflecting surface 12 are both within the range of being greater than or equal to $\lambda/32$ and smaller than or equal to $\lambda/4$, so as to ensure the antithetical coupling of the first radiating source pole 111 and the second radiating source pole 112 and to reduce the size of the microwave-doppler detecting module 10 based on the size arrangement corresponding to the first radiating source pole 111 and the second radiating source pole 112 in the direction perpendicular to the electromagnetic reflecting surface 12 as well as to allow the radiation space 100 of the microwave-doppler detecting module 10 to be adjusted.

Specifically, according to this alternative mode of the present invention, the first radiating source pole 111 and the second radiating source pole 112 are each bent for once. Corresponding to the bent first radiating source pole 111 is extended from the first feed end 1111 along a direction from the second feed end 1121 toward the first feed end 1111 and then extended in another direction towards the electromagnetic reflecting surface 12, the bent second radiating source pole is extended from the second feed end 1121 along a direction from the first feed end 1111 towards the second feed end 1121 and then extended in another direction towards the electromagnetic reflecting surface 12. Accordingly, the first and second radiating source poles 111, 112 are correspondingly formed in such a manner that one end of the first radiating source pole 111, opposite to the first feed end 1111, is closer to the electromagnetic reflecting surface 12 with respect to the first feed end 1111, and that one end of the second radiating source pole 112, opposite to the second feed end 1121, is closer to the electromagnetic reflecting surface 12 with respect to the second feed end 1121.

Hence, according to this alternative mode of the preferred embodiment of the present invention, the size of the portion of the first radiating source pole 111 along a direction perpendicular to the electromagnetic reflecting surface 12 is arranged with respect to the distance L11 from the end of the first radiating source pole 111 relative to the first feed end 1111 and the bent position of the first radiating source pole 111, where the L11 satisfies that $\lambda/32 \leq L11 \leq \lambda/4$. The size of the portion of the second radiating source pole 112 along a direction perpendicular to the electromagnetic reflecting surface 12 is arranged with respect to the distance L21 from the end of the second radiating source pole 112 relative to the second feed end 1121 and the bent position of the second radiating source pole 112, where the L21 satisfies that $\lambda/32 \leq L21 \leq \lambda/4$. Based on the size arrangements corresponding to the L11 and the L21, the radiation space 100 of the microwave-doppler detecting module 10 can be adjusted and the gain of the corresponding microwave-doppler detecting module 10 can be adjusted as well.

Figure 6:
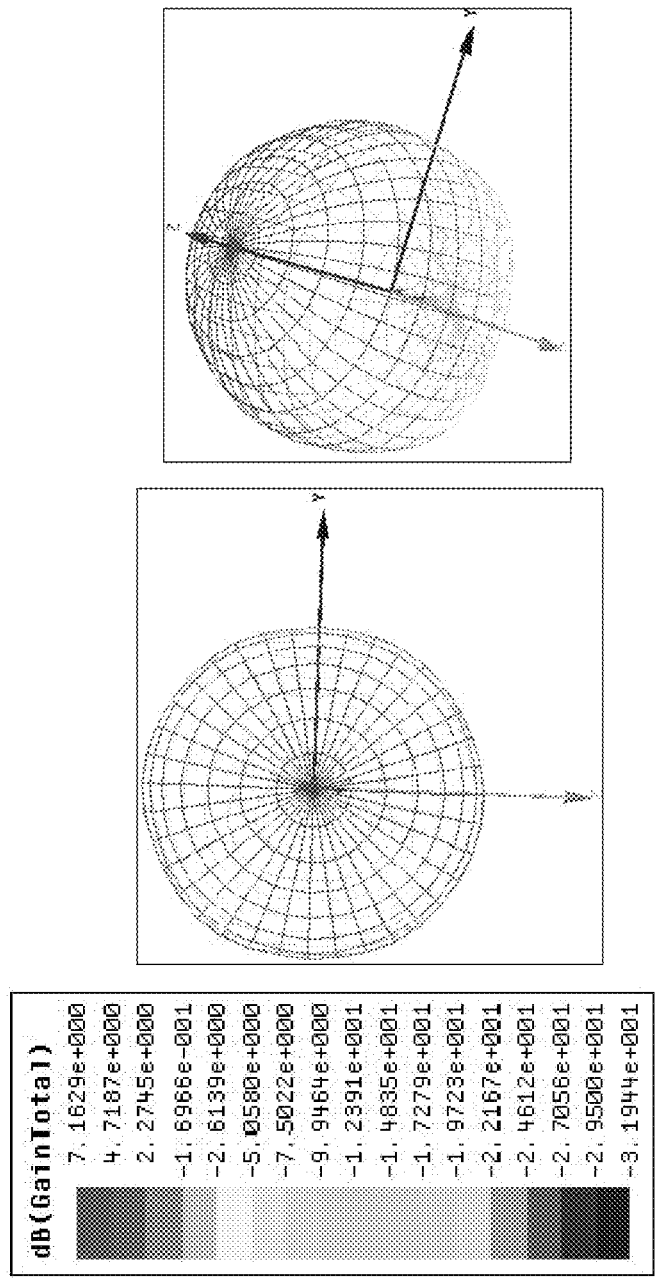
FIG. 6 is a radial direction diagram of the microwave-doppler detecting module according to the above alternative mode of the above preferred embodiment of the present invention.

Referring to FIG. 6 of the drawings of the present invention, the radiation direction of the microwave-doppler detecting module 10 corresponding to the radiation space 100 according to the above alternative mode of the preferred embodiment of the present invention is illustrated. According to the figure, the microwave-doppler detecting module 10 also has a radiation gain greater than 7 dB in the directional radiation direction, which is the direction perpendicular to the plane of the X-axis and the Y-axis in the figure. Especially, a difference from the radiation space 100 of the microwave-doppler detecting module of the above preferred embodiment is that, according to this alternative mode of the present invention, based on the adjustment of the shapes of the first radiating source pole 111 and the second radiating source pole 112, under the conditions that the end of the first radiating source pole 111 opposite to the first feed end 1111 is, with respect to the first feed end 1111, closer to the electromagnetic reflecting surface 12 and that the end of the second radiating source pole 112 opposite to the second feed end 1121 is, with respect to the second feed end 1121, closer to the electromagnetic reflecting surface 12, the radiation space 100 is adjusted into a condition that a cross section thereof perpendicular to the directional radiation direction is close to a full and complete circle, so as to facilitates to enhance the applicability of the detection of the microwave-doppler detecting module 10 for the object activities in the directional space in various application sites. In addition, another difference from the conventional microwave detection module of columnar radiation source structure and microwave detection module of flat radiation source structure which cross section perpendicular to the directional radiation direction thereof is in a ring-shape that has a detection dead zone in the middle thereof is that the radiation space 100 of the microwave-doppler detecting module 10 protrudes at the directional radiation direction, which avoids detection dead zone.

It is worth mentioning that, according to the above alternative mode, there are structural relations that the first radiating source pole 111 is extended from the first feed end 1111 toward the direction of the second feed end 1121 to the first feed end 1111 and toward the direction of the electromagnetic reflecting surface 12, and that the second radiating source pole 112 is extended from the second feed end 1121 toward the direction of the first feed end 1111 to the second feed end 1121 and toward the direction of the electromagnetic reflecting surface 12. In one alternative mode of the preferred embodiment of the present invention, the first radiating source pole 111 is extended from the first feed end 1111 as an end towards the direction of the second feed end 1121 to the first feed end 1111 and the direction close to the electromagnetic reflecting surface 12 at the same time, and that the second radiating source pole 112 is extended from the second feed end 1121 as an end toward the direction of the first feed end 1111 to the second feed end 1121 and the direction close to the electromagnetic reflecting surface 12 at the same time, so as to form and create a condition that the end of the second radiating source pole 112 opposite to the second feed end 1121, with respect to the second feed end 1121, is closer to the electromagnetic reflecting surface 12, which facilitates to adjust the radiation space 100 into a condition that the cross section thereof perpendicular to the directional radiation direction is close to a full and complete circle, so as to enhance the applicability of the detection of the microwave-doppler detecting module 10 for the object activities in the directional space in various application sites.

For example, according to some embodiments of the present invention, the first radiating source pole 111 and the second radiating source pole 112 are arranged in a bending manner. Specifically, the first radiating source pole 111 is a columnar curvy conductive wire formed through extending from the first feed end 1111 as an end along a connection direction from the second feed end 1121 towards the first feed end 1111 and a direction towards the electromagnetic reflecting surface 12 at the same time, wherein the second radiating source pole 112 is a columnar curvy conductive wire formed through extending from the second feed end 1121 as an end along a connection direction from first feed end 1111 towards the second feed end 1121 and a direction towards the electromagnetic reflecting surface 12 at the same time.

In other words, the curvy shape of the first radiating source pole 111 is a result that the second feed end 1121 extends toward the connection direction of the first feed end 1111 and the direction towards the electromagnetic reflecting surface 12 in a nonlinear manner. Similarly, the curvy shape of the second radiating source pole 112 is a result that the first feed end 1111 extends toward the connection direction of the second feed end 1121 and the direction towards the electromagnetic reflecting surface 12 in a nonlinear manner. For an example, each of the first radiating source pole 111 and the second radiating source pole 112 is bent towards the direction closer to the electromagnetic reflecting surface 12 to form the columnar curvy conductive wire. For another example, each of the first radiating source pole 111 and the second radiating source pole 112 is bent in the direction deviating from the electromagnetic reflecting surface 12 to form columnar curvy conductive wires.

Figure 7:
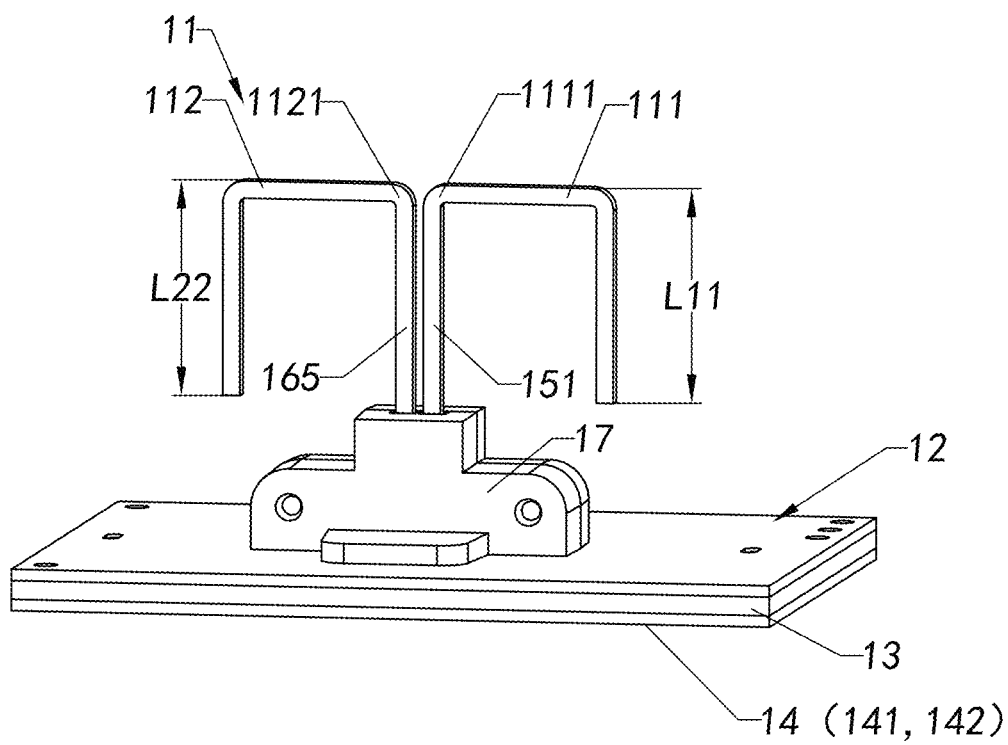
FIG. 7 is a perspective view of the microwave-doppler detecting module according to another alternative mode of the above preferred embodiment of the present invention.
Figure 8:
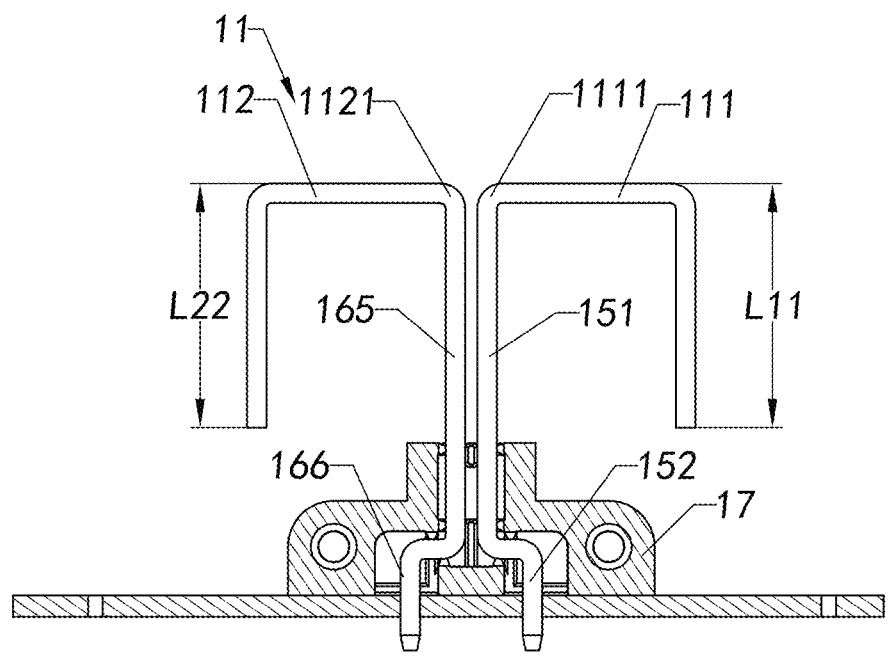
FIG. 8 is a side sectional view of the microwave-doppler detecting module according to the above another alternative mode of the above preferred embodiment of the present invention.

Further, referring to FIGS. 7 and 8 of the drawings of the present invention, the microwave-doppler detecting module 10 according to another alternative mode of the above preferred embodiment of the present invention is illustrated. Particularly, according to this another alternative mode of the preferred embodiment of the present invention, the first feeder wire 15 has a first feeder section 151 and the second feeder wire 16 has a second feeder section 165. The first feeder section 151 and the second feeder section 165 are parallel columnar straight conductive wires extended from the first feed end 1111 and the second feed end 1121 respectively, so that a distance between the first feeder section 151 and the second feeder section 165 and a corresponding distance between the first feed end 1111 and the second feed end 1121 satisfies to be smaller than or equal to $\lambda/32$ and a range preferably close to $\lambda/128$, so that coupling function between the first feeder section 151 and the second feeder section 165 can be reduced, which facilitates to reduce the depletion of the first feeder wire 15 and the second feeder wire 16. In other words, the echo depletion S11 of the first feeder wire and the second feeder wire is reduced, which facilitates to further enhance the gain of the microwave-doppler detecting module 10.

In particular, according to this another alternative mode of the preferred embodiment of the present invention, the first feeder wire 15 further has a first coupling section 152 integrally extended from the first feeder section 151, and the second feeder wire 16 further has a second coupling section 166 integrally extended from the second feeder section 165. In other words, the first feeder section 151 is electrically coupled with the oscillation circuit module 141 and affixedly coupled with the circuit board 13 through the first coupling section 152, and that the second feeder section 165 is electrically coupled with the earth potential of the oscillation circuit module 141 and affixedly coupled with the circuit board 13 through the second coupling section 166. The first coupling section 152 is integrally extended from the first feeder section 151 in a direction deviating from the first feeder section 151. The second coupling section 166 is integrally extended from the second feeder section 165 in a direction deviating from the second feeder section 165. Therefore, the lengths of the first feeder wire 15 and the second feeder wire 16 can be configured through the designs of the lengths and shapes of the first coupling section 152 and the second coupling section 166 respectively, so as to facilitate to not only satisfy the impedance matching and corresponding resonance frequency design of the microwave-doppler detecting module 10 based on the arrangement of the corresponding lengths of the first feeder wire 15 and the second feeder wire 16, but also maintain the distance between the electromagnetic reflecting surface 12 and a midpoint of the connection of the first feed end 1111 and the second feed end 1121 in a proper range, such as being greater than or equal to $\lambda/32$ and smaller than or equal to $\lambda/2$ or close to the preferable range of $\lambda/4$, based on the shape design of the first coupling section 152 and the second coupling section 166. That is, based on the design of the lengths and shapes of the first coupling section 152 and the second coupling section 166, the microwave-doppler detecting module 10 is able to not only satisfy the corresponding impedance matching and resonance frequency design, but also enhance the reflex action of the electromagnetic reflecting surface 12 for the radiation in the direction from the first radiating source pole 111 and the second radiating source pole 112 to the electromagnetic reflecting surface 12, so as to facilitate to extent the detecting distance of the microwave-doppler detecting module 10.

In other words, based on the designs of the shapes and the lengths of the first coupling section 152 and the second coupling section 166, the distance between the electromagnetic reflecting surface 12 and the midpoint of the connection of the first feed end 1111 and the second feed end 1121 can be maintained or shortened within the range greater than or equal to $\lambda/32$ and smaller than or equal to $\lambda/2$. Besides, the microwave-doppler detecting module 10 can satisfy the corresponding impedance matching and the resonance frequency design. Hence, the microwave-doppler detecting module 10 is able to not only satisfy the corresponding impedance matching and the resonance frequency design, but also have higher gain.

Further, according to this another alternative mode of the preferred embodiment of the present invention, the first coupling section 152 and the second coupling section 166 integrally extended away from the first feeder section 151 and the second feeder section 165 respectively, so that the distance between the first coupling section 152 and the second coupling section 166 in the directions perpendicular to the first feeder section 151 and the second feeder section 165 is larger than the distance between the first feeder section 151 and the second feeder section 165, so that the first feeder section 151 and the second feeder section 165 which are parallel to each other are in a condition of closing to each other within a distance smaller than or equal to $\lambda/32$, which facilitates to electrically couple the first feeder wire 15 with oscillation circuit module 141 at the first coupling section 152 through welding and soldering and to affixedly couple the first feeder wire 15 with the circuit board 13 as well as to electrically couple the second feeder wire 16 with the earth potential of the oscillation circuit module 141 at the second coupling section 166 through welding and soldering and affixedly couple the second feeder wire 16 with the circuit board 13.

Specifically, according to this another alternative mode of the preferred embodiment of the present invention, the distance of the first coupling section 152 and the second coupling section 166 in the direction perpendicular to the first feeder section 151 and the second feeder section 165 is smaller than or equal to $\lambda/8$. The distance of the first coupling section 152 and the second coupling section 166 in the direction parallel to the first feeder section 151 and the second feeder section 165 is also smaller than or equal to $\lambda/8$. Therefore, it not only ensures the low loss characteristic between the first feeder section 151 and the second feeder section 165 so as to be capable of satisfying the corresponding impedance matching and resonance frequency design based on the design of the lengths and shapes of the first coupling section 152 and the second coupling section 166, but also reinforces the reflex action of the electromagnetic reflecting surface 12 for the radiations of the directions from the first radiating source pole 111 and the second radiating source pole 112 toward the electromagnetic reflecting surface 12.

It is worth mentioning that, according to this another alternative mode of the preferred embodiment of the present invention, the first coupling section 152 is extended from the end of the first feeder section 151 that is opposite to the first feed end 1111 toward a direction perpendicular to the first feeder section 151 and then toward another direction parallel to the first feeder section 151, while the second coupling section 166 is extended from the end of the second feeder section 165 that is opposite to the second feed end 1121 toward a direction perpendicular to the second feeder section 165 and then toward another direction parallel to the second feeder section 165. In some embodiments of the present invention, the first coupling section 152 may be configured to be extended from the end of the first feeder section 151 that is opposite to the first feed end 1111 toward a direction perpendicular to the first feeder section 151 and a direction parallel to the first feeder section 151 at the same time. For example, the first coupling section 152 can be a columnar curvy conductive wire extended from the end of the first feeder section 151 that is opposite to the first feed end 1111 to the direction perpendicular to the first feeder section 151 and the direction parallel to the first feeder section 151 at the same time. Similarly, the second coupling section 166 may be configured to be extended from the end of the second feeder section 165 that is opposite to the second feed end 1121 to the direction perpendicular to the second feeder section 165 and the direction parallel to the second feeder section 165 at the same time. For example, the second coupling section 166 can be a columnar curvy conductive wire extended from the end of the second feeder section 165 that is opposite to the second feed end 1121 to the direction perpendicular to the second feeder section 165 and the direction parallel to the second feeder section 165 at the same time. The present invention shall not be limited here.

Further, according to this another alternative mode of the preferred embodiment of the present invention, the high gain microwave-doppler detecting module 10 further comprises a fixing base 17. The fixing base 17 is attached on a side of the circuit board 13 having the electromagnetic reflecting surface 12 provided thereon. The first feeder wire 15 and the second feeder wire 16 are partially clamped and affixed to the fixing base 17, so as to facilitates to maintain the first feeder section 151 and the second feeder section 165 in a parallel manner and a condition close to each other within a distance smaller than or equal to $\lambda/32$, that facilitates to maintain the uniformity in producing and the stability in utilizing of the high gain microwave-doppler detecting module 10.

Figure 9:
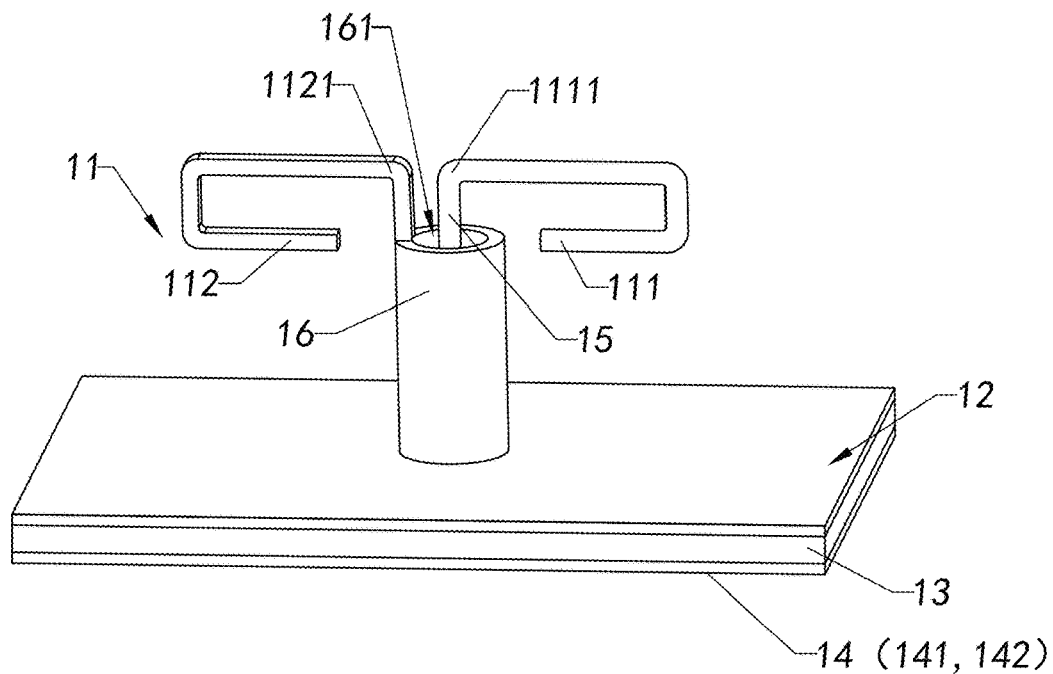
FIG. 9 is a perspective view of the microwave-doppler detecting module according to another alternative mode of the above preferred embodiment of the present invention.

Further, referring to FIG. 9 of the drawings of the present invention, the microwave-doppler detecting module 10 according to another alternative mode of the above preferred embodiment of the present invention. In particular, according to this alternative mode of the preferred embodiment of the present invention, the second feeder wire 16 encircles and surrounds the first feeder wire 15 so as to form and create an electromagnetic shielding cavity 161, such that when the second feeder wire 16 is grounded, the influence of the coupling between the second feeder wire 16 and the first feeder wire 15 to the coupling between the first radiating source pole 111 and the second radiating source pole 112 can be reduced and the interference of external electromagnetic radiation to the first feeder wire 15 can be shielded, that thereby facilitates to enhance the anti-interference ability of the microwave-doppler detecting module 10.

Preferably, the second feeder wire 16 is arranged being surrounded and encircled by the first feeder wire 15 coaxially, so that when the first radiating source pole 111 is fed at the first feed end 1111 through the first feeder wire 15 and the second radiating source pole 112 is fed at the second feed end 1121 through the second feeder wire 16, the coupling between the first radiating source pole 111 and the second radiating source pole 112 in an antithetical manner is facilitated.

Especially, on the basis of the condition that the second radiating source pole 112 is grounded according to the above embodiment, according to some embodiments, the first radiating source pole 111 is further grounded, so as to reduce the impedance of the microwave-doppler detecting module, so that the quality factor (Q value) of the microwave-doppler detecting module can be increased, which facilitates the anti-interference ability of the microwave-doppler detecting module.

Figure 10:
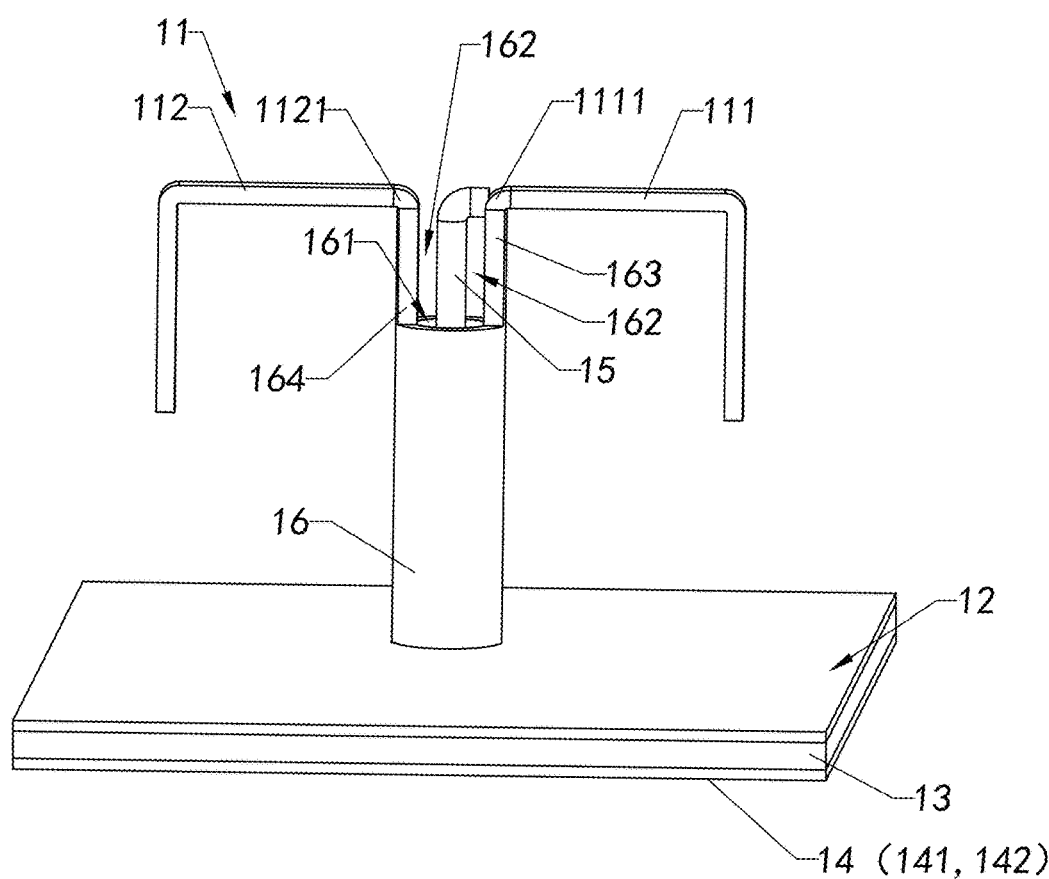
FIG. 10 is a perspective view of the microwave-doppler detecting module according to another alternative mode of the above preferred embodiment of the present invention.

Referring to FIG. 10, the 3D structure of the microwave-doppler detecting module 10 according to another alternative mode of the above embodiment of the present invention is illustrated. Particularly, comparing to the above preferred embodiment and its alterative modes, according to this alternative mode of the present invention, the first radiating source pole 111 is further electrically connected with the second feeder wire 16 so as to be grounded.

Specifically, according to this alternative mode of the present invention, the second feeder wire 16 is arranged to surround around the first feeder wire 15 coaxially and further has a pair of notch positions 162. The second feeder wire 16 has a pair of notches formed at the notch positions 162 and extended from the end connected with the second radiating source pole 112 along a direction of the first feeder wire 15. The pair of the notch positions 162 defines a first arm 163 and a second arm 164 of the second feeder wire 16. That is, the first arm 163 and the second arm 164 are two portions of the second feeder wire 16 wherein the pair of the notch positions 162 is defined therebetween. The second radiating source pole 112 is conductively extended from the second feed end 1121 to the second arm 164 of the second feeder wire 16. The first radiating source pole 111 is conductively extended from the first feed end 1111 to the first arm 163 of the second feeder wire 16 and is conductively connected with the first feeder wire 15 at the first feed end 1111, so as to create a condition that the first radiating source pole 111 is grounded.

It is worth mentioning that, a notch depth of each of the notches of the second feeder wire 16 from the end of the second feeder wire 16 connected with the second radiating source pole 112 along the direction of the first feeder wire 111 is greater than or equal to $\lambda/128$, so that when the first radiating source pole 111 is grounded through the first arm 163 of the second feeder wire 16, the first radiating source pole 111 can be fed and excited at the first feed end 1111 through the first feeder wire 15, and the second radiating source pole 112 can be fed at the second feed end 1121 through the second feeder wire 16 at the same time, so as to facilitate coupling between the first radiating source pole 111 and the second radiating source pole 112 in an antithetical manner.

It is understandable that, based on the arrangement of the depth of the notches 162, corresponding impedance can be created, so as to facilitate the impedance matching between the antithetical dipoles 11 and the first feeder wire 15 and the second feeder wire 16 and the oscillation circuit module 141.

Especially, according to this alternative mode of the present invention, the first radiating source pole 111 and the second radiating source pole 112 are bent for once, so as to maintain that the wire length parameter L2 of the second radiating source pole 112 satisfies $\lambda/16 \leq L2 \leq \lambda$ and that the wire length parameter L1 of the first radiating source pole 111 satisfies $\lambda/16 \leq L1 \leq \lambda$ at the same time, so that the sizes of the second radiating source pole 112 and the first radiating source pole 111 parallel to the direction of the connection of the first feed end 1111 and the second feed end 1121 can be reduced.

Figure 11:
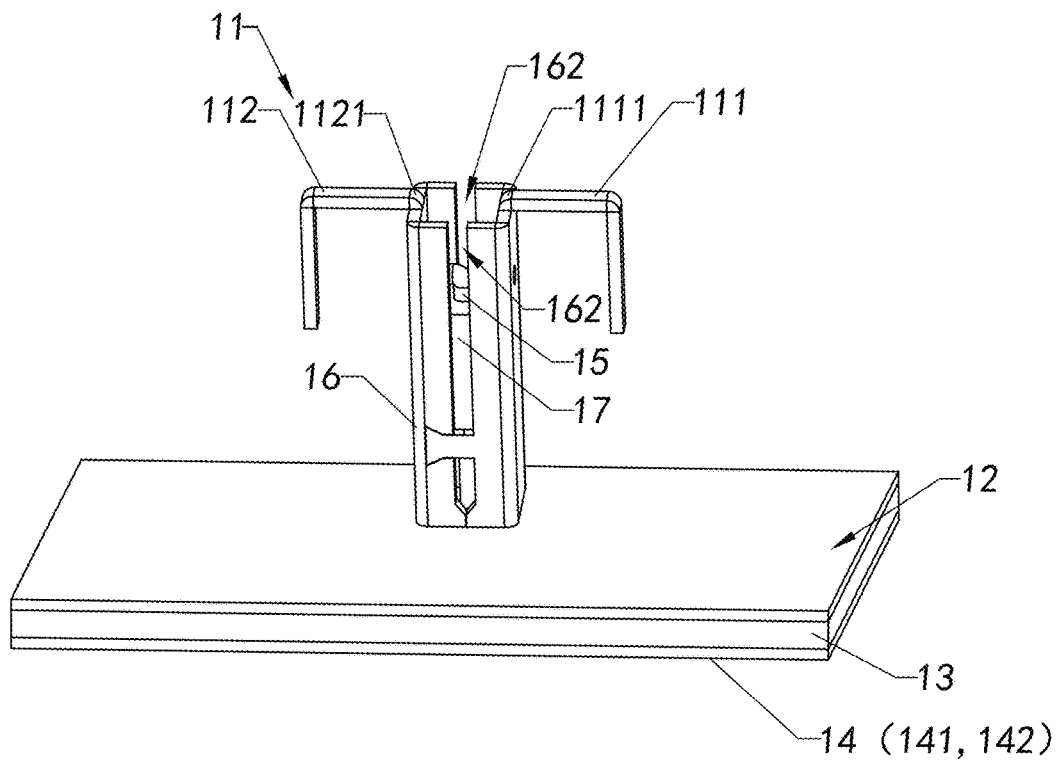
FIG. 11 is a perspective view of the microwave-doppler detecting module according to a substitutional structure of the above one more alternative mode of the above preferred embodiment of the present invention.

Further, referring to FIG. 11 of the drawings of the present invention, based on the concept that the second feeder wire 16 is configured as a dismountable tubular structure, an alternative structure for the microwave-doppler detecting module corresponding to that as illustrated in the FIG. 10 is illustrated. A difference to the microwave-doppler detecting module 10 as illustrated in FIG. 10 is that, according to this alternative structure of the present invention, the second feeder wire 16 is configured as a dismountable square tubular structure, which means that the second feeder wire 16 is a square tubular structure that can be assembled in a buckling manner or other dismountable manner.

Figure 12:
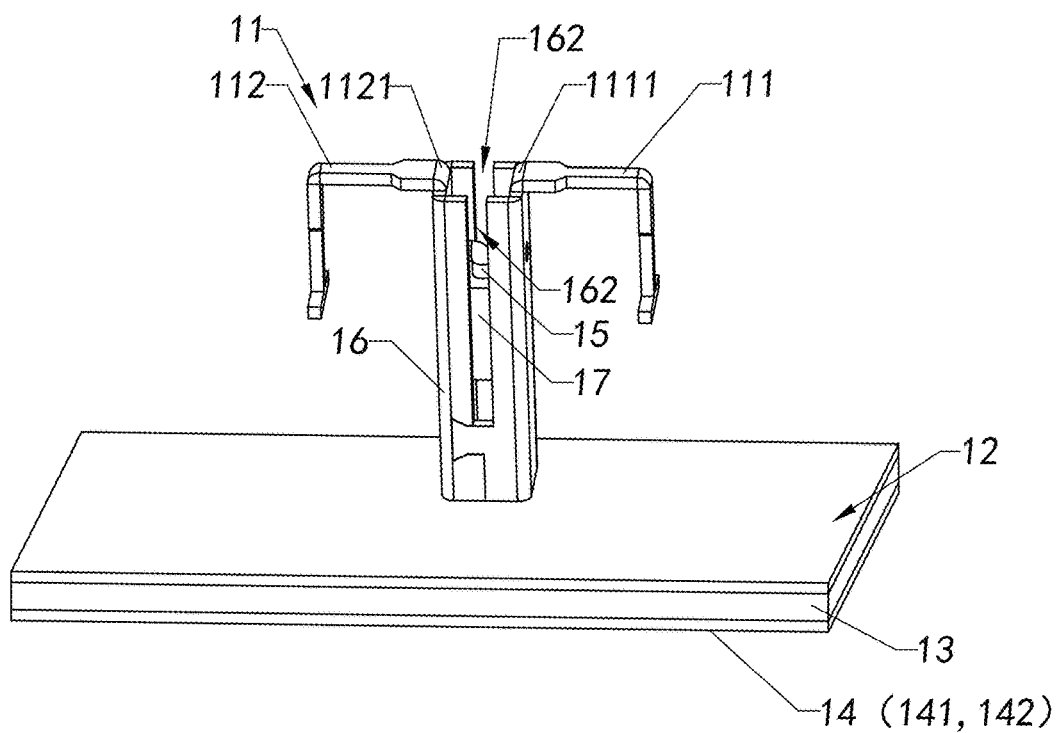
FIG. 12 is a perspective view of the microwave-doppler detecting module according to a modification of the above substitutional structure of the above alternative modes of the above preferred embodiment of the present invention.

Further referring to FIG. 12 of the drawings of the present invention, based on the concept that the second feeder wire 16 is configured as a dismountable tubular structure, FIG. 12 illustrates another alternative structure for the microwave-doppler detecting module corresponding to that in the FIG. 11. According to this alternative structure, the end of the first radiating source pole 111 that is opposite to the first feed end 1111 is further extended toward two opposite directions perpendicular to the connection of the first feed end 1111 and the second feed end 1121, and that the end of the second radiating source pole 112 that is opposite to the second feed end 1121 is further extended toward the two opposite directions perpendicular to the connection of the first feed end 1111 and the second feed end 1121, so as to suppress the energy accumulation at the end of the first radiating source pole 111 opposite to the first feed end 1111 and to suppress the energy accumulation at the end of the second radiating source pole 112 opposite to the second feed end 1121 when the first radiating source pole 111 and the second radiating source pole 112 are antithetically coupled, so as to facilitate to maintain the stability of the microwave-doppler detecting module 10.

Figure 13:
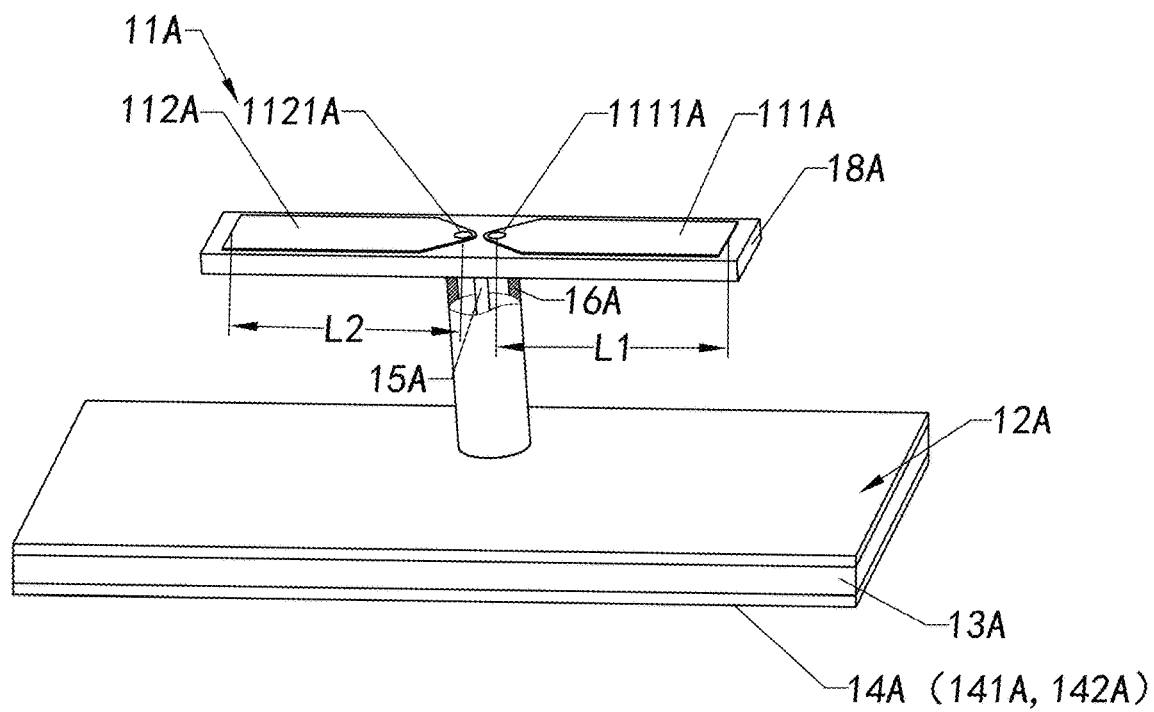
FIG. 13 is a perspective view of a microwave-doppler detecting module according to an alternative preferred embodiment of the present invention.

In order to further disclose the present invention, referring to FIG. 13 of the drawings of the present invention, the 3D structure of another microwave-doppler detecting module 10A according to another preferred embodiment of the present invention is illustrated. Similarly, the microwave-doppler detecting module 10A comprises a second radiating source pole 112A and a first radiating source pole 111A, wherein the second radiating source pole 112A has a second feed end 1121A, while the first radiating source pole 111A has a first feed end 1111A, wherein the second feed end 1121A and the first feed end 1111A are close to each other within a distance of $\lambda/4$, wherein the second radiating source pole 112A is extended from the second feed end 1121A as one end, wherein the first radiating source pole 111A is extended from the first feed end 1111A as one end, wherein the first radiating source pole 111A is configured to be adapted for being fed at the first feed end 1111A, wherein the second radiating source pole is configured to be adapted for being fed at the second feed end 1121A, so that when the first radiating source pole 111A is fed at the first feed end 1111A and the second radiating source pole 112A is fed by the same source at the second feed end 1121A, the first radiating source pole 111A from the first feed end 1111A along the first radiating source pole 111A is correspondingly coupled to the corresponding positions of the second radiating source pole 112A from the second feed end 1121A along the second radiating source pole 112A, so as to form the antithetical coupling arrangement between the first radiating source pole 111A and the second radiating source pole 112A.

A difference from the above preferred embodiment is that, according to this another preferred embodiment of the present invention, the microwave-doppler detecting module 10A further comprises a medium substrate 18A, wherein the first radiating source pole 111A and the second radiating source pole 112A is provided on the same side of the medium substrate 18A in a form of microstrip line, so that the shapes and sizes of the first radiating source pole 111A and the second radiating source pole 112A can correspondingly be implemented easily based on the technology of microstrip line.

The microwave-doppler detecting module 10A also comprises a circuit board 13A and a circuit unit 14A provided on the circuit board 13A, wherein the circuit unit 14A comprises an oscillation circuit module 141A and a frequency mixing wave detection unit 142A, wherein the first radiating source pole 111A and the second radiating source pole 112A are electrically coupled with different poles of the oscillation circuit module 141A respectively at the first feed end 1111A and the second feed end 1121A. Specifically, the first radiating source pole 111A is feedably connected with the feeder pole of the oscillation circuit module 141A at the first feed end 1111A, while the second radiating source pole 112A is electrically connected with the grounding pole of the oscillation circuit module 141A at the second feed end 1121A. In which, the frequency mixing wave detection unit 142A is electrically coupled with the oscillation circuit module 141A and the antithetical dipoles 11A, wherein the oscillation circuit module 141A is allowed to be powered to output a feed signal from the feeder pole thereof and to ground the grounding pole thereof. In other words, the oscillation circuit module 141A is allowed to be powered so as to be an excitation signal feed source, such that when the oscillation circuit module 141A is powered, the first radiating source pole 111A and the second radiating source pole 112A are fed by the same source of the oscillation circuit module 141A at the first feed end 1111A and the second feed end 1121A respectively, so as to emit a sounding wave beam and receive an echo of the sounding wave beam. In which, an echo signal is generated correspondingly to the receiving of the echo. The frequency mixing wave detection unit 142A outputs an intermediate-frequency signal corresponding to the frequency difference between the feed signal and the echo signal. Then, based on the Doppler Effect, the intermediate-frequency signal is corresponding to the movement of the object reflecting the sounding wave beam and producing the echo correspondingly. Hence, the microwave-doppler detecting module is suitable for sensing and detecting object movement.

Further, the first radiating source pole 111A and the second radiating source pole 112A are disposed symmetrically to a midpoint of the connection of the first feed end 1111A and the second feed end 1121A. That is the first radiating source pole 111A and the second radiating source pole 112A have the same shape and size and the positional relation between the first radiating source pole 111A and the second radiating source pole 112A satisfies that the first radiating source pole 111A is able to surround around the midpoint of the connection of the first feed end 1111A and the second feed end 1121A to turn 180 degrees for at least one direction and to be overlapped with the position of the second radiating source pole 112A. This facilitates to ensure the coupling between the second radiating source pole 112A and the first radiating source pole 111A in an antithetical manner.

Specifically, according to this another preferred embodiment of the present invention, the medium substrate 18A is disposed spacingly to the circuit board 13A in a manner of being parallel to the circuit board 13A.

Specifically, the microwave-doppler detecting module 10A also comprises a first feeder wire 15A and a second feeder wire 16A, wherein the first radiating source pole 111A is electrically coupled with the feeder pole of the oscillation circuit module 141A at the first feed end 1111A through the first feeder wire 15A, wherein the second radiating source pole 112A is electrically connected with the earth potential of the oscillation circuit module 141A at the second feed end 1121A through the second feeder wire 16A, so as to form and create a circuit connection structure among the first radiating source pole 111A and the second radiating source pole 112A and the circuit unit 14A and to form and create a structural relation that utilizes the supports of the first feeder wire 15A and the second feeder wire 16A for the medium substrate 18A with the first radiating source pole 111A and the second radiating source pole 112A provided thereon to form and create a structural relation that the medium substrate 18A is disposed spacingly to the circuit board 13A.

Especially, according to this another preferred embodiment of the present invention, the second feeder wire 16A and the first feeder wire 15A are embodied as that the second feeder wire 16A is a shielding wire surrounding and encircling the first feeder wire 15A, wherein the shielding wire is insertably arranged so as to construct the insertable and connectable circuit connection structure among the first radiating source pole 111A and the second radiating source pole 112A and the circuit unit 14A, which facilitates the assembling of the microwave-doppler detecting module 10A.

Similarly, the microwave-doppler detecting module 10A further has an electromagnetic reflecting surface 12A provided on the circuit board 13A, wherein the electromagnetic reflecting surface 12A is provided on a side of the circuit board 13A opposite to the other side having the circuit unit 14A thereon, wherein the radiating source pole 111A and the second radiating source pole 112A are arranged spacingly to the electromagnetism reflecting 12A in a space corresponding to the electromagnetic reflecting surface 12A, so as to utilize the electromagnetic wave reflection characteristic of the electromagnetic reflecting surface 12A and the structural relation that the first radiating source pole 111A and the second radiating source pole 112A are arranged spacingly to the electromagnetic reflecting surface 12A in a space corresponding to the electromagnetic reflecting surface 12A to create a directional radiation characteristic of the microwave-doppler detecting module 10A from the electromagnetic reflecting surface 12A toward the directions of the first radiating source pole 111A and the second radiating source pole 112A. In other words, with respect to a sensing direction of the microwave-doppler detecting module 10A defined from the electromagnetic reflecting surface 12A toward the directions of the first radiating source pole 111A and the second radiating source pole 112A, the microwave-doppler detecting module 10A is adapted for detecting and sensing the object activity in the directional space corresponding to the sensing direction. Besides, it also facilitates to avoid the microwave-doppler detecting module 10A from self-activating and avoid the electromagnetic radiation produced from the coupling between the first radiating source pole 111A and the second radiating source pole 112A from interfering the circuit unit 14A provided on the circuit board 13A, so as to enhance the anti-interference ability of the microwave-doppler detecting module.

Especially, based on the adjustment of the positional relation between the medium substrate 18A and the circuit board 13A, the microwave-doppler detecting module 10A may have various structural designs, which facilitates to enhance the applicability of the microwave-doppler detecting module 10A.

Figure 14:
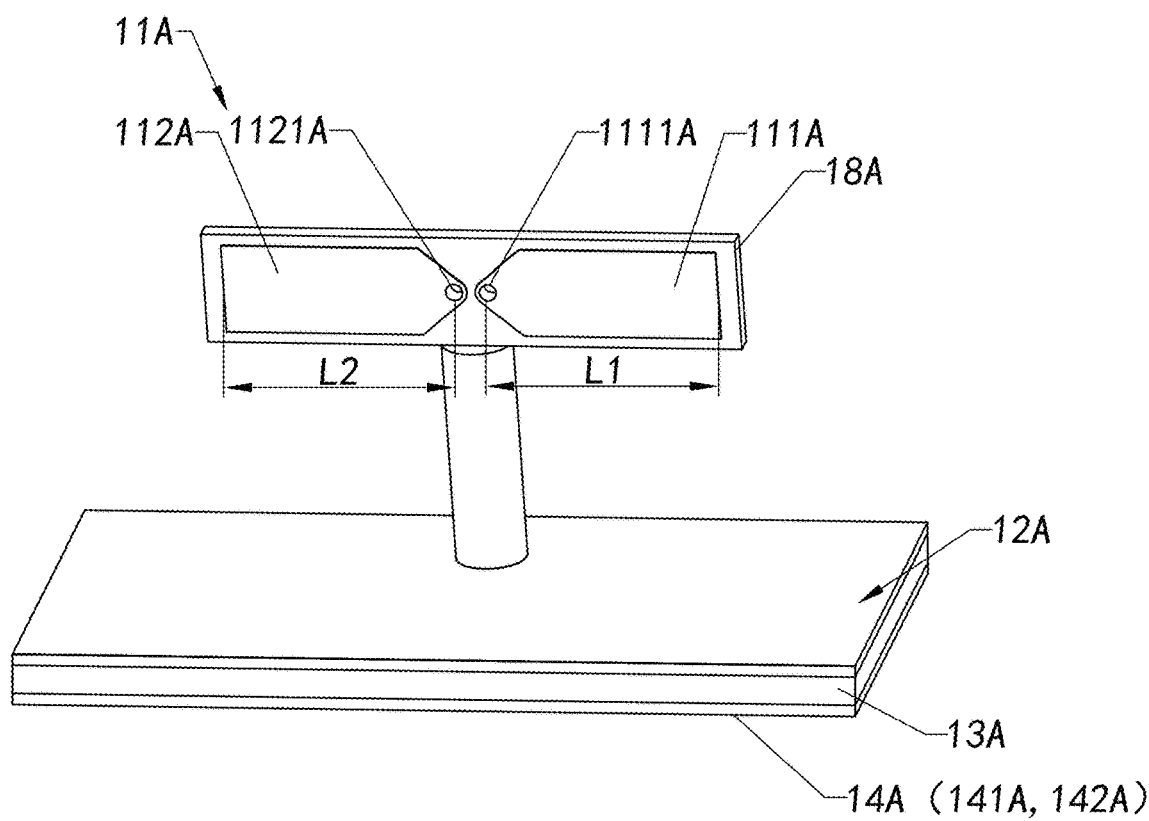
FIG. 14 is a perspective view of the microwave-doppler detecting module according to an alternative mode of the above alternative preferred embodiment of the present invention.

Specifically, referring to FIG. 14 of the drawings of the present invention, based on the adjustment of the positional relation between the medium substrate 18A and the circuit board 13A, the microwave-doppler detecting module 10A according to an alternative mode of the above another preferred embodiment of the present invention is illustrated.

Specifically, according to this alternative mode of the above another preferred embodiment of the present invention, the medium substrate 18A is perpendicular to the circuit board 13A, wherein the connection of the first feed end 1111A and the second feed end 1121A is parallel to the circuit board 13A. In other words, based on the positional relation of the medium substrate 18A parallel to the circuit board 13A, according to this alternative mode, the medium substrate 18A is turned for 90 degrees around the connection of the first feed end 1111A and the second feed end 1121A, which correspondingly creates a positional relation that the medium substrate 18A is perpendicular to the circuit board 13A and that the connection of the first feed end 1111A and the second feed end 1121A is parallel to the circuit board 13A.

It is worth mentioning that, based on the adjustment of the shape of the second radiating source pole 112A and the first radiating source pole 111A, if the second radiating source pole 112A and the first radiating source pole 111A are extended in a manner to the other side of the medium substrate 18A, while the second radiating source pole 112A and the first radiating source pole 111A both satisfy the requirement that the wire lengths from the second feed end 1121A and the first feed end 1111A are respectively greater than or equal to $\lambda/16$, the size of the medium substrate 18A can be reduced so as to the size of the microwave-doppler detecting module 10A.

For instance, according to some embodiments of the present invention, based on the structural relation that the second radiating source pole 112A and the first radiating source pole 111A are symmetrical corresponding to the midpoint of the connection between the first feed end 1111A and the second feed end 1121A and through the adjustment of the shapes of the second radiating source pole 112A and the first radiating source pole 111A, the first radiating source pole 111A and the second radiating source pole 112A can be arranged on the same side of the medium substrate 18A to respectively be extended from the first feed end 1111A and the second feed end 1121A to another side of the medium substrate 18A. In other words, the first feed end 1111A of the first radiating source pole 111A and the second feed end 1121A of the second radiating source pole 112A are provided on the same side of the medium substrate 18A, wherein the first radiating source pole 111A is extended from the first feed end 1111A as one end along a connection direction from the second feed end 1121A toward the first feed end 1111A, and is continuously extended to surround around the edge of the medium substrate 18A to another side of the medium substrate 18A, wherein the second radiating source pole 112A is extended from the second feed end 1121A as one end along a connection direction from the first feed end 1111A toward the second feed end 1121A, and is continually extended to surround around the edge of the medium substrate 18A to another side of the medium substrate 18A.

According to some embodiments of the present invention, the first radiating source pole 111A and the second radiating source pole 112A on different sides of the medium substrate 18A are respectively extended from the first feed end 1111A and the second feed end 1121A to the other sides of the medium substrate 18A. Specifically, the first feed end 1111A of the first radiating source pole 111A and the second feed end 1121A of the second radiating source pole 112A are provided on different sides of the medium substrate 18A, wherein the first radiating source pole 111A from the side of the medium substrate 18A with the first feed end 1111A provided thereon has the first feed end 1111A as an end to be continually extended to surround around the edge of the medium substrate 18A to the side of the medium substrate 18A that provides the second feed end 1121A. In which, the second radiating source pole 112A on the side of the medium substrate 18A having the second feed end 1121A loaded thereon utilizes the second feed end 1121A as an end to be continually extended to surround around the edge of the medium substrate 18A to the side of the medium substrate 18A that has the first feed end 1111A.

It is understandable that, according to some embodiments of the present invention, both sides of the medium substrate 18B are allowed to have at least a pair of the antithetical dipoles 11B be respectively arranged thereon, which can also ensures that the first radiating source pole 111B and the second radiating source pole 112B of each pair of the antithetical dipoles 11B can be antithetically coupled and reinforces the antithetical coupling of the first radiating source pole 111B of the antithetical dipoles 11B provided on one side of the medium substrate 18B and the second radiating source pole 112 of the antithetical dipoles 11B provided on the other side of the medium substrate 18B, wherein the present invention shall not be limited here.

It is worth mentioning that it is understandable that, based on the disclosure of the microwave-doppler detecting module of the above embodiments and their alternative modes: the second radiating source pole corresponding to the first radiating source pole of a pair of the antithetical dipoles may have various and diverse shapes and sizes, rather than be limited in a plant structure of restricted area. In other words, the grounded second radiating source pole is free from the limitation of having a restricted minimum area for reference ground. Instead, the microwave-doppler detecting module is also capable of being utilized in the application scenarios of the above mentioned microwave detection module of columnar radiation source structure through extending the second radiating source pole and the first radiating source pole out of a corresponding metal plate. Further, contrasting to the microwave detection module of columnar radiation source structure, this microwave-doppler detecting module has a better stability in the corresponding application scenarios because the corresponding metal plate will not affect the coupling between the first radiating source pole and the second radiating source pole thereof.

Figure 15:
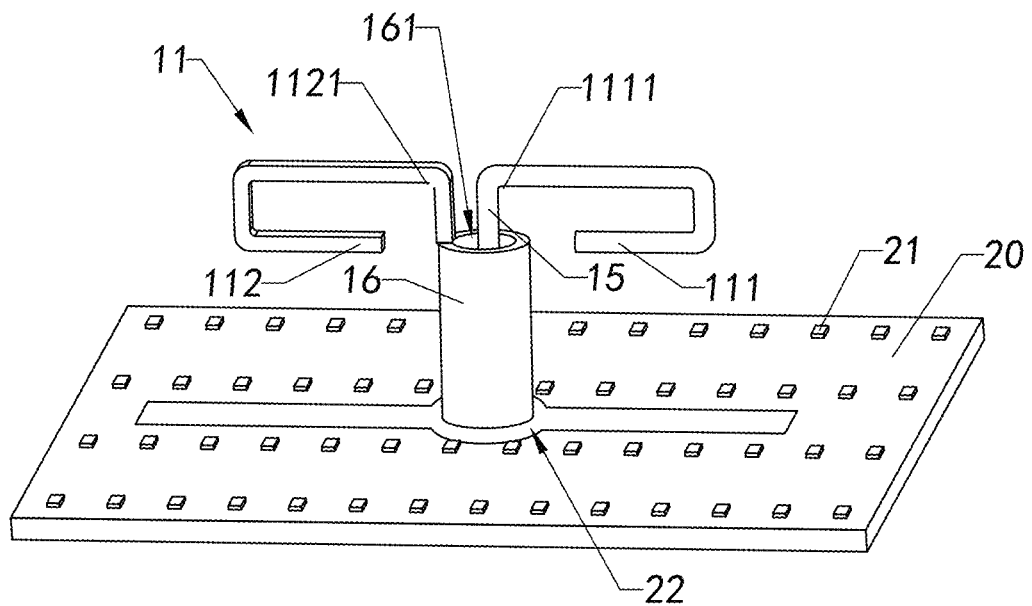
FIG. 15 is a perspective view of a microwave-doppler detecting module having a microwave-doppler detecting device mounted thereon according to another alternative embodiment of the present invention.
Figure 16:
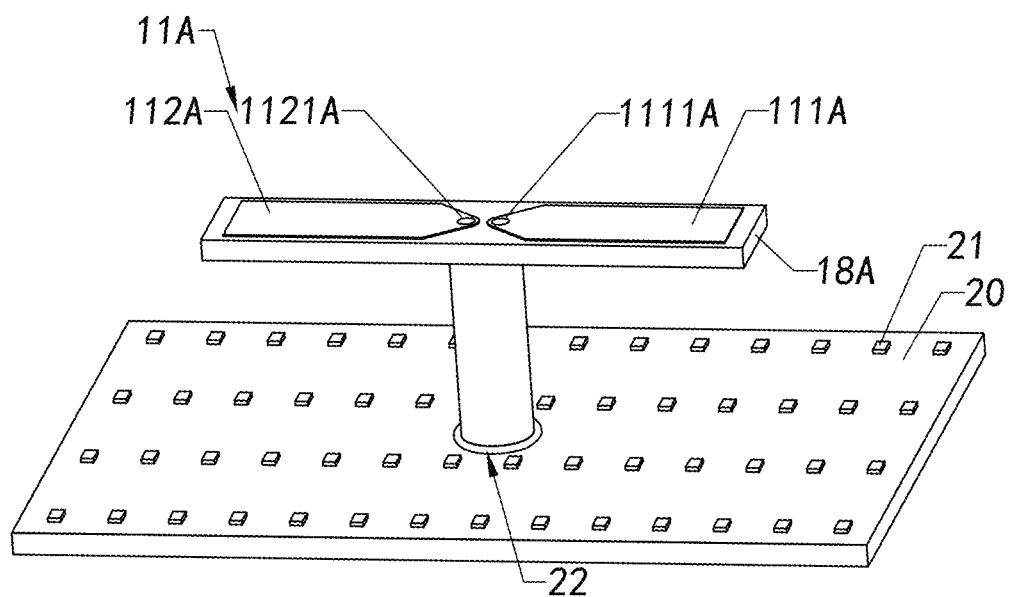
FIG. 16 is a perspective view of a microwave-doppler detecting module having a microwave-doppler detecting device mounted thereon according to another alternative embodiment of the present invention.

For demonstration, referring to FIGS. 15 and 16 of the drawings of the present invention, based on the application of the microwave-doppler detecting module in the scenario of the above mentioned microwave detection module of columnar radiation source structure, the present invention further provides a microwave-doppler detecting device.

Specifically, referencing to FIG. 15, the microwave-doppler detecting module 10 corresponding to FIG. 9 is embodied in the previously mentioned application scenario of the microwave detection module of columnar radiation source structure, wherein the microwave-doppler detecting device comprises the microwave-doppler detecting module 10 and an electromagnetic shielding layer 20, wherein the electromagnetic shielding layer 20 has a through hole, wherein the circuit board 13 is disposed in a shielded space corresponding to a side of the electromagnetic shielding layer 20, wherein the first radiating source pole 111 and the second radiating source pole 112 are disposed in another space corresponding to another side of the electromagnetic shielding layer 20, wherein the first feeder wire 15 and the second feeder wire 16 pass through the electromagnetic shielding layer 20 through the through hole 22 to form and construct the circuit connection structure among the first radiating source pole 111 and the second radiating source pole 112 and the circuit unit 14, so as to utilize the arrangement of the first radiating source pole 111 and the second radiating source pole 112 in a space outside of the shielded space to perform the activity sensing and detecting for the space outside of the shielded space. In which, with respect to the design of the shape of the first radiating source pole and the second radiating source pole 112, the projected area of the first radiating source pole 111 and the second radiating source pole 112 in the direction perpendicular to the electromagnetic shielding layer 20 on the electromagnetic shielding layer 20 can be reduced, which facilitates to reduce the size of the through hole 22, which helps to maintain the completeness of the electromagnetic shielding layer 20 and to enhance the stealth of the mounting of the microwave-doppler detecting module 10 in the microwave-doppler detecting device.

It is understandable that the first radiating source pole 111 and the second radiating source pole 112 are coupled in an antithetical manner, so that when the first radiating source pole 111 and the second radiating source pole 112 are in the space corresponding to the same side of the electromagnetic shielding layer 20, the coupling between the first radiating source pole 111 and the second radiating source pole 112 is capable of avoiding the impediment of the electromagnetic shielding layer 20, so as to facilitate to maintain the detecting stability of the microwave-doppler detecting module 10 mounted in the microwave-doppler detecting device.

Especially, according to one embodiment of the present invention, the electromagnetic shielding layer 20 is configured to be a LED light board and have a plurality of LED lights 21 arranged on the side of the second radiating source pole 112 corresponding to the first radiating source pole 111, wherein based on the shapes of the first radiating source pole 111 and the second radiating source pole 112, the projected area of the first radiating source pole 111 and the second radiating source pole 112 on the electromagnetic shielding layer in the direction perpendicular to the electromagnetic shielding layer 20 can be reduced, so that the size of the through hole 22 can correspondingly be reduced and the microwave-doppler detecting module 10 is allowed to be mounted on the microwave-doppler detecting device through having first radiating source pole 111 and the second radiating source pole 112 pass through, which facilitates the integrity and completeness of the LED light board and facilitates to avoid the LED light board from rendering dark zone.

Corresponding to FIG. 16, the microwave-doppler detecting module 10A as illustrated in FIG. 13 is embodied in the previously mentioned application scenario of the microwave detection module of columnar radiation source structure, wherein the microwave-doppler detecting device comprises the microwave-doppler detecting module 10A and an electromagnetic shielding layer 20A, wherein the electromagnetic shielding layer 20A has a through hole, wherein the circuit board 13A is disposed in a shielded space corresponding to a side of the electromagnetic shielding layer 20A, wherein the first radiating source pole 111A and the second radiating source pole 112A are disposed in another space corresponding to another side of the electromagnetic shielding layer 20A, wherein the first feeder wire 15A and the second feeder wire 16A pass through the electromagnetic shielding layer 20A through the through hole 22A to form and construct the circuit connection structure among the first radiating source pole 111A and the second radiating source pole 112A and the circuit unit 14A, so as to utilize the arrangement of the first radiating source pole 111A and the second radiating source pole 112A in a space outside of the shielded space to perform the activity sensing and detecting for the space outside of the shielded space. In which, with respect to the design of the shape of the first radiating source pole and the second radiating source pole 112A, the projected area of the first radiating source pole 111A and the second radiating source pole 112A in the direction perpendicular to the electromagnetic shielding layer 20A on the electromagnetic shielding layer 20A can be reduced, which facilitates to reduce the size of the through hole 22A, which helps to maintain the completeness of the electromagnetic shielding layer 20A and to enhance the stealth of the mounting of the microwave-doppler detecting module 10A in the microwave-doppler detecting device.

It is worth mentioning that when the second feeder wire 16A and the first feeder wire 15A are configured in a manner that the second feeder wire 16A is a shielding wire surrounding and encircling the first feeder wire 15A and that the shielding wire is insertably arranged in a manner to form a insertable and connectable circuit connection structure among the first radiating source pole 111A and the second radiating source pole 112A and the circuit unit 14A, such as that the shielding wire is configured to be a insertable and connectable structure with the medium substrate 18A or the circuit board 13A so as to form an insertable and connectable circuit connection structure among the first radiating source pole 111A and the second radiating source pole 112A and the circuit unit 14A, the size of the through hole 22A of the electromagnetic shielding layer 20 is allowed to be configured to meet the wire diameter of the shielding wire, which facilitates to reduce the size of the through hole 22A, so as to facilitate to maintain the integrity and completeness of the electromagnetic shielding layer 20A and enhance the stealth of the microwave-doppler detecting module 10A mounted on the microwave-doppler detecting device.

Especially, according to one embodiment of the present invention, the electromagnetic shielding layer 20A is configured to be a LED light board and have a plurality of LED lights 21A arranged on the side of the second radiating source pole 112A corresponding to the first radiating source pole 111A, wherein based on the shape of the first radiating source pole 111A and the second radiating source pole 112A, the projected area of the first radiating source pole 111A and the second radiating source pole 112A on the electromagnetic shielding layer in the direction perpendicular to the electromagnetic shielding layer 20A can be reduced, so as to facilitate to avoid the LED light board from rendering dark zone.

It is understandable that based on the electromagnetic wave reflection characteristic of the electromagnetic shielding layer 20A, the electromagnetic reflecting surface 12A can be equivalently formed on the electromagnetic shielding layer 20A. In other words, the electromagnetic reflecting surface 12A corresponding formed on the circuit board 13A may be omitted. In other words, according to one embodiment of the present invention, the electromagnetic reflecting surface 12A corresponding formed on the circuit board 13A shall not be a limitation to the microwave-doppler detecting device of the present invention.

It is worth mentioning that the above embodiments and alternative modes thereof are only examples, based on an antithetical coupling manner, the microwave-doppler detecting module comprises at least a pair of the antithetical dipoles, wherein the shapes and sizes of the first radiating source pole and the second radiating source pole of each pair of the antithetical dipoles may vary and the first radiating source pole and the second radiating source pole in the shielded space corresponding to a side of the electromagnetic shielding layer may extend through the through hole to a space out of the shielded space corresponding to the other side of the electromagnetic shielding layer, so as for achieving the installation of the microwave-doppler detecting module on the corresponding microwave-doppler detecting device, for achieving the activity detecting outside of the shielded space through breaking through the shielded space, and for maintaining the integrity and completeness of the electromagnetic shielding layer. It not only benefits the stealth of the installation of the microwave-doppler detecting module on the microwave-doppler detecting device, but also achieves detection to the space outside of the shielded space without blind angle. It is understandable that the electromagnetic shielding layer of the microwave-doppler detecting device is not limited to be embodied to be a LED light board. The understanding to the electromagnetic shielding layer shall be as a functional layer with an electromagnetism shielding function, which includes, but not limited to a metal (net) layer, compound layer with metal component, metal oxide layer, and etc. Hence, the electromagnetic shielding layer may also be embodied to be a device case with an electromagnetism shielding function, such as a light shell, an air conditioner shell, an elevator cargo, and etc.

Referring to FIG. 17A to FIG. 22, the microwave-doppler detecting module according to the preferred embodiment of the present invention is embodied as a side-orientation bias-type microwave detection device of a strip light 1', wherein the structural design and performance parameters of the side orientation bias-type microwave detection device are adapted to match the strip light 1' to achieve the simplified design of the strip light 1'.

Figure 17A:
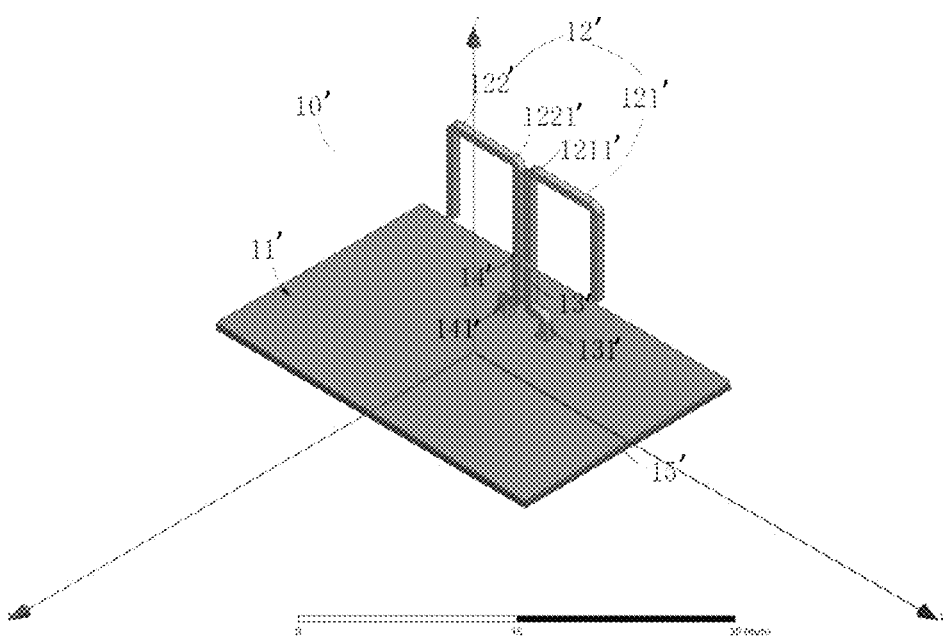
FIG. 17A is a schematic view of an antenna unit of a side orientation bias-type microwave detection device according to the preferred embodiment of the present invention.
Figure 17B:
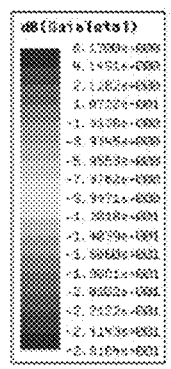
FIG. 17B is a schematic view illustrating a three-dimensional radiation directional pattern of the antenna unit of the side orientation bias-type microwave detection device according to the preferred embodiment of the present invention.
Figure 17C:
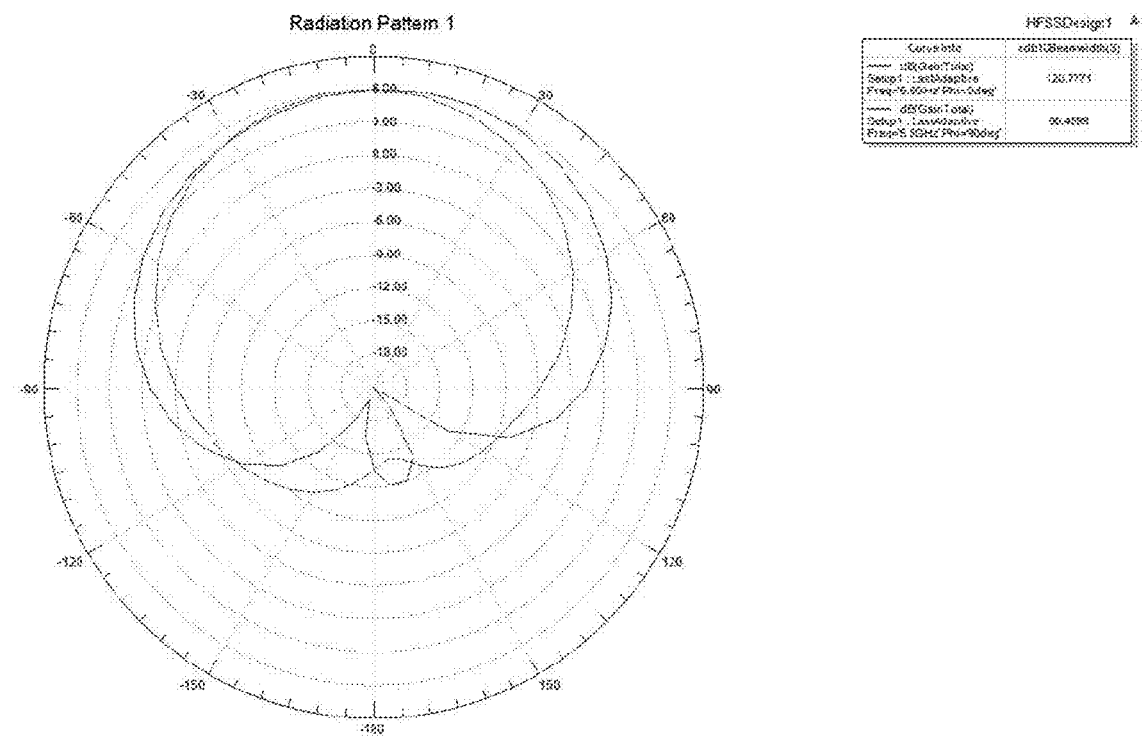
FIG. 17C is a schematic view illustrating a two-dimensional radiation directional pattern of the antenna unit of the side orientation bias-type microwave detection device according to the preferred embodiment of the present invention.

Referring to FIG. 17A to FIG. 17C, the structure and the radiation pattern of an antenna unit 10' of the side orientation bias-type microwave detection device 6' are illustrated, wherein the antenna unit 10' comprises a reference ground surface 11', which is an electromagnetic reflecting surface, and a pair of antithetical poles 12' provided in a side orientation of the reference ground surface 11', so as to define a directed radiation direction of the antenna unit 10 in the orientation of the reference ground surface 11' while the antenna unit 10' is in a feeding state. It is appreciated that the antenna unit 10' is embodied as the microwave-doppler detecting module 10 as illustrated in FIG. 1 to FIG. 16, and the reference ground surface 11' is functioned as the electromagnetic reflecting surface 12 and 12A of the preferred embodiment as shown in FIGS. 3, 5, 7, and 9-14.

Similarly, the pair of the antithetical poles 12' includes a first radiating source pole 121' and a second radiating source pole 122', wherein the first radiating source pole 121' has a first feed end 1211', the second radiating source pole 122' has a second feed end 1221'. The first radiating source pole 121' is arranged as a conductor extending at an end of the first feed end 1211'. The second radiating source pole 122' is arranged as a conductor extending at an end of the second feed end 1221'. When the first radiating source pole 121' is electrically fed at the first feed end 1211', the first radiating source pole 121', from the first feed end 1211' along the first radiating source pole 121', is correspondingly coupled to corresponding positons of the second feed end 1221' of the second radiating source pole 122' along the second radiating source pole 122', so as to form the antithetical coupling arrangement between the first radiating source pole 121' and the second radiating source pole 122', so as to reduce an dependence of the directional radiation characteristics of the antenna unit 10' on the area of the reference ground surface 11' based on the coupling of the first radiating source pole 121' and the second radiating source pole 122'.

It is worth mentioning that corresponding to the structural relationship of the arrangement of the pair of the antithetical poles 12' at a side orientation of the reference ground surface 11', the pair of the antithetical poles 12' is arranged in such a manner that a connection segment of a projection point of the first feed end 1211' and the second feed end 1221' on the reference ground surface 11' is deviated from a physical center point of the reference ground surface 11'.

Specifically, according to this preferred embodiment of the present invention, the reference ground surface 11' is configured in a rectangular form, wherein the pair of the antithetical poles 12' is arranged at a side orientation of the reference ground surface 11' in such a manner that the pair of the antithetical poles 12' is biased towards one side of the rectangular reference ground surface 11'.

More specifically, according to this preferred embodiment of the present invention, the first radiating source 121' and the second radiating source pole 122' are extended from their ends, i.e. the first feed end 1211' and the second feed end', respectively along an initial extension direction away from each other, wherein a center point of the connection segment of the projection point of the first feed end 1211' and the second feed end 1221' on the reference ground surface 11' and the physical center point of the reference ground surface 11' are perpendicular to the initial extension direction of the first radiating source pole 121' and the second radiating source pole 122', so that while the pair of the antithetical poles 12' is arranged at the side orientation of the reference ground surface 11', a balanced distribution of the reference ground surface 11' in the initial extension direction of the first radiating source pole 121' and the second radiating source pole 122' is ensured, and, correspondingly, a balanced distribution of the radiation pattern of the antenna unit 10' is ensured and the radiation of the antenna unit 10' in an opposite space of the directed radiation direction is suppressed, so as to suppress a self-excited interference based on strong reflection and multipath reflection.

In addition, according to this embodiment of the present invention, a mid-perpendicular line of the connection segment of the projection point of the first feed end 1211' and the second feed end 1221' passes the physical center point of the reference ground 11', wherein the first radiating source pole 121' and the second radiating source pole 122', where the first feed end 1211' and the second feed end 122' acting as the ends thereof, have the initial extension direction opposite to the direction of the connection segment. Accordingly, while the pair of the antithetical poles 12' is arranged in the side orientation of the reference ground surface 11', the balanced distribution of the reference ground surface 11' in the initial extension direction of the first radiating source pole 121' and the second radiating source pole 122' is ensured, and, correspondingly, the balanced distribution of the radiation pattern of the antenna unit 10' is ensured and the radiation of the antenna unit 10' in the opposite space of the directed radiation direction is suppressed, so as to suppress the self-excited interference based on strong reflection and multipath reflection.

Optionally, in other embodiments of the present invention, the first feed end 1211' and the second feed end 1221' extend through the physical center point of the reference ground surface 11' in the connection segment of the projection point of the reference ground surface 11', wherein the first radiating source pole 121' and the second radiating source pole 122', where the first feed end 1211' and the second feed end 1221' acting as the ends thereof, have a dislocation reverse initial extension direction perpendicular to the direction of the connection segment, respectively. Accordingly, while the pair of the antithetical poles 12' is arranged in the side orientation of the reference ground surface 11', the balanced distribution of the reference ground surface 11' in the initial extension direction of the first radiating source pole 121' and the second radiating source pole 122' is ensured, and, correspondingly, the balanced distribution of the radiation pattern of the antenna unit 10' is ensured and the radiation of the antenna unit 10' in the opposite space of the directed radiation direction is suppressed, so as to suppress the self-excited interference based on strong reflection and multipath reflection.

Further, the second radiating source pole 122 and the first radiating source pole 121' are arranged to have a length from the second feed end 1221' and the first feed end 1211' satisfying a range greater than or equal to $\lambda/16$, respectively, wherein $\lambda$ is a wavelength parameter corresponding to a frequency of the electrical feeding signal. The first radiating source pole 121' is arranged to have a length between the first feed end 1211' and the other end opposing the first feed end 1211' satisfying a range greater than or equal to $\lambda/16$. The second radiating source pole 122' is arranged to have a length between the second feed end 1221' and the other end opposing the second feed end 1221' satisfying a range greater than or equal to $\lambda/16$. In other words, the first radiating source pole 121' and the second radiating source pole 122' each allows a minimum length of $\lambda/16$ from the first feed end 1211' and the second feed end 1221' respectively.

Further, the second feed end 1221' and the first feed end 1211' are close to each other and satisfy that a distance between the second feed end 1221' and the first feed end 1211' is less than or equal to $\lambda/4$, so that when the first radiating source pole 121' is fed at the first feed end 1211', the first radiating source pole 121' and the second radiating source pole 122' can be coupled with each other, and the energy coupled between the first radiating source pole 121' and the second radiating source pole 122' can be maximized.

In particular, while the pair of the antithetical poles 12' is arranged in the side orientation of the reference ground surface 11', the distance between the first feed end 1211' and the second feed end 1221' and the reference ground surface 11' satisfies a range greater than or equal to λ/32 so as to ensure the directional radiation characteristics of the antenna unit 10'.

Further, an extension manner of the first radiating source pole 121' preferably satisfies that the distance between the first feed end 1211' and the reference ground surface 11' is greater than the distance between the other end of the first radiating source pole 121' opposing the first feed end 1211' and the reference ground surface 11', wherein the extension manner of the second radiating source pole 122' preferably satisfies that the distance between the second feed end 1221' and the reference ground surface 11' is greater than the distance between the other end of the second radiating source pole 122' opposing the second feed end 1221' and the reference ground surface 11', so as to facilitate the coupling between the ends of the first radiating source pole 1211 and the second radiating source pole 122' that have a higher current density distribution and the reference ground surface 11' to define the directional radiation, and that under the premise requirements of forming the directional radiation, based on the maximization of the energy coupled between the ends of the first radiating source pole 121' and the second radiating source pole 122', the area requirement for the reference ground surface 11' is reduced.

Specifically, according to this embodiment of the present invention, the first radiating source pole 121' extends from the first feed end 1211' in sequence towards a first direction away from the second feed end 1221' and then a second direction approaching the reference ground surface 11', and the second radiating source pole 121' extends from the second feed end 1211' in sequence towards a first direction away from the first feed end 1211' and then a second direction approaching the reference ground surface 11'. That is the first radiating source pole 121' and the second radiating source pole 122' are respectively extended from the first feed end 1211' and the second feed end 1221' to in a direction away from each other and then in a direction close to the reference ground surface 11'. Accordingly, the distance between the first feed end 1211' and the reference ground surface 11' is greater than the distance between the other end of the first radiating source pole 121' opposing the first feed end 1211' and the reference ground surface 11', and the distance between the second feed end 1221' and the reference ground surface 11' is greater than the distance between the other end of the second radiating source pole 122' opposing the second feed end 1221' and the reference ground surface 11'.

Further, the antenna unit 10 further comprises a first feeder wire 13' and a second feeder wire 14', wherein the first feed end 1211' of the first radiating source pole 121' is electrically coupled to one pole of the corresponding feed source through the first feeder wire 13', wherein the second feed end 1221' of the second radiating source pole 122' is electrically couple to the other pole of the feed source through by the second feeder wire 14', so as to form an electrical connection relationship between the pair of the antithetical poles 12' and the feed source.

Further, the antenna unit 10' further comprises a circuit board 15', wherein the reference ground surface 11' is provided on the circuit board 15' in the form of a copper cladding layer. The first feeder wire 13' and the second feeder wire 14' are fixed to the circuit board 15', such that the first radiating source pole 121' and the second radiating source pole 122' are supported by the first feeder wire 13' and the second feeder wire 14' respectively. According to this preferred embodiment of the present invention, the first feeder wire 13' and the second feeder wire 14' are embodied as electric feeding pins to affix to the circuit board 14'. It should be understood that in other embodiments of the present invention, the first feeder wire 13' and the second feeder wire 14' can also be embodied as being attached on the circuit board 14' by means of electric feeding attachment configuration, wherein such electric feeding means does not constitute a restriction to the scope of the present invention.

It is worth mentioning that, according to this embodiment of the present invention, based on the affixation of the second feeder wire 14' to the circuit board 15' and the electrical connection between the second feeder wire 14' and the reference ground surface 11', an electrical connection relationship is formed between the second feed wire 14' and the ground pole of the corresponding feed source, thereby helping to ensure the consistency of the antenna unit 10' in the electrical connection configuration.

Further, according to this embodiment of the present invention, the first feeder wire 13' and the second feeder wire 14' have parallel segments extending in parallel from the first feed end 1211' and the second feed end 1221' respectively in a direction towards the reference ground surface 11' so as to enable a parallel electric feeding transmission, such that a distance between the parallel segments of the first feeder wire 13' and the second feeder wire 14' corresponds to a distance between the first feeder end 1211' and the second feeder end 1221' satisfies less than or equal to λ/4 that facilitates to reduce a depletion caused by the mutual coupling between the first feeder wire 13' and the second feeder wire 14' and to ensure the beneficial performance and resonant stability of the antenna unit 10'.

It is also worth mentioning that, due to the small distance between the first feeder wire 13' and the second feeder wire 14', in order to ensure the stability of the electrical connection configuration of the first feeder wire 13' and the second feeder wire 14' and the corresponding circuit, the first feeder wire 13' and the second feeder wire 14' have a first feeder pin 131' and a second feeder pin 141' respectively, each of which is extended along a direction away from each other from the ends of the parallel segments close to the reference ground surface 11' correspondly and a direction towards the reference ground surface 11'. Accordingly, when the first feeder pin 131' of the first feeder wire 13' and the second feeder pin 141' of the second feeder wire 14' are fixed and electrically connected to the circuit board 15' by welding, the first feeder wire 13' and the second feeder wire 14' can avoid being electrical contacted that ensures the performance of the antenna unit 10' and enhances the support stability of the first radiating source pole 121' and the second radiating source pole 122' by means of the first feeder wire 13' and the second feeder wire 14'.

Figure 18A:
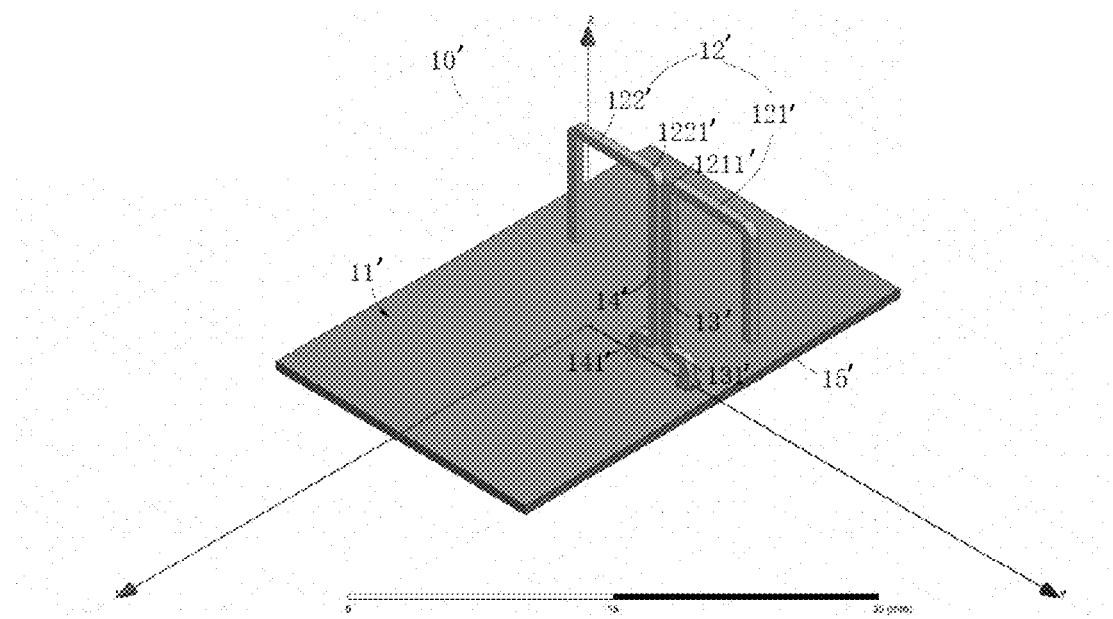
FIG. 18A is a schematic view of an antenna unit of the antenna unit of the side orientation bias-type microwave detection device according to an alterative mode of the preferred embodiment of the present invention.
Figure 18B:
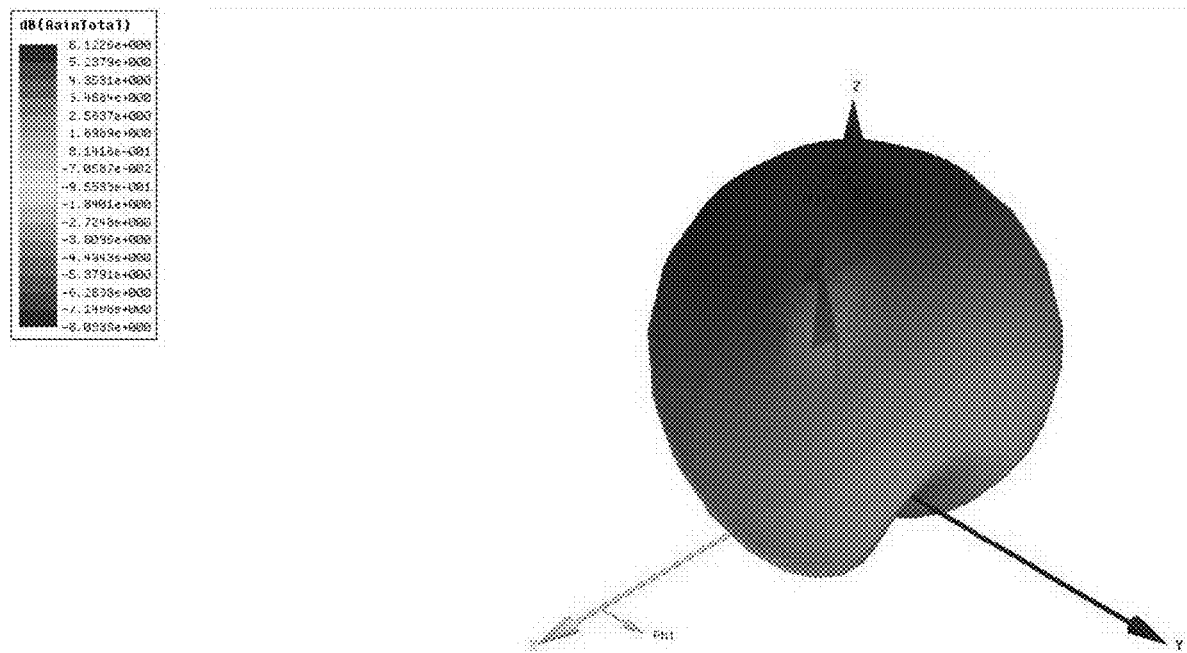
FIG. 18B is a schematic view illustrating a three-dimensional radiation directional pattern of the antenna unit of the side orientation bias-type microwave detection device according to the alternative mode the preferred embodiment of the present invention.
Figure 18C:
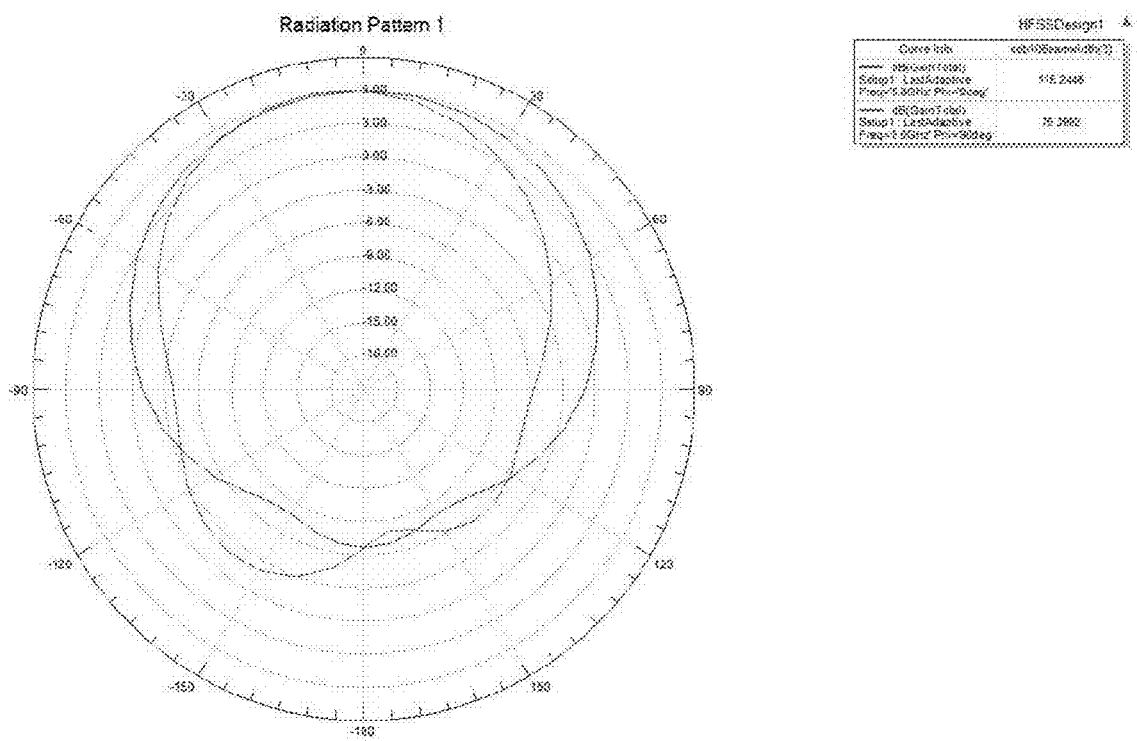
FIG. 18C is a schematic view illustrating a two-dimensional radiation directional pattern of the antenna unit of the side orientation bias-type microwave detection device according to the alternative mode of the preferred embodiment of the present invention.

Similarly, referring to FIG. 18A to FIG. 18C of the drawings of the present invention, an alternative mode of the antennal unit 10' of the side orientation bias-type microwave detection device 6' and its radiation directional pattern is illustrated. According to this embodiment of the preferred embodiment, while the connection segments of the projection points of the first feed end 1211' and the second feed end 1221' at the reference ground surface 11' deviates from the physical center point of the reference ground surface 11', the connection segments of the projection points of the first feed end 1211' and the second feed end 1221' at the reference ground surface 11' extend through the physical point of the reference ground surface 11'. At the same time, the first radiating source pole 121' and the second radiating source pole 122, where the first feed end 1211' and the second feed end 1221' acting as the ends thereof, have an initial extension direction opposite to the direction of the connection segments, corresponding to the pair of the antithetical poles 12' arranged in the side orientation of the reference ground surface 11', such that the reference ground surface 11' in the initial extension directions of the first radiating source pole 121' and the second radiating source pole 122' is unevenly distributed, and correspondingly, the radiation pattern of the antenna unit 10' is significantly enhanced in comparison with the radiation pattern as shown in FIG. 17B and FIG. 17C in the backward space in the directed radiation direction, thereby being detrimental to suppressing the self-excitation interference based on strong reflection and multipath reflection.

Thus, while the pair of the antithetical poles 12' are arranged in the side orientation of the reference ground surface 11', corresponding to the connection segment of the projection point of the first feed end 1211' and the second feed end 1221's at the the reference ground surface 11' being deviated from the physical center point of the reference ground surface 11', preferably, the connection between the midpoint of the connection segment of the projection point of the first feed end 1211' and the second feed end 1221' at the reference ground surface 11' and the physical center point of the reference ground surface 11' is perpendicular to the initial extension direction of the first radiating source pole 121' and the second radiating source pole 122'. Accordingly, while the pair of the antithetical poles 12' is arranged in the side orientation of the reference ground surface 11', the balanced distribution of the reference ground surface 11' in the initial extension direction of the first radiating source pole 121' and the second radiating source pole 122' is ensured, and, correspondingly, the balanced distribution of the radiation pattern of the antenna unit 10' is ensured and the radiation of the antenna unit 10' in the directed radiation direction of the backward space is suppressed so as to suppress the self-excited interference based on strong reflection and multipath reflection.

Figure 19A:
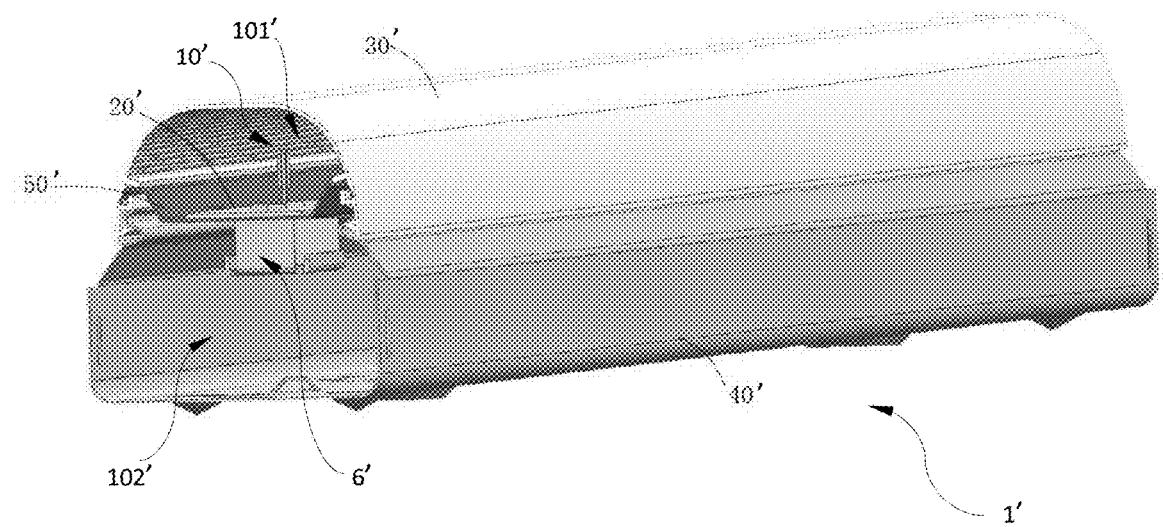
FIG. 19A is a partial perspective view of a strip light according to the preferred embodiment of the present invention.
Figure 19B:
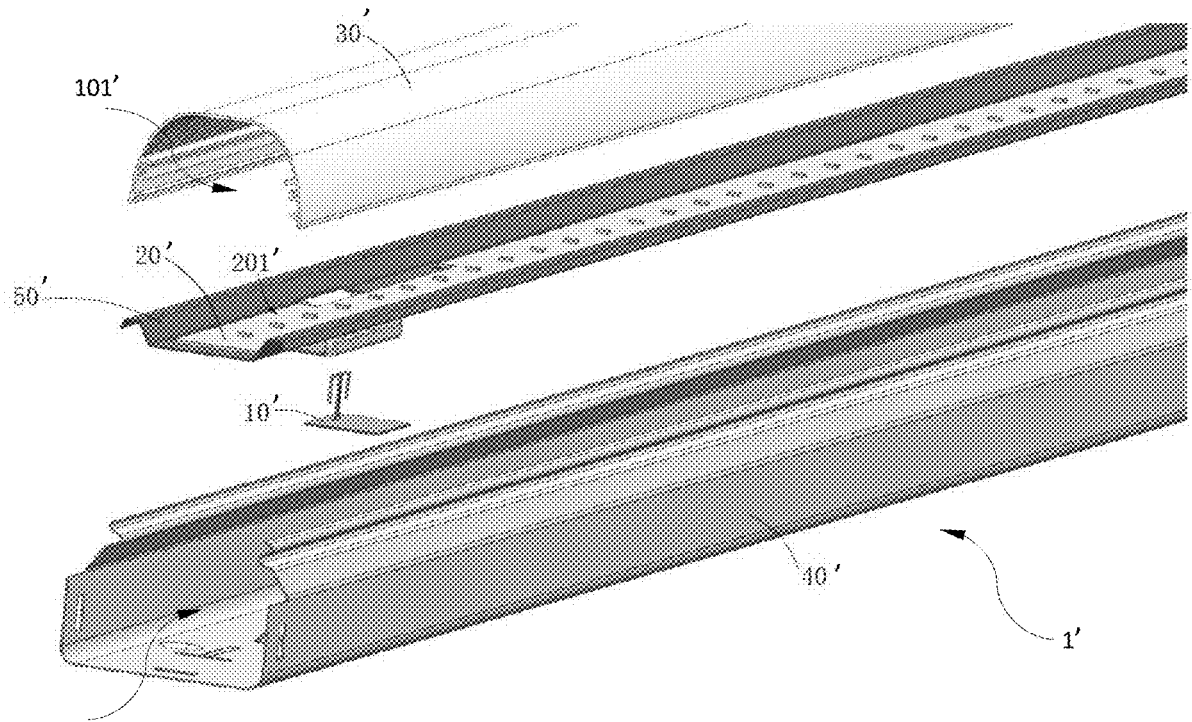
FIG. 19B is a partial exploded view of the strip light according to the preferred embodiment of the present invention.

Further referring to FIG. 19A and FIG. 19B of the drawings of the present invention, according to this embodiment of the present invention, a partial perspective and an exploded view of a strip light 1' is illustrated, wherein the strip light 1' comprises the side orientation bias-type microwave detection device 6' as described above and a strip light board 20', wherein the strip light board 20' has a light emitting surface 201' arranged with light sources on one side thereof, such that a lighting direction of the strip light 1' is oriented corresponding to an orientation of the light emitting surface 201'. Therefore, the structural design and performance parameters of the side orientation bias-type microwave detection device 6' can match the relationship between the strip light 1' and the side orientation bias-type microwave detection device 6' correspondingly and adapt the installation of the side orientation bias-type microwave detection device 6' inside the strip light 1', such that a directional radiation performance of the side orientation bias-type microwave detection device 6' in the lighting direction of the strip light 1' will not be destroyed due to the obstruction of the strip light board 20', and the strip light 1' during the lighting state will not form a dark area according to the installation of the side orientation bias-type microwave detection device 6', so as to achieve a matching relationship between the structural design and performance parameters of the side orientation bias-type microwave detection device 6' and the strip light 1'. Thus, the side orientation bias-type microwave detection device 6' is able to be installed inside the strip light 1' to achieve the simplified design of the strip light 1'.

Specifically, the strip light 1' further comprises a strip like lightshade 30' and a strip like shell 40', wherein the strip light board 20' is arranged in such a manner that a forward space 101' is defined between the strip light board 20' and the lightshade 30' and a backward space 102' is defined between the strip light board 20' and the shell 40' while the light emitting surface 201' thereof is facing towards the lightshade 30', wherein according to a structural relationship of the pair of the antithetical poles 12' of the antenna unit 10 being arranged at a side orientation of the reference ground surface 11', corresponding to the installation of the antenna unit 10' in the strip light 1', the antenna unit 10' is arranged in such manner that the reference ground surface 11' is located in the backward space 102' and the pair of the antithetical poles 12' is extended from a forward side of the strip light board 20' and located in the forward space 101', so as to achieve the matching relationship between the structural design and performance parameters of the side orientation bias-type microwave detection device 6' and the strip light 1' to accomplish the simplified design of the strip light 1'.

Further, according to this embodiment of the present invention, the strip light 1' further comprises a light board carrier 50', wherein the light board carrier 50' is installed in the lightshade 30' or the shell 40' while the light board carrier 50' is arranged between the forward space 101' and the backward space 102', wherein the strip light board 20' is carried in the light board carrier 50' while the light emitting surface 201' thereof is facing the lightshade 30', wherein the antenna unit 10' is arranged in such a manner that the reference ground surface 11' is located in the backward space 102' and the pair of the antithetical poles 12' passes through the light board carrier 50' and is extended at the forward side of the strip light board 20' and located in the forward space 101' so as to meet the aforementioned matching relationship to achieve the installation of the antenna unit 10 inside the strip light 1'.

It is worth mentioning that, according to this embodiment of the present invention, the strip light board 20' has an indented edge groove design at the side where the pair of the antithetical poles 12' extended out, so as to reserve a wider space for the extension of the pair of the antithetical poles 12' without increasing a width of the light board carrier 50', so as to facilitate to accomplish the narrowing design of the strip light 1'. It can be understood that, unlike the design of digging holes and digging in the middle of the strip light board 20, the edge groove design of the strip light board 20' will not destroy the entire circuit of the strip light board 20'. That is, the matching between the structural design and performance parameters of the side orientation bias-type microwave detection device 6' and the strip light 1' will not raise new matching requirements for the structure and circuit designs of the current strip light. The structural design and performance parameters of the side orientation bias-type microwave detection device 6' of the present invention can be utilized and match the current strip light, especially the strip light with a single strip light board 20' to provide obvious practical and commercial value.

In particular, according to in this embodiment of the present invention, the strip lightshade 30' has a functional slot design along a longitudinal direction thereof that matches any function of homogenization, astigmatism and light concentration, so as to adapt the use environment of the strip light 1' based on a selection of the corresponding strip lightshade 30'.

Figure 20A:
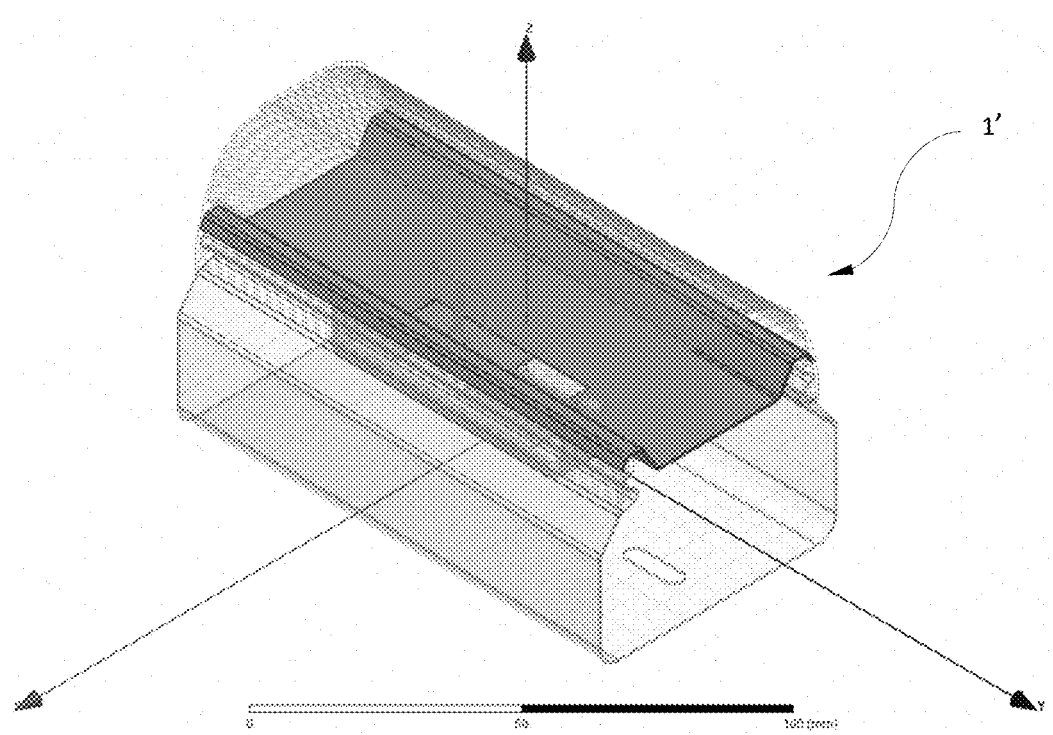
FIG. 20A is a schematic view of the strip light according to the preferred embodiment of the present invention.
Figure 20B:
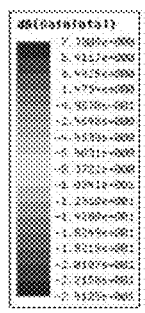
FIG. 20B is a schematic view illustrating a three-dimensional radiation directional pattern of the strip light according to the preferred embodiment of the present invention.
Figure 20B:
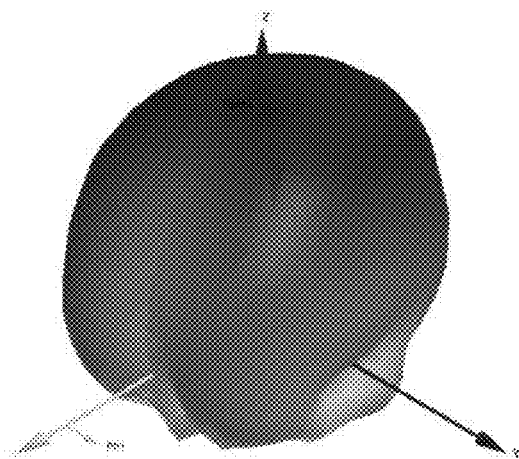
Figure 20C:
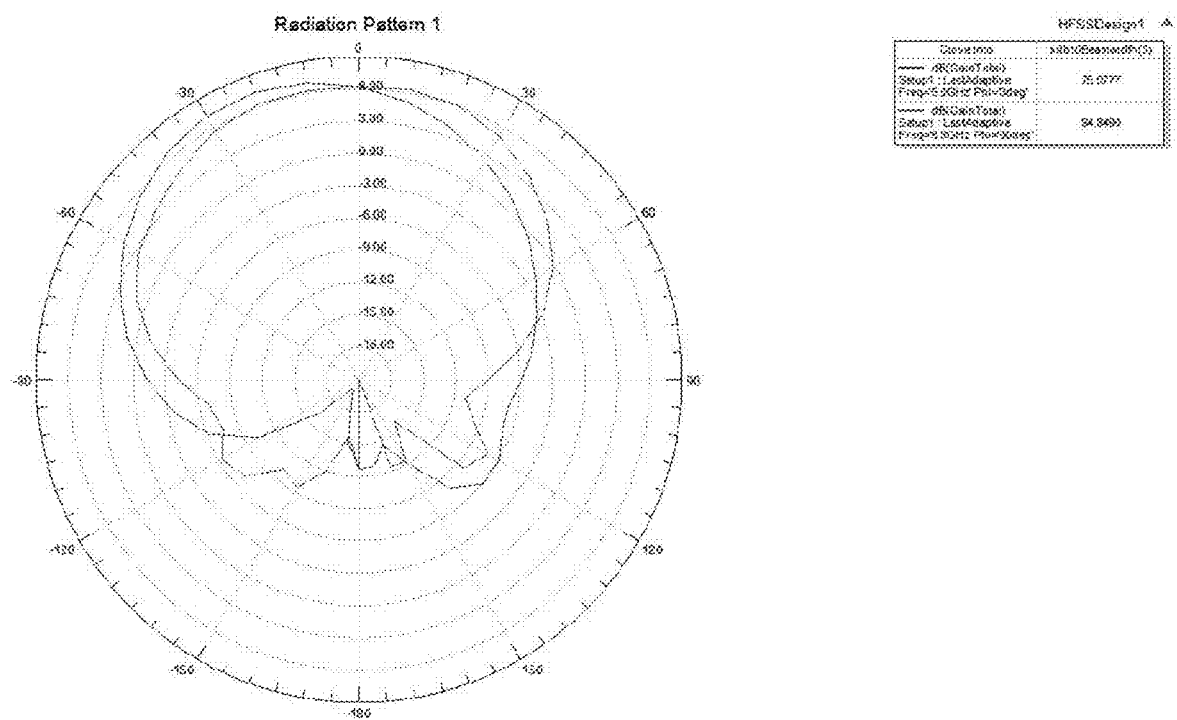
FIG. 20C is a schematic view illustrating a two-dimensional radiation directional pattern of the strip light according to the preferred embodiment of the present invention.
Figure 20D:
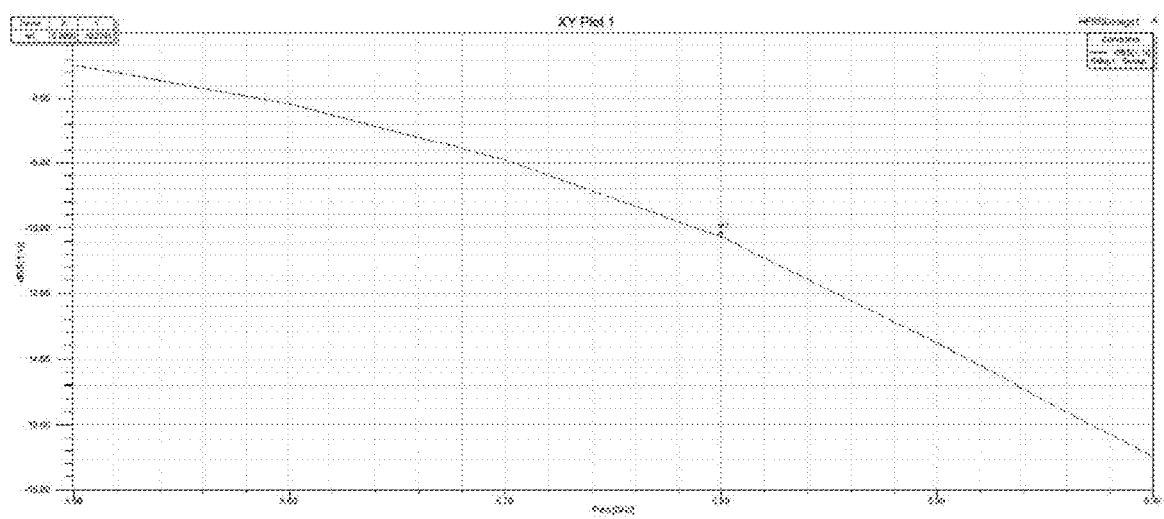
FIG. 20D is a diagram illustrating an S11 curve of the strip light according to the preferred embodiment of the present invention.

Further, referring to FIG. 20A to FIG. 20B of the drawings of the present invention, the simulation structure of the strip light 1' as shown in FIG. 20A and the radiation pattern of the simulated structure and the S11 curve diagram are respectively illustrated, wherein in comparison with FIG. 17B and FIG. 17C, it can be seen that based on the structural design of the pair of the antithetical poles 12' being installed at the side orientation of the reference ground surface 11', wherein the antenna unit 10' is arranged in such a manner that the reference ground surface 11 is arranged in the backward space 102' and the pair of the antithetical poles 12' passes through the light board carrier 50' and is extended out from the side of the strip light board 20' and located in the forward space 101', the balanced distribution of the radiation pattern of the antenna unit 10' and the directional radiation performance in the illumination direction of the strip light 1' will not be destroyed due to the blocking of the strip light board 20'. At the same time, the depletion of the antenna unit 10 can, corresponding to FIG. 20D, be maintained in a lower state, so that in favor of reducing the sensitivity, the antenna unit 10' is installed inside the strip light 1' while adjacent to the strip light board 20', the lightshade 30' and the shell 40', so as to avoid an self-excitation interference based on strong reflection and multipath reflection.

Figure 21A:
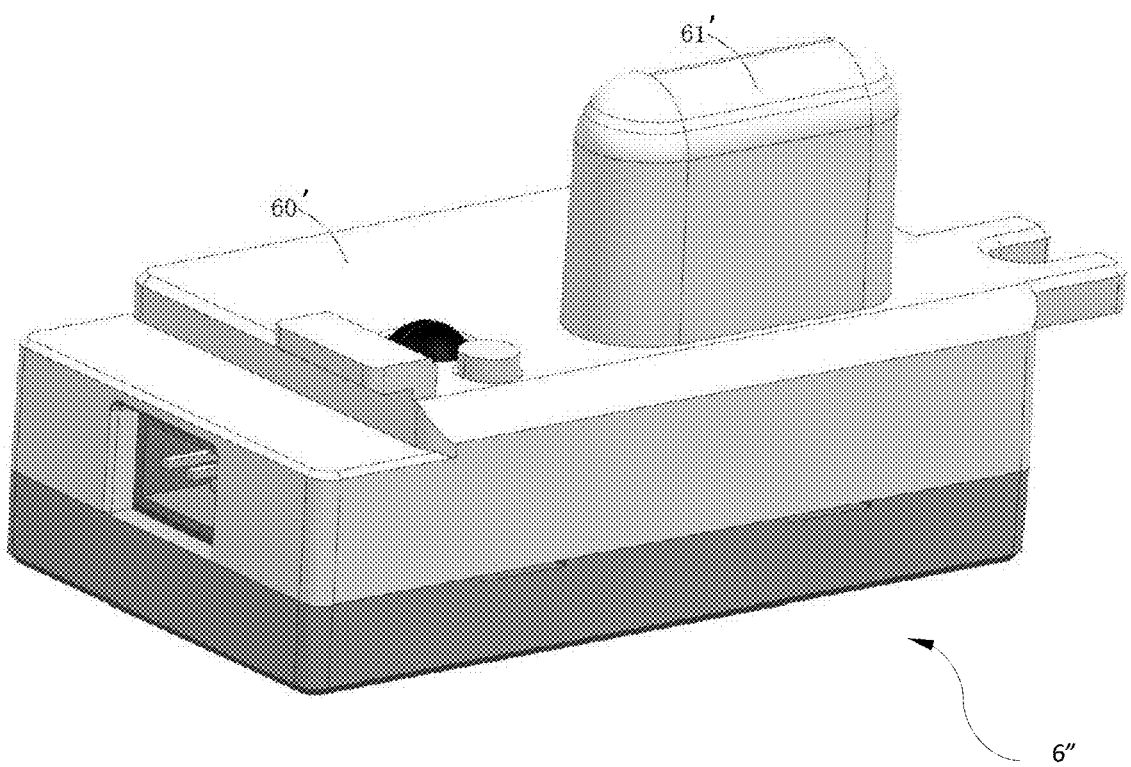
FIG. 21A is a perspective view of the side orientation bias-type microwave detection device of the strip light according to the preferred embodiment of the present invention.
Figure 21B:
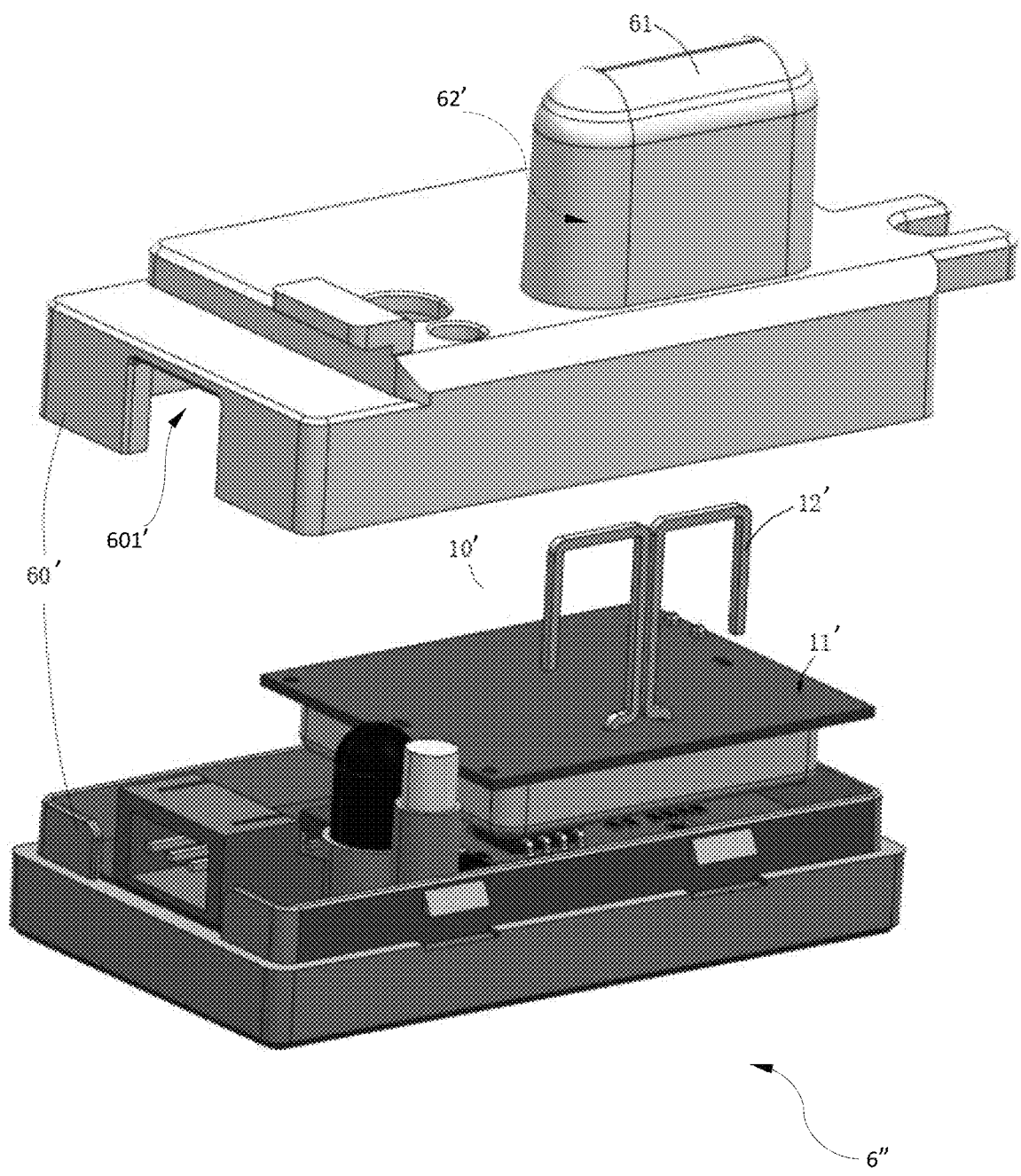
FIG. 21B is an exploded view of the side orientation bias-type microwave detection device of the strip light according to the preferred embodiment of the present invention.
Figure 21C:
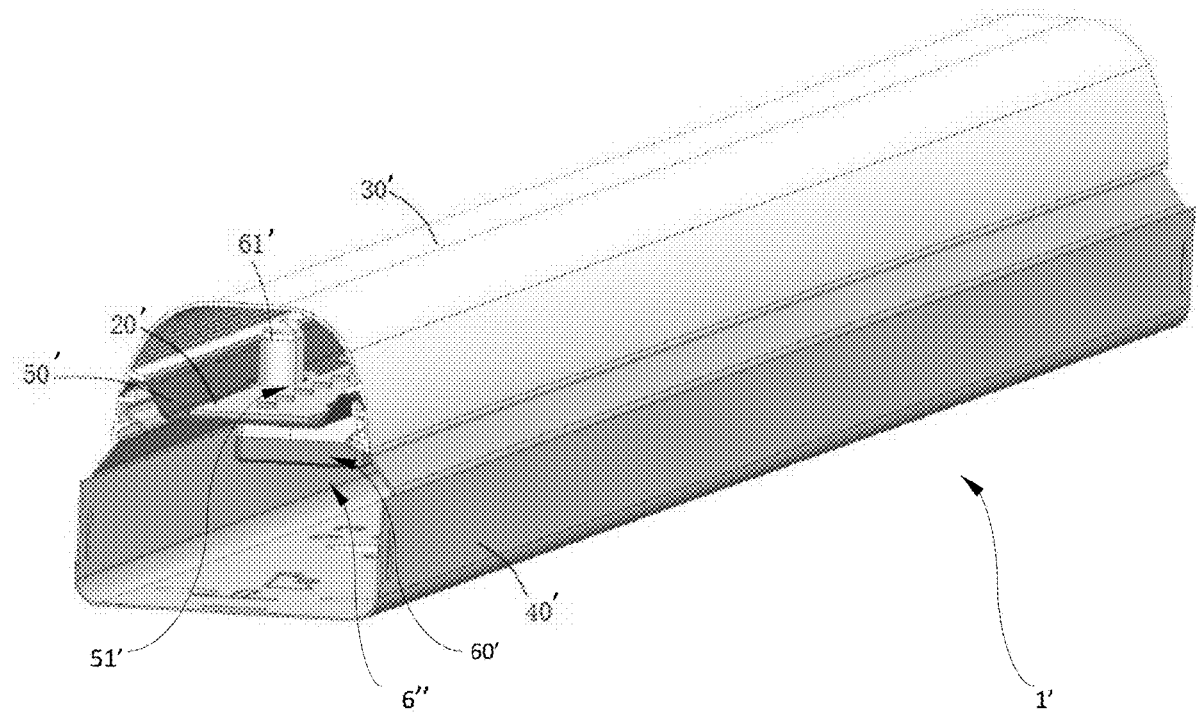
FIG. 21C is a perspective view of an alternative mode of the side orientation bias-type microwave detection device of the strip light according to the preferred embodiment of the present invention.

Further, referring to FIG. 21A to FIG. 21C of the drawings of the present invention, further optimized configuration of the side orientation bias-type microwave detection device 6" and the strip light 1' is illustrated according to the this embodiments of the present invention. The side orientation bias-type microwave detection device 6" comprises a housing 60' having a receiving cavity 601' defined therein, wherein the housing 60' has a protrusion portion 61' protruded thereon and a concave groove 62' defined in the receiving cavity 601, wherein the antenna unit 10' is accommodated in the receiving cavity 601' while the pair of the antithetical poles 12; is positioned in the concave groove 62', wherein the housing 60' is installed on the light board carrier 50' while the protrusion portion 61' passes through the light board carrier 50' and extended to the side of the strip light board 20' and located in the forward space 101', so as to meet the aforementioned matching relationship to achieve the installation of the side orientation bias-type microwave detection device 6" inside the strip light 1'.

It is worth mentioning that in this optimized configuration of the side orientation bias-type microwave detection device 6" of the present invention, the protrusion portion 61' of the housing 60' is made transparent, such that while the protrusion portion 61' passes through the light board carrier 50' and is extended from the side orientation of the strip light board 20' and located in the forward space 101', the strip light 1', during the illumination state, is ensured not to form a dark area according to the installation of the side orientation bias-type microwave detection device 6", and, correspondingly, the matching relationship between the structural design and performance parameters of the side orientation bias-type microwave detection device 6" and the strip light 1' is ensured.

Further, the light board carrier 50' has a mounting hole and a perforation 51' for the protrusion portion 61' as well as the pair of the antithetical poles 12 therein to pass through, wherein the housing 60' has one end engaged with an edge of the perforation 51' and the other end mounted to the mounting hole by screwing connection, so as to meet the aforementioned matching relationship to accomplish the installation of the side orientation bias-type microwave detection device 6" inside the strip light 1'.

Figure 22:
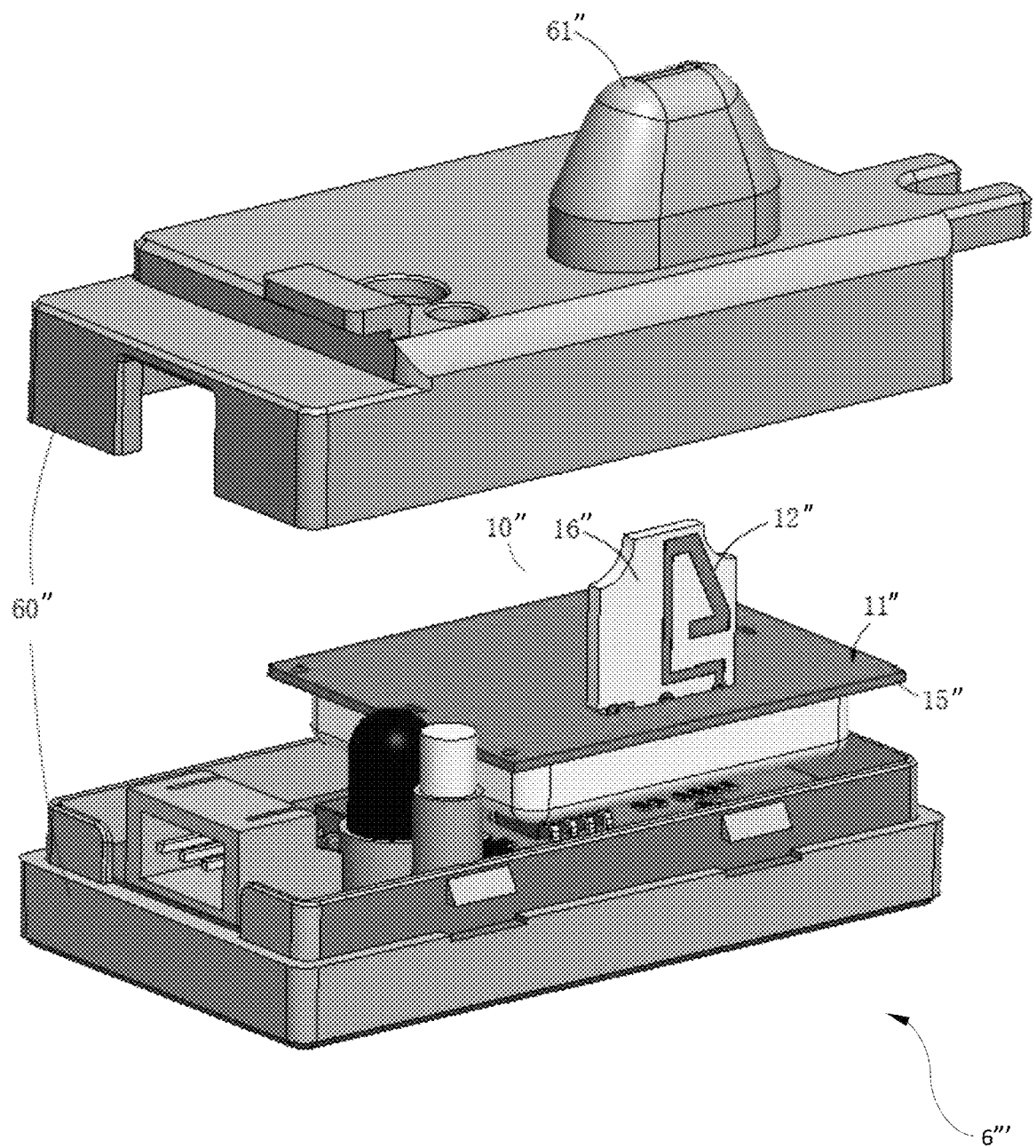
FIG. 22 is an exploded view of an alternative mode of the side orientation bias-type microwave detection device of the strip light according to the preferred embodiment of the present invention.

Further, referring to FIG. 22 of the drawings of the present invention, another optimized configuration of the side orientation bias-type microwave detection device 6''' of the strip light 1' according to the preferred embodiment of the present invention is illustrated, wherein the antenna unit 10" of the side orientation bias-type microwave detection device 6''' further comprises an antenna plate 16'' fixed to the circuit board 15", wherein the pair of the antithetical poles 12" and the first feeder wire 13" and the second feeder wire 14" are carried on the antenna plate 16" in the form of on-board conductors, wherein the method to fix the antenna plate 16" on the circuit board 15" does not constitute a limitation to the scope of the present invention. Further, the pair of the antithetical poles 12" may be carried on different sides of the antenna plate 16", or may be carried on the same side of the antenna plate 16", where the present invention is not limited to such configuration.

One skilled in the art should be able to understand that the above embodiments are just examples, which shall not limit the present invention. Therefore, features of various embodiments may also be interchanged and combined in order to easily come out and achieve other implementations that the drawings of the present invention have not specified based on the disclosed contents of the present invention. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microwave-doppler detecting module for radiating an electromagnetic wave for detecting an object activity in a directional space, comprising:

an electromagnetic reflecting surface; and a pair of a first dipole and a second dipole symmetrically coupled with each other and arranged spacingly in a side orientation of said electromagnetic reflecting surface in such a manner that when said microwave-doppler detection module is fed by a corresponding feeding signal, a directed radiation direction of said microwave-doppler detection module is formed in a direction of said electromagnetic reflecting surface, wherein said first dipole includes a first radiating source pole and said second dipole includes a second radiating source pole, wherein said first radiating source pole has a first feed end and said second radiating source pole has a second feed end, wherein said first radiating source pole is configured as a first conductor, selected from a group consisting of a conductive wire and an on-board conductor, extending at an end of the first feed end and said second radiating source pole is configured as a second conductor, selected from a group consisting of a conductive wire and an on-board conductor, extending at an end of the second feed end, so as to form a radiation space which is a coverage area of the electromagnetic wave radiated by said microwave-doppler detecting module and is formed in a radial direction of a connection of said first feed end and said second feed end to avoid a detection dead zone in said radial direction, wherein said first radiating source pole and said second radiating source pole have a length greater than or equal to $\lambda/16$ from said first feed end and said second feed end respectively, wherein said first feed end and said second feed end are adjacent to each other and satisfy that a distance between said first feed end and said second feed end is less than or equal to $\lambda/4$, and that a distance between said first feed end and said electromagnetic reflecting surface and a distance between said second feed end and said electromagnetic reflecting surface are greater than or equal to $\lambda/32$, wherein λ is a wavelength parameter corresponding to a frequency of the feeding signal, wherein corresponding to arrangement of said first dipole and said second dipole being arranged at said side orientation of said electromagnetic reflecting surface, said first dipole and said second dipole are arranged in such a manner that a connection segment of a projection point of said first feed end and said second feed end at said electromagnetic reflecting surface is deviated from a physical center point of said electromagnetic reflecting surface.

2. The microwave-doppler detecting module, as recited in claim 1, wherein said first radiating source pole and said second radiating source pole are extended from said first feed end and said second feed end in an initial extension direction away from each other, and that a distance between said first feed end of said first radiating source pole and said electromagnetic reflecting surface is greater than a distance between another end of said first radiating source pole, that is opposite to said first feed end, and said electromagnetic reflecting surface, wherein a distance between said second feed end of said second radiating source pole and said electromagnetic reflecting surface is greater than a distance between another end of said second radiating source pole, that is opposite to said second feed end, and said electromagnetic reflecting surface.

3. The microwave-doppler detecting module, as recited in claim 2, wherein said first feed end and said second feed end are extended through said physical center point of said electromagnetic reflecting surface at said connection segment of said projection point of said electromagnetic reflecting surface, and, corresponding, said first radiating source pole and said second radiating source pole have a dislocation reverse initial extension direction, perpendicular to a direction of said connection segment, from said first feed end and said second feed end respectively.

4. The microwave-doppler detecting module, as recited in claim 3, further comprising a first feeder wire and a second feeder wire, wherein said first feed end of said first radiating source pole is electrically coupled to one pole of a feed source through said first feeder wire, and said second feed end of said second radiating source pole is electrically coupled to another pole of said feed source through said second feeder wire, so as to form said pair of said antithetical poles and a feeding connection relationship between said pair of said antithetical poles and said feed source.

5. The microwave-doppler detecting module, as recited in claim 4, further comprising a circuit board, wherein said electromagnetic reflecting surface is carried on said circuit board in the form of a copper cladding layer and said first feeder wire and said second feeder wire are fixed to said circuit board.

6. The microwave-doppler detecting device, as recited in claim 4, further comprising a circuit board and an antenna plate fixed to said circuit board, wherein said electromagnetic reflective surface is carried on said circuit board in the form of a copper cladding layer, and that said pair of said antithetical poles with said first feeder wire and said second feeder wire are carried on said antenna plate in form of on-board conductors.

7. The microwave-doppler detecting device, as recited in claim 4, further comprising a housing which has a receiving cavity defined therein and a protrusion portion protruded at a side orientation of said housing, wherein said housing further has a concave slot formed corresponding to said protrusion portion, such that said pair of said antithetical poles is arranged in said receiving cavity and extended in said concave slot.

8. The microwave-doppler detecting module, as recited in claim 5, wherein said second radiating source pole is electrically connected with said electrical reflection surface while said second feeder wire is fixed to said circuit board so as to form an electrical connection relationship between said second radiating source pole and a ground pole of said feed source.

9. The microwave-doppler detecting module, as recited in claim 5, wherein said first feeder wire and said second feeder wire have parallel segments extending from said first feed end and said second feed end in a direction close to said electromagnetic reflecting surface so as to able to transmit a feed in parallel, so that a distance between said parallel segments of said first feeder wire and said second feeder wire corresponds to a distance between said first feeder end and said second feeder end is less than or equal to λ/4.

10. The microwave-doppler detecting module, as recited in claim 9, wherein said first feeder wire and said second feeder wire have ends, which have said parallel segments closing to said electromagnetic reflecting surface, in a direction of being away from each other, and a first feeding pin and a second feeding pin extending in a direction close to said electromagnetic reflecting surface.

11. The microwave-doppler detecting device, as recited in claim 10, wherein said first radiating source pole and said second radiating source pole extend sequentially from said first feeder wire and said second feeder wire in the direction away from each other and in a direction close to said electromagnetic reflective surface respectively.

12. The microwave-doppler detecting module, as recited in claim 2, wherein said first feed end and said second feed end pass through said physical center point of said electromagnetic reflecting surface in a middle perpendicular line of said connection segment of said projection point of said electromagnetic reflecting surface, wherein each of said first radiating source pole and said second radiating source pole has an initial extension direction opposite to a direction of said connection segment.

13. The microwave-doppler detecting module, as recited in claim 12, further comprising a first feeder wire and a second feeder wire, wherein said first feed end of said first radiating source pole is electrically coupled to one pole of a feed source through said first feeder wire, and said second feed end of said second radiating source pole is electrically coupled to another pole of said feed source through said second feeder wire, so as to form said pair of said antithetical poles and a feeding connection relationship between said pair of said antithetical poles and said feed source.

14. The microwave-doppler detecting module, as recited in claim 13, further comprising a circuit board, wherein said electromagnetic reflecting surface is carried on said circuit board in the form of a copper cladding layer and said first feeder wire and said second feeder wire are fixed to said circuit board.

15. The microwave-doppler detecting device, as recited in claim 13, further comprising a circuit board and an antenna plate fixed to said circuit board, wherein said electromagnetic reflective surface is carried on said circuit board in the form of a copper cladding layer, and that said pair of said antithetical poles with said first feeder wire and said second feeder wire are carried on said antenna plate in form of on-board conductors.

16. The microwave-doppler detecting device, as recited in claim 13, further comprising a housing which has a receiving cavity defined therein and a protrusion portion protruded at a side orientation of said housing, wherein said housing further has a concave slot formed corresponding to said protrusion portion, such that said pair of said antithetical poles is arranged in said receiving cavity and extended in said concave slot.

17. The microwave-doppler detecting module, as recited in claim 14, wherein said second radiating source pole is electrically connected with said electrical reflection surface while said second feeder wire is fixed to said circuit board so as to form an electrical connection relationship between said second radiating source pole and a ground pole of said feed source.

18. The microwave-doppler detecting module, as recited in claim 14, wherein said first feeder wire and said second feeder wire have parallel segments extending from said first feed end and said second feed end in a direction close to said electromagnetic reflecting surface so as to able to transmit a feed in parallel, so that a distance between said parallel segments of said first feeder wire and said second feeder wire corresponds to a distance between said first feeder end and said second feeder end is less than or equal to $\lambda/4$.

19. The microwave-doppler detection module, as recited in claim 18, wherein said first feeder wire and said second feeder wire have ends, which have said parallel segments closing to said electromagnetic reflecting surface, in a direction away from each other sequentially, and a first feeding pin and a second feeding pin extending in a direction close to said electromagnetic reflecting surface.

20. The microwave-doppler detecting device, as recited in claim 19, wherein said first radiating source pole and said second radiating source pole extend sequentially from said first feeder wire and said second feeder wire in the direction away from each other and in a direction close to said electromagnetic reflective surface respectively.

21. A microwave-doppler detection module for radiating an electromagnetic wave for detecting an object activity in a directional space, comprising:

an electromagnetic reflecting surface;

a pair of a first dipole and a second dipole symmetrically coupled with each other, wherein said first dipole includes a first radiating source pole and said second dipole includes a second radiating source pole, wherein said first radiating source pole has a first feed end and said second radiating source pole has a second feed end, wherein said first radiating source pole is configured as a first conductor, selected from a group consisting of a conductive wire and an on-board conductor, extending at an end of the first feed end and said second radiating source pole is configured as a second conductor, selected from a group consisting of a conductive wire and an on-board conductor, extending at an end of the second feed end, so as to form a radiation space which is a coverage area of the electromagnetic wave radiated by said microwave-doppler detecting module and is formed in a radial direction of a connection of said first feed end and said second feed end to avoid a detection dead zone in said radial direction, wherein said first radiating source pole and said second radiating source pole have a length greater than or equal to $\lambda/16$ from said first feed end and said second feed end respectively, wherein said first feed end and said second feed end are adjacent to each other and satisfy that a distance between said first feed end and said second feed end is less than or equal to $\lambda/4$, wherein $\lambda$ is a wavelength parameter corresponding to a frequency of the feeding signal, wherein said first radiating source pole and said second radiating source pole are arranged spacingly to said electromagnetic reflecting surface in a space corresponding to said electromagnetic reflecting surface, such that said microwave-doppler detecting module is adapted for detecting the object activity in the directional space, so as to utilize a reflection characteristic of said electromagnetic reflecting surface relative to the electromagnetic wave to form a directional radiation characteristic of said microwave-doppler detection module;

a first feeder wire and a second feeder wire, wherein said first feed end of said first radiating source pole is electrically coupled to one pole of a feed source through said first feeder wire, and said second feed end of said second radiating source pole is electrically coupled to another pole of said feed source through said second feeder wire; and a circuit board, wherein said electromagnetic reflecting surface is carried on said circuit board in the form of a copper cladding layer and said first feeder wire and said second feeder wire are fixed to said circuit board, wherein said second radiating source pole is electrically connected with said electrical reflection surface while said second feeder wire is fixed to said circuit board so as to form an electrical connection relationship between said second radiating source pole and a ground pole of said feed source.

* * * * *